(12) United States Patent
Cevolani et al.

(10) Patent No.: US 11,886,934 B2
(45) Date of Patent: Jan. 30, 2024

(54) CONTROL OF DATA TRANSFER BETWEEN PROCESSING NODES

(71) Applicant: Graphcore Limited, Bristol (GB)

(72) Inventors: Lorenzo Cevolani, Oslo (NO); Fabian Tschopp, Oslo (NO); Ola Torudbakken, Oslo (NO)

(73) Assignee: GRAPHCORE LIMITED, Bristol (GB)

(*) Notice: Subject to any disclaimer, the term of this patent is extended or adjusted under 35 U.S.C. 154(b) by 431 days.

(21) Appl. No.: 16/928,782

(22) Filed: Jul. 14, 2020

(65) Prior Publication Data

US 2021/0311808 A1 Oct. 7, 2021

(30) Foreign Application Priority Data

Apr. 2, 2020 (GB) ..................................... 2004857

(51) Int. Cl.
*G06F 9/52* (2006.01)
*G06N 3/02* (2006.01)
(Continued)

(52) U.S. Cl.
CPC ................ *G06F 9/52* (2013.01); *G06F 9/522* (2013.01); *G06F 9/542* (2013.01); *G06F 15/17318* (2013.01); *G06F 15/17325* (2013.01); *G06N 3/02* (2013.01); *G06N 3/04* (2013.01); *G06N 3/08* (2013.01)

(58) Field of Classification Search
None
See application file for complete search history.

(56) References Cited

U.S. PATENT DOCUMENTS 10,147,442 B1 12/2018 Panchapagesan et al.
10,152,676 B1 12/2018 Strom
(Continued)

FOREIGN PATENT DOCUMENTS

EP 0474436 A2 3/1992
EP 3435066 A 1/2019

OTHER PUBLICATIONS

Patentability Search Report, Patent Seekers Ltd, dated May 6, 2020. 25 pages.
(Continued)

*Primary Examiner* — Abu Zar Ghaffari
(74) *Attorney, Agent, or Firm* — HAYNES AND BOONE, LLP

(57) ABSTRACT

A data processing system comprising a plurality of processing nodes, each comprising at least one memory configured to store an array of data items, wherein each of the plurality of processing nodes is configured to execute compute instructions during a compute phase and following a pre-compiled synchronisation barrier, enter at least one exchange phase. During the at least one exchange phase, a series of collective operations are carried out. Each processing node is configured to perform a reduce scatter collective in at least one first dimension. Using the results of the reduce scatter collective, each processing node performs an allreduce in a second dimension. The processing nodes then perform an all-gather collective in the at least one first dimension using the results of the allreduce.

27 Claims, 39 Drawing Sheets

(51) Int. Cl.
*G06F 15/173* (2006.01)
*G06F 9/54* (2006.01)
*G06N 3/04* (2023.01)
*G06N 3/08* (2023.01)

(56) References Cited

U.S. PATENT DOCUMENTS

| | | | |
|---|---|---|---|
| 2007/0094170 A1 | 4/2007 | Graf et al. | |
| 2011/0219208 A1* | 9/2011 | Asaad | G06F 9/06 712/12 |
| 2013/0042245 A1* | 2/2013 | Archer | G06F 9/522 718/102 |
| 2013/0067443 A1* | 3/2013 | Howard | G06F 8/314 717/149 |
| 2014/0067738 A1 | 3/2014 | Kingsbury | |
| 2016/0125316 A1 | 5/2016 | Kadav | |
| 2017/0308789 A1 | 10/2017 | Langford et al. | |
| 2018/0293492 A1* | 10/2018 | Kalamkar | G06N 3/063 |
| 2018/0322386 A1* | 11/2018 | Sridharan | G06T 15/005 |
| 2018/0322606 A1* | 11/2018 | Das | G06N 3/063 |
| 2019/0042527 A1* | 2/2019 | Langer | G06F 9/5061 |
| 2020/0042895 A1 | 2/2020 | McLaren | |
| 2020/0051201 A1* | 2/2020 | Zhang | G06T 1/20 |
| 2020/0311016 A1* | 10/2020 | Lee | G06F 9/5066 |
| 2021/0037107 A1* | 2/2021 | Klenk | H04L 12/1886 |
| 2021/0109888 A1* | 4/2021 | Vaidyanathan | G06F 15/17318 |
| 2021/0124627 A1* | 4/2021 | Giroux | G06F 12/0888 |
| 2021/0133583 A1* | 5/2021 | Chetlur | G10L 15/22 |

OTHER PUBLICATIONS

D'Souza, Optimizing Distributed GPU Collectives for Deep Learning Workloads, ISDL, IBM India Pvt. Ltd. 15 pages.
Gibiansky, Bringing HPC Techniques to Deep Learning, Feb. 21, 2017. 20 pages. Posted in Machine-Learning NRAM: Theano Implementation.
Pudipeddi, Microsoft, Training Large Neural Networks with Constant Memory Using a New Execution Algorithm, Feb. 25, 2020. 11 pages.
International Search Report and Written Opinion dated Apr. 1, 2021 for Patent Application No. PCT/EP2020/087568. 14 pages.
International Search Report and Written Opinion dated Apr. 14, 2021 for Patent Application No. PCT/EP2020/087572. 14 pages.
Examination Report dated Mar. 11, 2021 for Patent Application No. GB2004858.3.
Combined Search and Examination Report dated Sep. 24, 2020 for Patent Application No. GB2004857.5. 8 Pages.
Y. Ueno & R. Yokota, 'Exhaustive Study of Hierarchical AllReduce Patterns for Large Messages Between GPUs', published in 2019 19th IEEE/ ACM International Symposium on Cluster, Cloud and Grid Computing (CCGRID).
T. T. Nguyen et al., 'Hierarchical Distributed-Memory Multi-Leader MPI-Allreduce for Deep Learning Workloads', published in 2018 Sixth International Symposium on Computing and Networking Workshops (CANDARW).
Combined Search and Examination Report dated Sep. 24, 2020 for Patent Application No. GB2004858.3. 6 pages.
Combined Search and Examination Report dated Mar. 10, 2021 for Patent Application No. GB2008390.3.

* cited by examiner

| Phase | Processing Node 1 | Processing Node 2 | Processing Node 3 | Processing Node 4 |
|---|---|---|---|---|
| Compute 1 | Load data for stage 4, unload results | Compute stage 1 for process 3 | Compute stage 2 for process 2 | Compute stage 3 for process 1 |
| Exchange 1 | Send data for stage 4 to processing node 2 | Send results to processing node 1 and 3 | Send results to processing node 1 and 4 | Send results to processing node 1 and 2 |
| Compute 2 | Load data for stage 5, unload results | Compute stage 4 for process 1 | Compute stage 2 for process 3 | Compute stage 3 for process 2 |
| Exchange 2 | Send data for stage 5 to processing node 3 | Send results to processing node 1 and 3 | Send results to processing node 1 and 4 | Send results to processing node 1 and 2 |
| Compute 3 | Load data for stage 1, unload results | Compute stage 4 for process 2 | Compute stage 5 for process 1 | Compute stage 3 for process 3 |
| Exchange 3 | Send data for stage 1 to processing node 4 | Send results to processing node 1 and 3 | Send results to processing node 1 | Send results to processing node 1 and 2 |
| Compute 4 | Load data for stage 2, unload results | Compute stage 4 for process 3 | Compute stage 5 for process 2 | Compute stage 1 for process 4 |
| Exchange 4 | Send data for stage 2 to processing node 1 | Send results to processing node 1 and 3 | Send results to processing node 1 | Send results to processing node 1 and 2 |

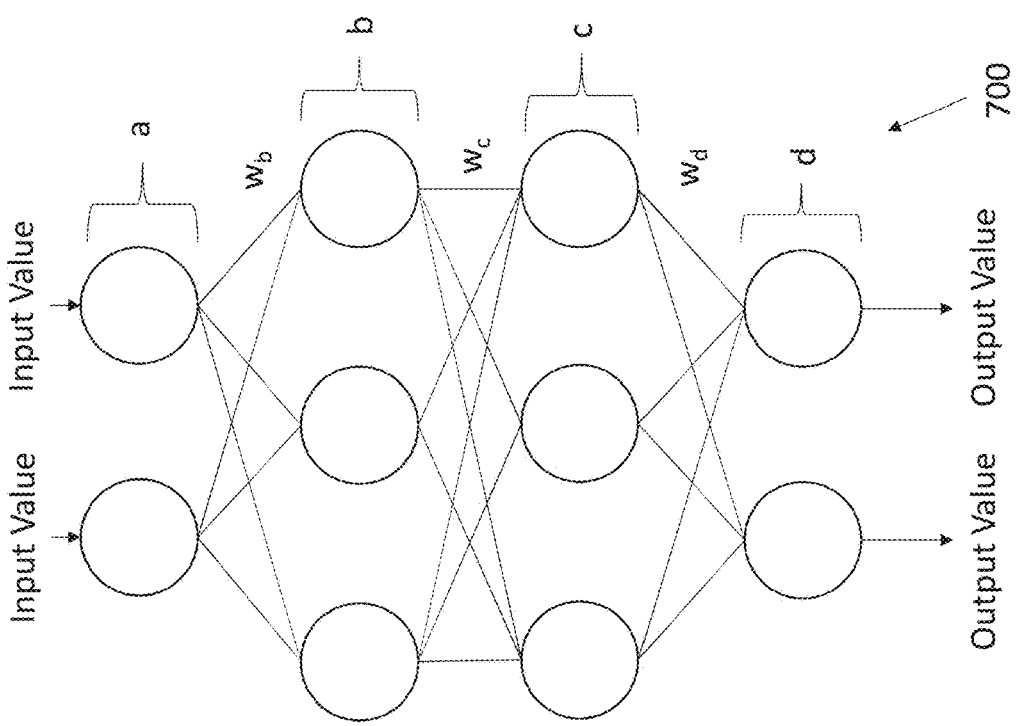

Figure 7A

| Phase | Processing node 1 Activity | Processing node 2 Activity |
|---|---|---|
| Compute 1 | Compute activations for layer a | Load weights, $W_b$ |
| Exchange 1 | Send activations for layer a and receive weights, $W_b$ | Receive activations for layer a and send weights, $W_b$ |
| Compute 2 | Compute activations for layer b | Load weights, $W_c$. Unload activations for layer a |
| Exchange 2 | Send activations for layer b and receive weights $W_c$ | Receive activations for layer b and send weights $W_c$ |
| Compute 3 | Compute activations for layer c | Load weights, $W_d$. Unload activations for layer b |
| Exchange 3 | Send activations for layer c and receive weights $W_d$ | Receive activations for layer c and send weights $W_d$ |
| Compute 4 | Compute activations for layer d | Unload activations for layer c |
| Exchange 4 | Send activations for layer d | Receive activations for layer d |

| Phase | Processing node 1 | Processing node 2 | Processing node 3 | Processing node 4 |
|---|---|---|---|---|
| Compute 1 | Load weights for calculating layer 4, unload results | Compute layer 1 activations for input data 3 | Compute layer 2 activations for input data 2 | Compute layer 3 activations for input data 1 |
| Exchange 1 | Send weights for calculating layer 4 to processing node 2 | Send results to processing node 1 and 3 | Send results to processing node 1 and 4 | Send results to processing node 1 and 2 |
| Compute 2 | Load weights for calculating layer 5, unload results | Compute layer 4 activations for input data 1 | Compute layer 2 activations for input data 3 | Compute layer 3 activations for input data 2 |
| Exchange 2 | Send weights for calculating layer 5 to processing node 3 | Send results to processing node 1 and 4 | Send results to processing node 1 and 4 | Send results to processing node 1 and 2 |
| Compute 3 | Load input data for calculating layer 1, unload results | Compute layer 4 activations for input data 2 | Compute layer 5 activations for input data 1 | Compute layer 3 activations for input data 3 |
| Exchange 3 | Send weights for calculating layer 1 to processing node 4 | Send results to processing node 1 and 3 | Send results to processing node 1 | Send results to processing node 1 and 2 |
| Compute 4 | Load weights for calculating layer 2, unload results | Compute layer 4 activations for input data 3 | Compute layer 5 activations for input data 2 | Compute layer 1 activations for input data 4 |
| Exchange 4 | Send weights for calculating layer 2 to processing node 1 | Send results to processing node 1 and 3 | Send results to processing node 1 | Send results to processing node 1 and 2 |

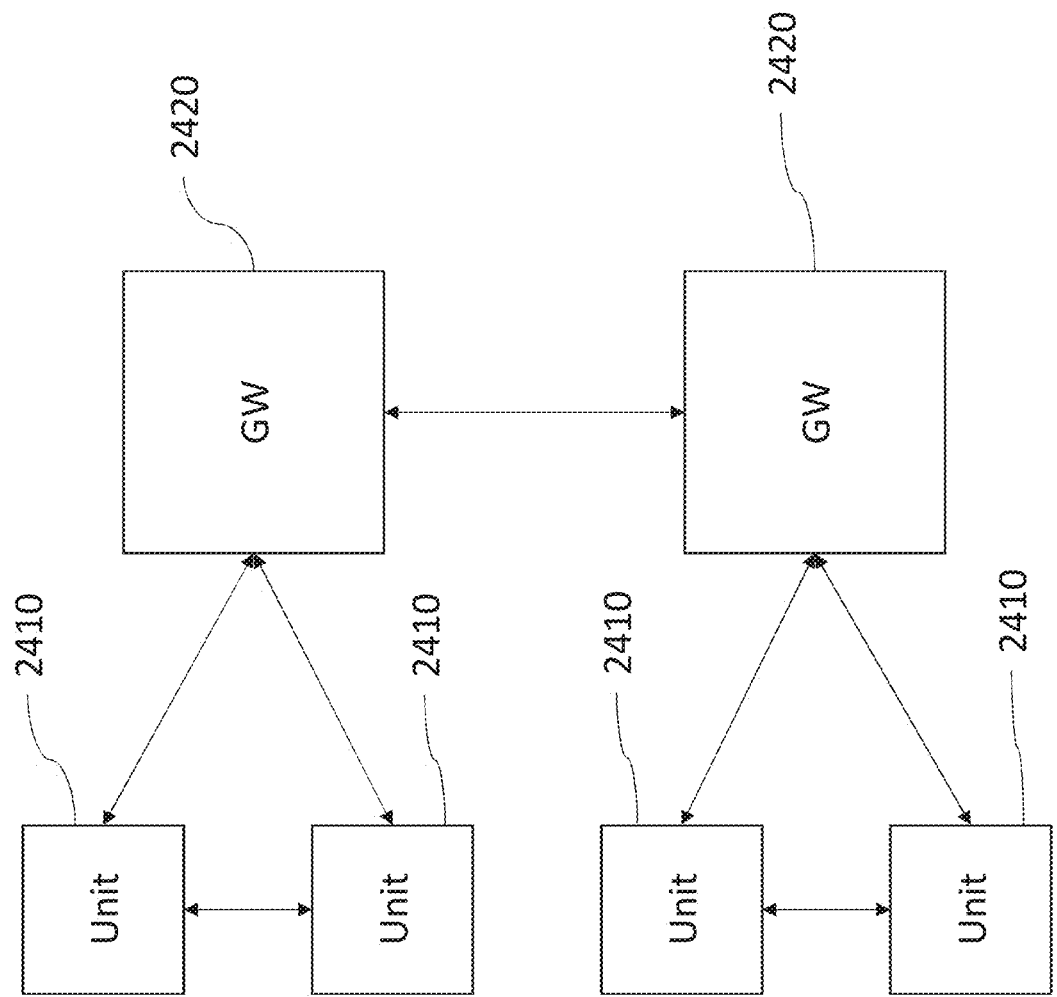
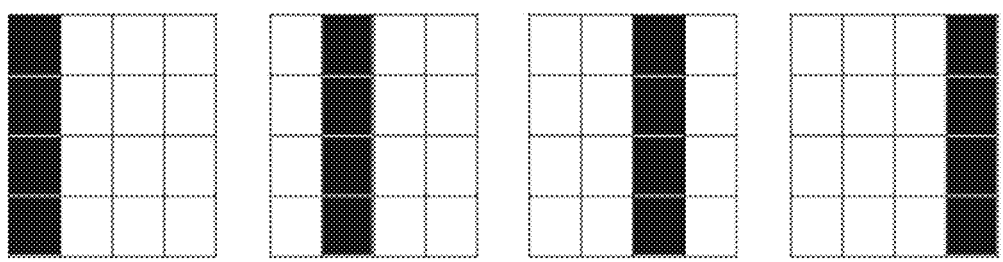
Figure 27

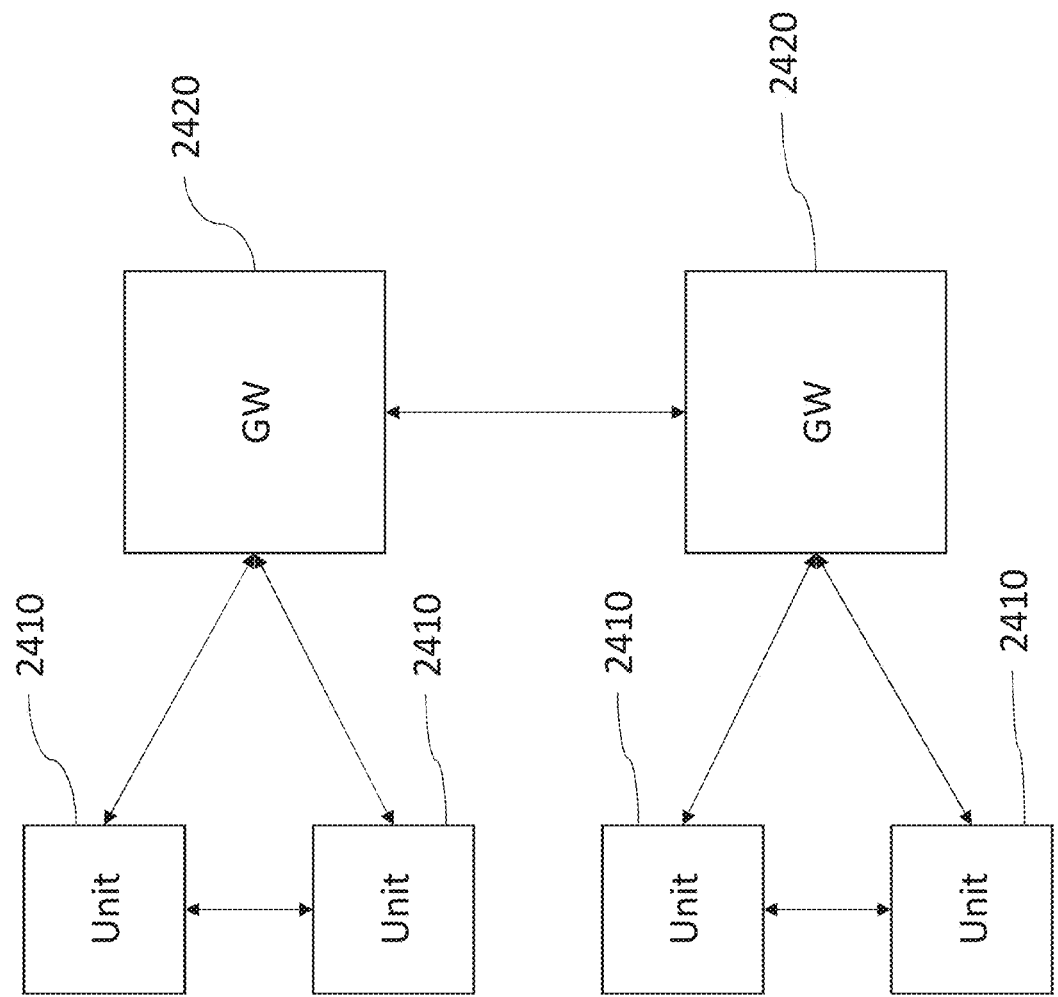
Figure 28
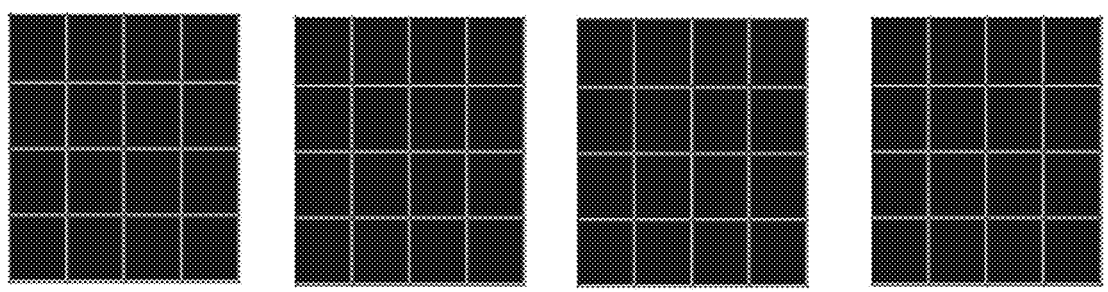

CONTROL OF DATA TRANSFER BETWEEN PROCESSING NODES

CROSS REFERENCE TO RELATED APPLICATIONS

The present application claims priority to United Kingdom Patent Application No. 2004857.5, filed Apr. 2, 2020, which is hereby incorporated by reference in its entirety.

TECHNICAL FIELD

The present disclosure relates to the exchange of data between processing nodes connected in a data processing system, and particularly, but not exclusively, for optimising data exchange between processing nodes.

BACKGROUND

One example of the application of a multi-processing node system is found in the context of machine learning algorithms, for example, in the context of deep neural networks. As will be familiar to those skilled in the art of machine intelligence, a machine intelligence algorithm is based around performing iterative updates to a "knowledge model", which can be represented by a graph of multiple interconnected nodes. Each node represents a function of its inputs. Some nodes receive the inputs to the graph and some receive inputs from one or more other nodes. The output of some nodes form the inputs of other nodes, and the output of some nodes provide the output of the graph (and in some cases a given node may even have all of these: inputs to the graph, outputs from the graph and connections to other nodes). Further, the function at each node is parameterized by one or more respective model built-in parameters, e.g. weights. During a learning stage, the aim is, based on a set of experiential input data (i.e. samples), to find values for the various parameters such that the graph as a whole will generate a desired output for a range of possible inputs. The graph having those derived parameters can then be applied, during an operating phase, to generate output values using further input data.

Various algorithms for performing the training of a graph are known in the art, such as a back propagation algorithm based on stochastic gradient descent. Over multiple iterations, based on the training data set, the parameters are gradually tuned to decrease their errors, and thus the graph converges toward a solution. In a subsequent stage, the learned model can then be used to make predictions of outputs given a specified set of inputs or to make inferences as to inputs (causes) given a specified set of outputs.

The training of a neural network can be performed using a multi-processing node system. Typically, at least some of the processing of each node can be carried out independently of processing of other nodes in the graph, and therefore large graphs expose great opportunities for concurrency and/or parallelism. The training of a neural network using a multi-processing node system is achieved by applying data parallelism in which each processing node derives weights or updates to weights for a neural network using a different data set. The updates/updated weights are then synchronised between the processing nodes during an exchange phase. Such a synchronisation process may involve exchanging updates between the processing nodes in one stage, with each processing node performing operations (e.g. averaging) on the updates it receives in the stage, before moving on to a further stage where the results of those operations, e.g. averaged updates, are themselves exchanged. The exchange of such updates can be performed using collectives.

Collectives are routines which are commonly used when processing data in a computer. They are routines which enable data to be shared and processed across multiple different processes, which may be running on the same processing node or different processing nodes. For example, if one process reads data from a data store it can use a "broadcast" process to share that data with other processes. Another example is when the result of a particular function is needed on multiple processes. A "reduction" is a result which has required the application of a compute function to a data value from each of multiple processes. "Gather" and "Scatter" collectives handle more than one data item. Certain collectives have become increasingly important in processing machine learning applications.

One type of collective is known as the all-reduce collective. An all-reduce collective comprises two stages, the first of which is referred to as "reduce-scatter", and the second of which is referred to as the "allgather" collective. Assuming that each of a plurality of processing nodes stores a different set of data, when the reduce-scatter collective is performed, at each step of the reduce-scatter collective, each processing node passes a different subset of data to at least one of its neighbours. Each processing node reduces the subset of data that it receives and then passes that reduced subset of data to at least one of its neighbours. Eventually, each processing node in the system ends up with a different subset of the total data, each of these subsets being the result of a reduction of all its corresponding starting subsets on each of the processing nodes. Following the reduce-scatter, an all-gather collective is performed, in which the subsets of data held by each processing node are shared between the processing node so that each processing node then has the same complete set of data.

SUMMARY

When exchanging data between processing nodes of a system using collectives, it may be desirable to improve the utilisation of available bandwidth for exchanging data between different processing nodes. The all-reduce collective is an effective way of exchanging data between different processing nodes of a system. However, when used to exchange data between a large number of different processing nodes, using the standard all-reduce collective only may result in less efficient utilisation of bandwidth since, in that case, the entire data set must be exchanged between all of the processing nodes.

According to a first aspect, there is provided a data processing system comprising a plurality of first processing nodes, each of the plurality of first processing nodes comprising at least one memory configured to store an array of data items, wherein each of the plurality of first processing nodes belongs to at least two different sets of processing nodes, wherein at least one processor of each of the plurality of first processing nodes is configured to execute compute instructions during a compute phase and following a precompiled synchronisation barrier, enter at least one exchange phase, wherein the at least one processor of each of the plurality of first processing nodes is configured to, during the at least one exchange phase: take part in one or more reduce scatter collectives using the respective array of data items to obtain a reduced subset of an array of data items, wherein each of the one or more reduce scatter collectives is performed between processing nodes of a different one of the respective at least two different sets of processing nodes; subsequently, exchange the respective reduced subset of the array of data items using an all-reduce collective with processing nodes of a further of the at least two different sets of processing nodes to which the respective processing node belongs to obtain a further reduced subset of the array of data items; and subsequently, take part in one or more all-gather collectives using the further reduced subset of the array of data items to obtain a reduced array of data items, wherein each of the one or more all-gather collectives is performed between processing nodes of one of the different ones of the respective at least two different sets of processing nodes.

Therefore, each of the all-reduce collectives are performed in one or more exchange phases and are effectively 'sandwiched' between one or more reduce-scatter collective and one or more all-gather collectives. By first performing each of the reduce-scatter collectives between processing nodes belonging to a set of processing nodes, each of the processing nodes in given set of processing nodes receives a different subset of the array of data. Therefore, when the all-reduce operation is carried out, the data exchange involves a smaller amount of data, resulting in lower bandwidth utilisation. Following the all-reduce, all-gather operations are carried out such that each processing node in the system has the same set of data. Although the disclosure was developed in a machine learning context, it is broadly applicable to transfer of any data, irrespective of content.

In some embodiments, each of the first processing nodes is part of one of a plurality of further sets of one or more processing nodes of the data processing system, wherein at least one processing node of each of the further set of processing nodes comprises at least one processor configured to, prior to the pre-compiled synchronisation barrier, generate the respective array of data items in dependence upon a different set of input data.

In some embodiments, each of the further sets of one or more processing nodes consists of a pair of processing nodes.

In some embodiments, each of the further sets of processing nodes comprises two or more processing nodes comprising one of the plurality of first processing nodes and at least one additional processing node.

In some embodiments, at least one processor of at least one of the processing nodes in each further set of one or more of the processing nodes is configured to: perform the generating the respective array of data items; and transfer elements of the array of data items to another of the processing nodes in the respective further set of one or more of the processing nodes.

In some embodiments, the steps of generating the respective array of data items, and transferring elements of the array of data items to another of the processing nodes is performed by at least one processor of the at least one additional processing node in each further set, wherein the another of the processing nodes to which the elements of the array of data items are transferred is the first processing node of the respective further set.

In some embodiments, for each of the further sets of processing nodes: the generating the respective array of data items is performed as part of a stage of a multi-stage process over a plurality of time periods; and the step of taking part in the one or more reduce-scatter collectives is performed following the completion of the multi-stage process, wherein, for each of the further sets of processing nodes, during each of some of the plurality of time periods: at least one processor of at least one of the processing nodes of the respective further set is configured to perform calculations for generating one or more elements of the respective array of data items; and at least one other of the processing nodes of the respective further set is configured to unload to storage one or more elements of the respective array of data items that was calculated during a preceding one of the plurality of time periods.

In some embodiments, for each of the further sets of processing nodes, the at least one other of the processing nodes comprises the first processing node of the respective further set.

In some embodiments, for each of some of the further sets of processing nodes, during each of at least some of the plurality of time periods: at least one processor of the respective first processing node of the further set of processing nodes is configured to generate one or more elements of the respective array of data items; and at least one processor of the respective at least one additional processing node is configured to unload one or more elements of the respective array of data items generated in a preceding of the time periods, wherein, for each of the some of the further sets of processing node, during each of at least others of the plurality of time periods: at least one processor of the respective at least one additional processing node of the further set of processing nodes is configured to generate one or more elements of the respective array of data items; and at least one processor of the respective further sets of processing node is configured to unload one or more elements of the respective array of data items generated in a preceding of the time periods.

In some embodiments, each of the plurality of first processing nodes is configured to, prior to taking part in the one or more reduce-scatter collectives, load the elements of the respective array of data items that were unloaded to the storage by a processing node of the further set to which the respective first processing node belongs.

In some embodiments, each array of data items comprises at least one of: weight updates for a neural network; or weights for a neural network derived from weight updates for the neural network.

In some embodiments, at least one processor of at least one processing node of each of the further sets of processing nodes is configured to generate the weight updates using a different set of training data.

In some embodiments, the at least one processor of each of the first processing nodes in the data processing system is configured to: following a reduce-scatter collective of the all-reduce collective and prior to an all-gather collective of the all-reduce collective, perform operations on each stored element of the array of data items stored by the respective first processing node to modify data of the stored elements of the array of data items.

In some embodiments, for each of the first processing nodes: each of the stored elements comprises weight updates for a neural network; and the operations to modify data comprise providing updated weights of the neural network using the weight updates, the modified data of the stored elements comprises the updated weights.

In some embodiments, for each of the first processing nodes: the respective at least two different sets of processing nodes consists of two sets of processing nodes; the one or more reduce-scatter collectives consist of a reduce scatter collective between processing nodes of a first of the respective two sets of processing nodes; the all-reduce collective is between processing nodes of a second of the respective two sets of processing nodes; and the one or more all-gather collectives consist of an all-gather collective between processing nodes of the first of the respective two sets of processing nodes.

In some embodiments, for each of the first processing nodes: the respective at least two different sets of processing nodes comprises more than two sets of processing nodes; the one or more reduce-scatter collectives comprises a plurality of reduce scatter collectives; and the one or more all-gather collectives comprises a plurality of all-gather collectives.

According to a second aspect, there is provided a method implemented in a data processing system comprising a plurality of first processing nodes, each of the plurality of first processing nodes comprising at least one memory configured to store an array of data items, wherein each of the plurality of first processing nodes belongs to at least two different sets of processing nodes, wherein the method comprises, at each of the plurality of first processing nodes, executing compute instructions during a compute phase and following a precompiled synchronisation barrier, entering at least one exchange phase, wherein the method comprises, each of the first processing nodes, during the at least one exchange phase: taking part in one or more reduce scatter collectives using the respective array of data items to obtain a reduced subset of an array of data items, wherein each of the one or more reduce scatter collectives is performed between processing nodes of a different one of the respective at least two different sets of processing nodes; subsequently, exchanging the respective reduced subset of the array of data items using an all-reduce collective with processing nodes of a further of the at least two different sets of processing nodes to which the respective processing node belongs to obtain a further reduced subset of the array of data items; and subsequently, taking part in one or more all-gather collectives using the further reduced subset of the array of data items to obtain a reduced array of data items, wherein each of the one or more all-gather collectives is performed between processing nodes of one of the different ones of the respective at least two different sets of processing nodes.

According to a third aspect, there is provided a computer program comprising sets of computer readable instructions, wherein when each of the sets of computer readable instructions is executed by at least one processor of a different one of a plurality of first processing nodes, the computer program causes a method according to the second aspect to be carried out.

According to a fourth aspect, there is provided a non-transitory computer readable medium storing the computer program according to the third aspect.

BRIEF DESCRIPTION OF DRAWINGS

For a better understanding of the present invention to show how the same may be carried into effect, reference will now be made by way of example to the accompanying drawings:

FIG. 5 illustrates an example of the tasks performed by each processing node of the data processing system having four processing nodes;

FIG. 7A illustrates an example of the tasks performed by each processing node in a two processing node system when running an example neural network in the case that the processing nodes do not swap roles;

FIG. 8 illustrates an example of the tasks performed by each processing node in a four processing node system when running a neural network;

FIG. 27 illustrates processing nodes in a rack, each of which stores a subset of the updated weights for a machine learning model; and FIG. 28 illustrates processing nodes in a rack, each of which stores the full set of updated weights for a machine learning model.

DETAILED DESCRIPTION

Figure 1:
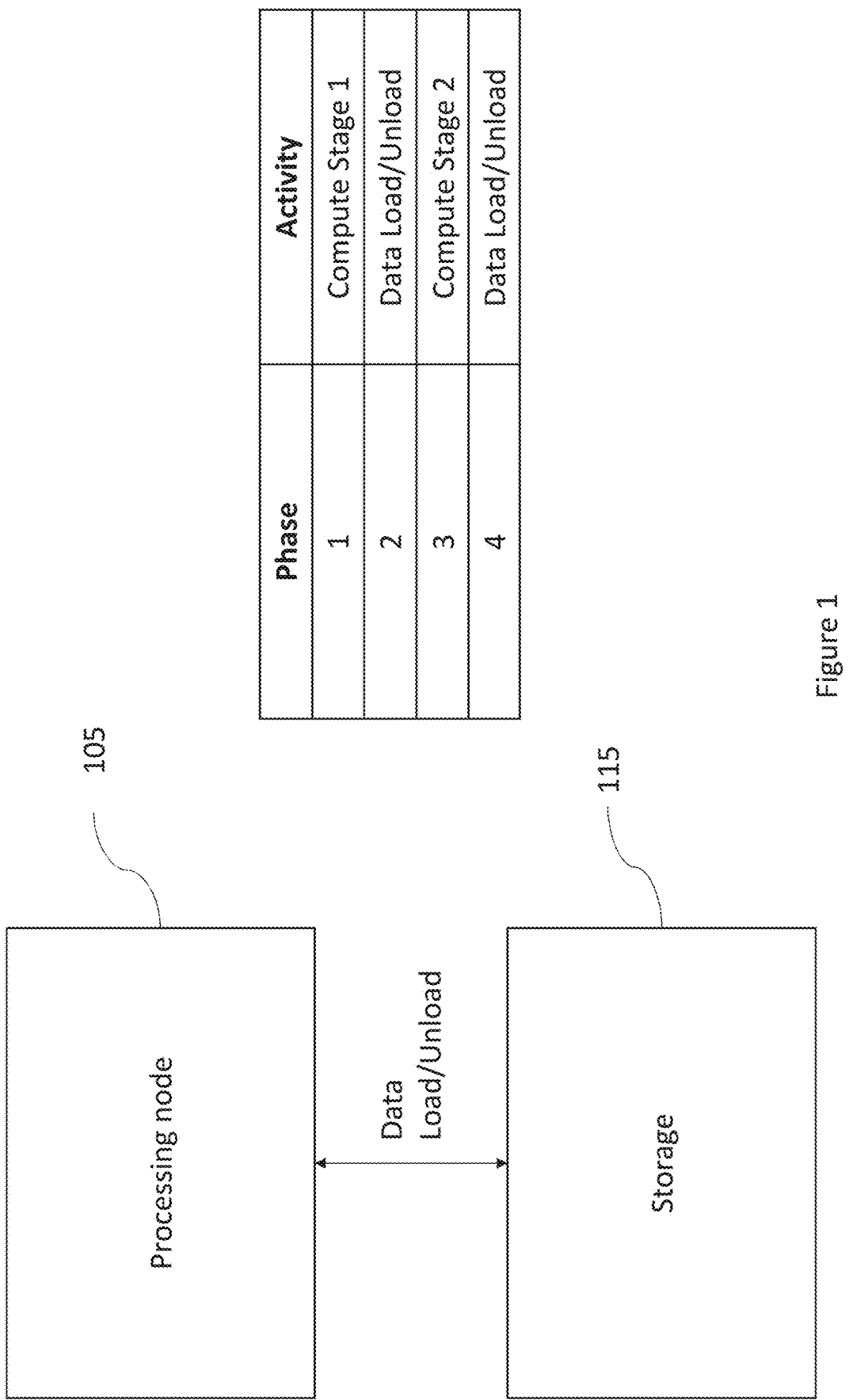
FIG. 1 illustrates an example of system in which a processing node switches between computing and loading/unloading of data.

FIG. 1 shows, an example of how a single processing node 105 might proceed through a multi-stage process using an external storage 115 from which it can load and unload data.

Embodiments of a first implementation will now be described in more detail with reference to the accompanying Figures.

Figure 2:
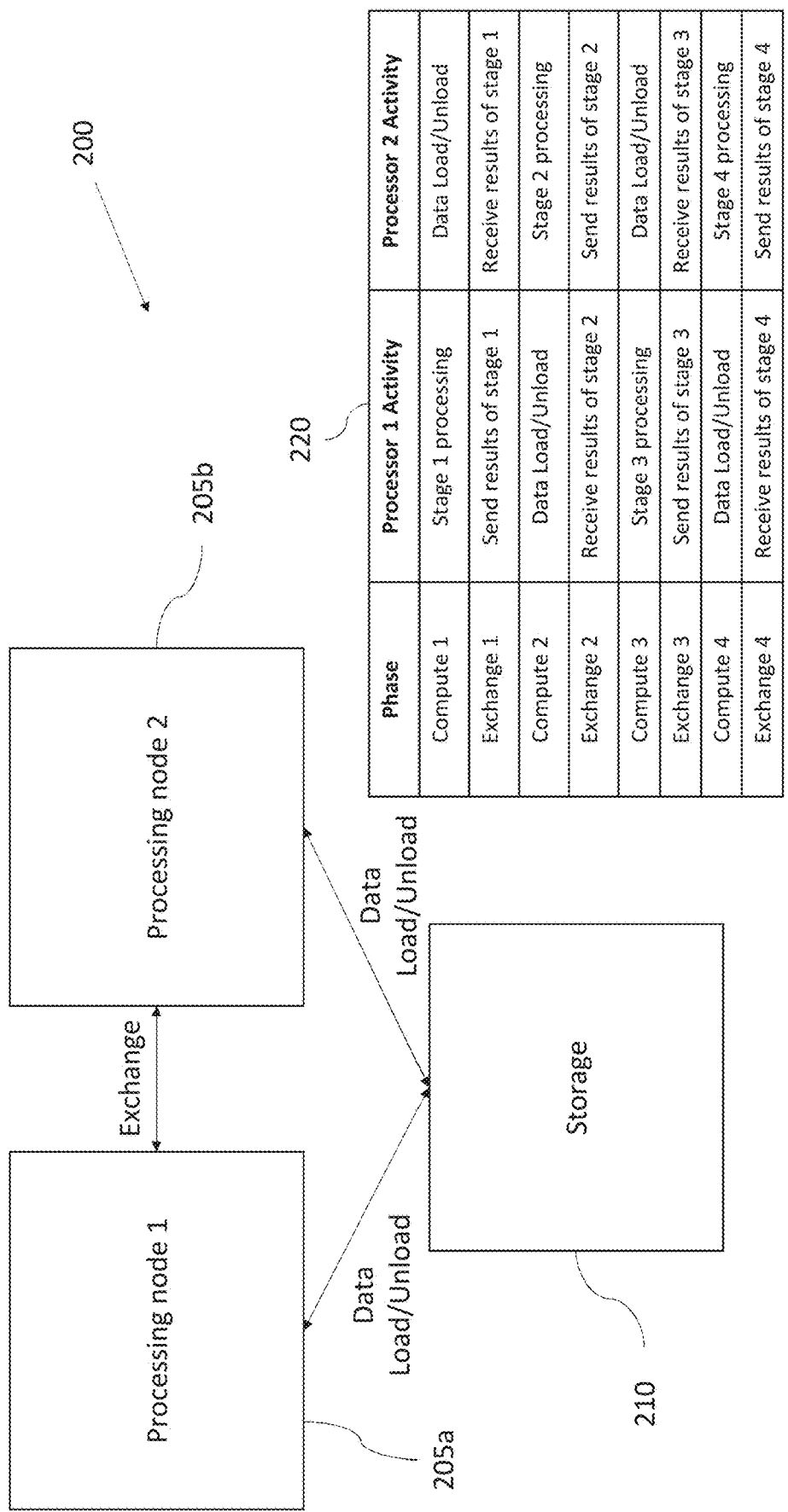
FIG. 2 illustrates an example of a system in two processing nodes switch roles between computing and loading/unloading of data.

Reference is made to FIG. 2, which illustrates a multi-processing node system 200. The system 200 comprises a first processing node 205a, and a second processing node 205b configured to interact with a storage 210. At least one of the first processing node 205a and the second processing node 205b are configured, during certain phases, to perform preparation operations, including loading and/or unloading data from the storage 210. During a phase in which one of the first processing node 205a and the second processing node 205b is loading and/or unloading data from the storage 210, the other of the processing nodes 205a, 205b is performing computations. Although, throughout this description, the preparation operations discussed are load/unload operations, during the phases used for data load/unload by a processing node, that processing nodes may additionally perform other preparation operations including one of or more of: 'recalculation' of temporary states (which were discarded due to memory constraints), collectives, and calculations related to the model update/optimizer.

In some embodiments, the processing nodes 205a, 205b are configured to alternate between performing computations and performing the data load/unload from storage 210. In this case, the processing nodes 205a, 205b continuously swap roles during the process. For example, during a first phase, the first processing node 205a performs calculations associated with a first stage of the process to produce results. These results will be used for calculations associated with a subsequent stage. Also during the first phase, the second processing node 205b, loads data from storage 210 that it requires for performing processing during a subsequent phase. Then, during the second phase, the first processing node 205a unloads the data that it calculated in the first phase to the storage 210, and loads data that it requires for processing during a subsequent phase. Also, during the second phase, the second processing node 205b performs the processing using the data that it loaded from storage 210 during the first phase. During a third phase, the processing nodes 205a, 205b will again switch roles, with the first processing node 205a being configured to perform calculations using data it loaded from the storage 210 during the second phase, and the second processing node 205b unloading data it calculated during the second phase and loading data it requires for processing during a further phase.

Together, the first processing node 205a and the second processing node 205b are configured to perform a multi-stage process over multiple phases more efficiently, since one of the processing nodes 205a, 205b will be performing the calculations associated with one of the stages, whilst the other processing node performs the loading/unloading required for performing the calculations associated with a subsequent stage.

One or more of the multiple stages depend upon the results output by a preceding stage of the process. Therefore, additional phases are used for the exchange of data between the processing nodes 205a, 205b. This allows one of the processing nodes 205a, 205b to have access to the results of the calculations associated with a previous stage so to allow the other of the processing nodes 205a, 205b to perform the calculations associated with the next stage in the process. These additional phases are referred to herein as inter-processing node exchange phases.

Figure 3:
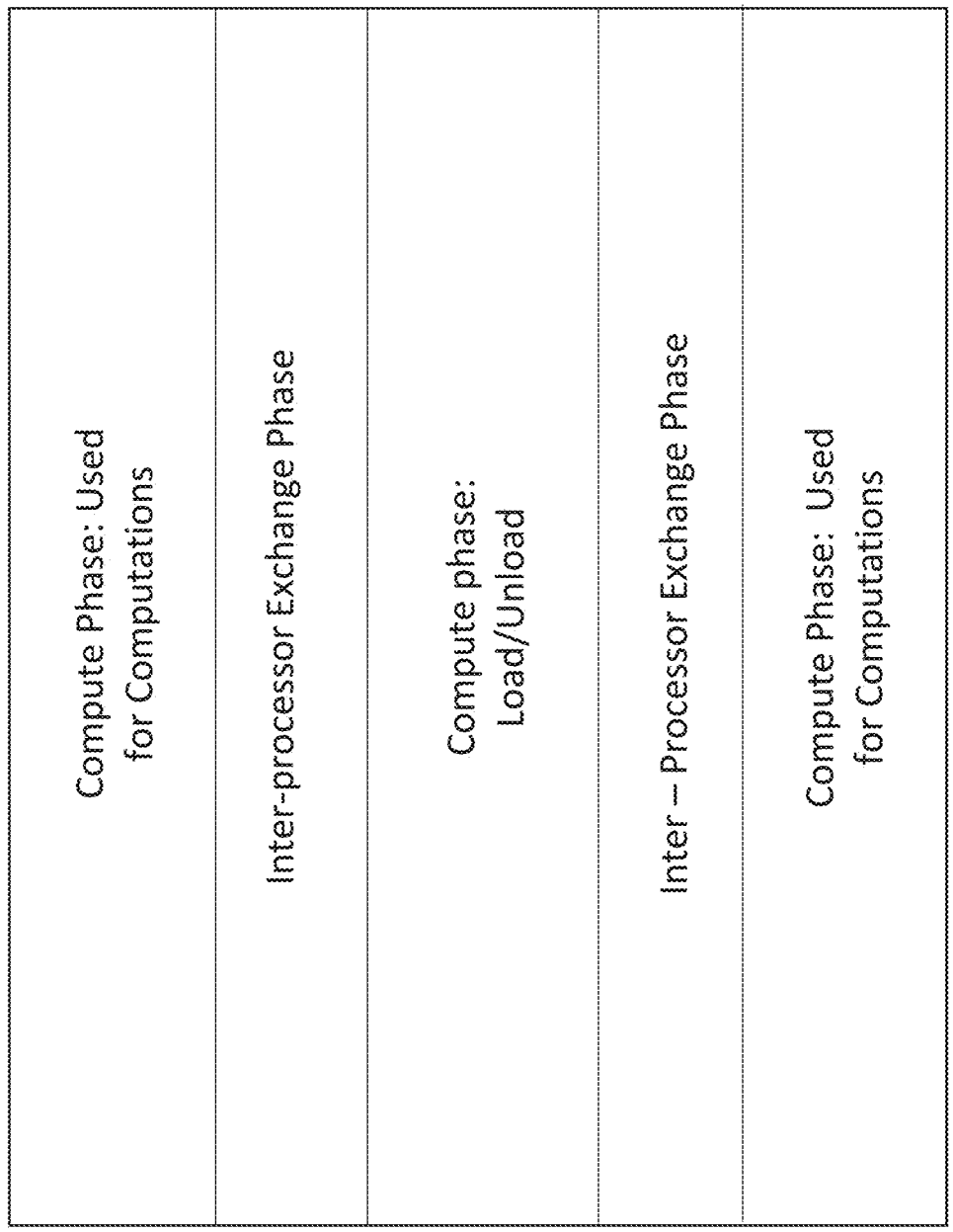
FIG. 3 illustrates an example of the different phases for a processing node according to embodiments.

Reference is made to FIG. 3, which illustrates how one of the processing nodes 205a, 205b, may alternate between two different types of phases, referred to herein as compute phases and inter-processing node exchange phases. During a compute phase, the respective processing node is configured to perform one of (i) calculations corresponding to one of the stages in the multi-stage process; and (ii) loading/unloading from the storage of the system. Therefore, the 'first phase' and 'second phase' discussed above with respect to FIG. 2, correspond to compute phases shown in FIG. 3. During an inter-processing node exchange phase, the processing nodes are configured to exchange data with one another. This data exchange is shown as being directly between the two processing nodes, but may be carried out via a more complex intermediate device, such as a gateway comprising the storage 210. By exchanging data between the processing nodes during the inter-processing node exchange phase, each processing node may obtain the results of a previous stage that were calculated by another processing node and that are required for performing the processing for a following stage during a following compute phase.

The compute and inter-processing node exchange phases discussed herein may be bulk synchronous parallel (BSP) compute and exchange phases. Each compute phase discussed herein, and shown in FIG. 3, is separated from an inter-processing node exchange phase by a pre-compiled synchronisation barrier. However, each compute phase shown may include one or more exchange phases for other types of data exchange. For example, each compute phase as discussed may comprise one or more exchange phases for data exchange between processors within a processing node 205a, 205b and/or one or more exchange phases used for data load/unload between a processing node 205a, 205b and the storage 210.

In embodiments, the bandwidth available for communications between the nodes 205a, 205b is greater than bandwidth available for communications between each of the nodes 205a, 205b and the storage 210. Therefore, using an inter-processor node exchange phase for the exchange of certain data has the advantage of making use of the greater inter-node bandwidth available. In embodiments, however, the storage 210 has greater storage capacity than the nodes 205a, 205b, and therefore is used to load/unload certain data, since the nodes 205a, 205b do not possess sufficient storage capacity to store all of the data required for the entire process.

Reference is made again to FIG. 2, which illustrates a table 220 showing how the processing nodes 205a, 205b may operate in different phases. As shown in the table 220, during a first compute phase, the processing node 205a performs processing for a first stage of the multi-stage process. Also, during the first compute phase, the processing node 205b, performs data load/unload operations. The data load/unload operations during this phase comprise the processing node 205b receiving from storage 210, data that is required for performing processing for the second stage of the multi-stage process.

Following the first compute phase, a first inter-processing node exchange is carried out. In this first inter-processing node exchange, the processing node 205a sends the results of the processing that was carried out for the first stage to the processing node 205b.

Following the first inter-processing node exchange phase, the system 200 proceeds to a second compute phase. During the second compute phase, the second processing node 205b performs the processing associated with the second stage of the multi-stage process. The second processing node 205b performs this processing in dependence upon the results of the first stage processing received from the processing node 205a. Also during the second compute phase, the first processing node 205a unloads the results that it calculated during the first compute phase to the storage 210. By unloading these results to the storage 210, these results are available when required for subsequent processing (which may be part of a separate process to the multi-stage process indicated by the table 220). Also during the second compute phase, the first processing node 205a loads data that it requires for processing from the storage 210. This data will be used for processing by the first processing node 205a during a following compute stage.

Following the second compute phase, a second inter-processing node exchange is carried out. In this second inter-processing node exchange, the second processing node 205b sends the results of the processing that was carried out for the second stage to the first processing node 205a.

Following the second inter-processing node exchange phase, the system 200 proceeds to a third compute phase. During the third compute phase, the first processing node 205a performs the processing associated with the third stage of the multi-stage process. The first processing node 205a performs this processing in dependence upon the results of the second stage processing received from the second processing node 205b. Also during the third compute phase, the second processing node 205b is configured to unload the results that it calculated during the second compute phase to the storage 210. By unloading these results to the storage 210, these results are available when required for subsequent processing (which may be part of a separate process to the multi-stage process indicated by the table 220). Also during the third compute phase, the second processing node 205b loads data that it requires for processing from the storage 210. This data will be used for processing by the second processing node 205b during a following compute stage.

The system 200 can continue to progress though stages of the process as described until a final result is obtained by one of the processing nodes, 205a, 205b.

Figure 2A:
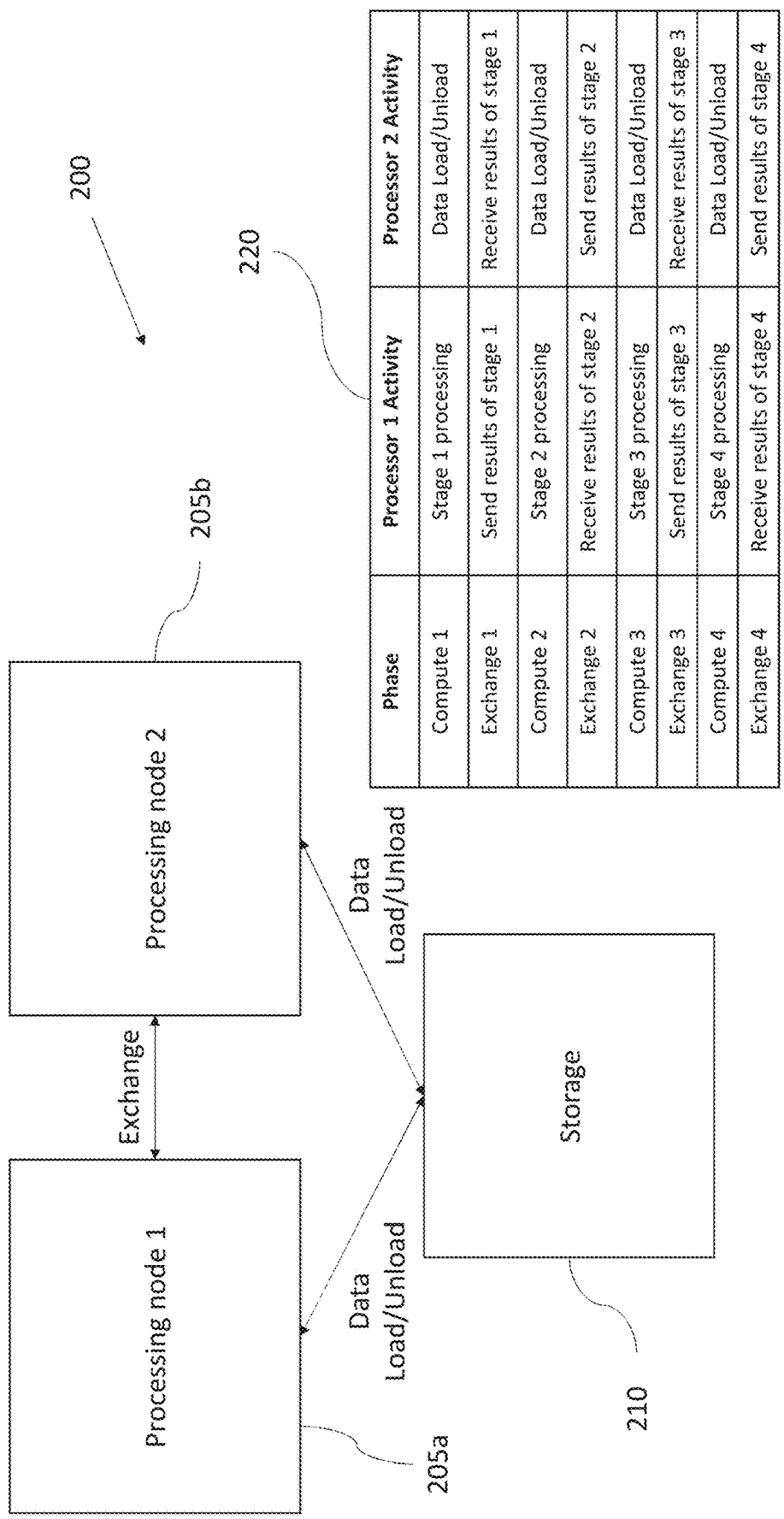
FIG. 2A illustrates an example of a system in one processing node performs loading/unloading of data and another performs computing.

FIG. 2 shows an example in which the processing nodes 205a, 205b alternate roles between each compute phase. However, in other embodiments, the processing nodes 205a, 205b may have a fixed role. In other words, one of the processing nodes 205a, 205b is dedicated to performing the calculations associated with each stage, whilst another of the processing nodes 205a, 205b is dedicated to performing the data load/unload operations required to prepare for the calculations associated with each stage. Reference is made to FIG. 2A, which illustrates an example of the processing performed during each phase in such a case.

As shown in FIG. 2A, during a first compute phase, the first processing node 205a is configured to perform processing associated with a first stage of the multi-stage process to produce a result. Also, during the first compute phase, the processing node 205b loads data from storage 210 that is required during the second compute phase for performing processing associated with the second stage. During the first inter-processing node exchange phase, the first processing node 205a passes the results it calculated during the first compute phase to the second processing node 205b. Also, during the first inter-processing node exchange phase, the second processing node 205b passes the data it loaded from storage during the first compute phase to the first processing node 205a. During the second compute phase, the first processing node 205a performs processing associated with the second stage using the results it calculated during the first compute phase and using the data received during the first inter-processing node exchange phase from processing node 205b. Also, during the second compute phase, the second processing node 205b unloads the results that were calculated by processing node 205a during the first compute phase to storage 210. The second processing node 205b also, during the second compute phase, loads data required for performing processing associated with the third stage from storage 210. During the second inter-processing node exchange phase, the first processing node 205a passes the results it calculated during the second compute phase to the second processing node 205b. Also, during the second inter-processing node exchange phase, the second processing node 205b passes the data it loaded from storage 210 during the second compute phase to the first processing node 205a. The system 200 proceeds through the remaining phases in similar manner.

Although FIGS. 2 and 2A illustrates a system 200 having two processing nodes 205a, 205b, in some embodiments, more than two processing nodes may be used. Each of these processing nodes has access to a storage 210. The ratio between the number of processing nodes that, during any one compute phase, are configured to perform load/unload operations with the storage and the number of processing nodes that, during the same compute phase, are configured to perform computations may take any value.

Figure 4:
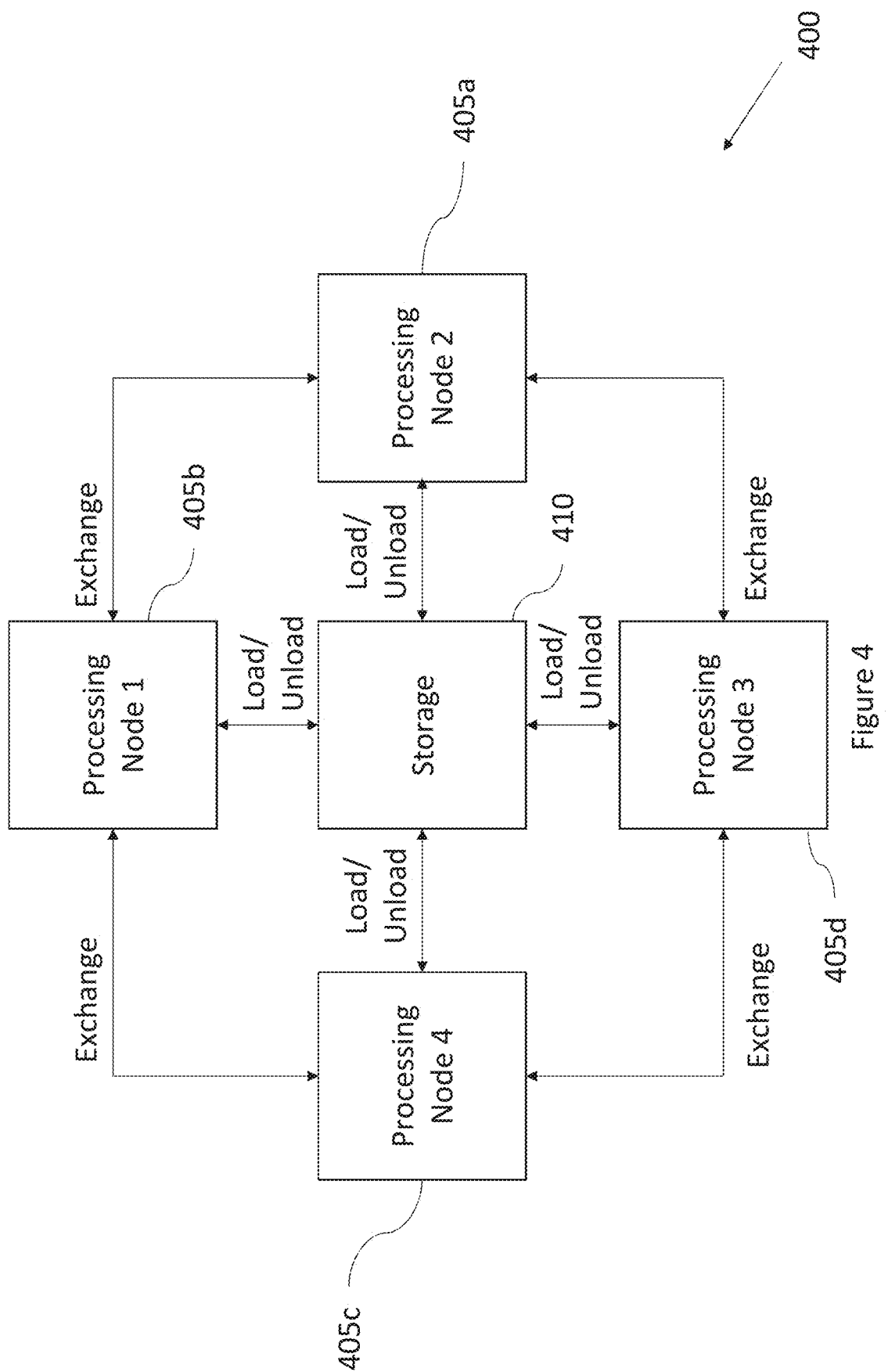
FIG. 4 illustrates an embodiment of a data processing system having four processing nodes.

Reference is made to FIG. 4, which illustrates a system 400 comprising four processing nodes 405a, 405b, 405c, 405d (collectively referred to herein as 'processing nodes 405'). Each of the processing nodes 405 has access to storage 410. Although storage 410 is shown as a single storage unit 410, in some embodiments, there may be multiple storage units that are part of storage 410, with different ones of the processing nodes having access to different storage units.

Together, the processing nodes 405 implement a multi-stage process. A stage of the multi-stage process produces results which are used to perform operations during a subsequent stage of the multi-stage process. During a given compute phase, each of the processing nodes is configured to either (i) perform computations associated with one of the stages or (ii) perform data load/unload operations to load data from storage 410 and/or unload data to storage 410. During a given inter-processing node exchange phase, relevant ones of the processing nodes 405 exchange results from the previous compute phase to enable one or more of the processing nodes 405 during the following compute phase to perform their calculations in dependence upon these results.

During each compute phase, at least one of the processing nodes 405 performs data load/unload operations so that data required for computation during future phases can be loaded from storage 410. Furthermore, having at least one of the processing nodes 405 perform data load/unload allows results from previous compute phases to be unloaded.

The system 400 shown in FIG. 4 may be used to perform parallel processing for different multi-stage processes. The different processes may involve the same calculations but using different input data. For example, the system 400 could be used to perform training or operation of multiple neural networks simultaneously.

Reference is made to FIG. 5, which illustrates an example of how the system 400 of processing nodes 405 operate to perform multiple multi-stage processes in parallel. The table 500 describes the operations performed by the four processing nodes 405 at each phase.

During each compute phase, one of the processing nodes 405 performs the data load/unload operations. The remaining processing nodes perform calculations associated with a stage in a multi-stage process. In this example, one processing node (processing node 1) is dedicated to perform the load/unload operations. However, in other examples, the processing node that performs the load/unload operations could be different for different compute phases. The multiple multi-stage processes are referred to as first, second, third and fourth multi-stage processes. However, it should be understood that these processes may be different instances of the same process. In other words, the type of calculations performed at corresponding stages of the different processes may be the same, but using different input data.

As shown, during the first compute phase, processing node 2 calculates the results for a first stage of a third multi-stage process. Also, during the first compute phase, processing node 3 calculates the results for a second stage of a second multi-stage process. Also, during the first compute phase, processing node 3 calculate the results for a third stage of a first multi-stage process. It should be understood that earlier stages would also be carried out to calculate the values necessary for the computing of the second and third stages by processing nodes 3 and 4, but that these are not shown in FIG. 5. Also, during the first compute phase, processing node 1 loads data required for performing calculations associated with the fourth stage.

During the first inter-processing node exchange phase, processing node 1 sends the data it loaded in the first compute phase to processing node 2. This data will be used by processing node 2 to perform the processing associated with the fourth stage of the first, second and third processes. During the first inter-processing node exchange phase, processing node 2 sends the results it calculated in the first compute phase to processing nodes 1 and 3, processing node 3 sends the results it calculated in the first compute phase to processing nodes 1 and 4, and processing node 4 sends the results it calculated in the first compute phase to processing nodes 1 and 2.

During the second compute phase, each of the processing nodes 2, 3, and 4 performs processing associated with a different process to the process for which it performed processing in the previous compute phase. Processing node 2 calculates the results for a fourth stage of the first process using the results received from processing node 4 and the data loaded by processing node 1. Processing node 3 calculates the results for a second stage of the third process. Processing node 3 calculate the results for a third stage of the second process. Also, during the second compute phase, processing node 1 loads data for performing calculations associated with the fifth stage. Processing node 1 also unloads to storage 410 the results it received from the other processing nodes in the first inter-processing node exchange phase.

During the second inter-processing node exchange phase, processing node 1 sends the data it loaded in the second compute phase to processing node 3. This data will be used by processing node 3 to perform the processing associated with the fifth stage of the first, second and third processes. Also, during the second inter-processing node exchange phase, processing node 2 sends the results it calculated in the second compute phase to processing nodes 1 and 3, processing node 3 sends the results it calculated in the second compute phase to processing nodes 1 and 4, and processing node 4 sends the results it calculated in the second compute phase to processing nodes 1 and 2.

During the third compute phase, each of the processing nodes 2, 3, and 4 performs processing associated with a different process to the process for which it performed processing in the previous compute phase. Processing node 2 calculates the results for a fourth stage of the second process using the results received from processing node 4. Processing node 3 calculates the results for a fifth stage of the first process using the results received from processing node 2 and using the data loaded by processing node 1. Also, during the third compute phase, processing node 1 loads data for performing calculations associated with the first stage. Processing node 1 also unloads to storage 410 the results it received from the other processing nodes in the second inter-processing node exchange phase.

During the third inter-processing node exchange phase, processing node 1 sends the data it loaded in the second compute phase to processing node 4. This data will be used by processing node 4 to perform the processing associated with the first stage of the fourth process. Also, during the third inter-processing node exchange phase, processing node 2 sends the results it calculated in the third compute phase to processing nodes 1 and 3, processing node 3 sends the results it calculated in the third compute phase to processing nodes 1, and processing node 4 sends the results it calculated in the second compute phase to processing nodes 1 and 2. Note that, in this case, processing node 3 does not send its results to processing node 4, since these are not required by processing node 4 to perform processing during the next compute phase.

The processing continues throughout as many processes as required.

By having a single processing node perform the necessary data load/unload operations during a given phase while the remaining processing nodes compute, a high amount of efficiency may be achieved since, during any given phase, a large proportion of processing nodes are engaged in compute operations. In addition to achieving efficiency when performing processing associated with a single multi-stage process, the techniques can also be applied to achieve efficiency when performing processing associated with a plurality of multi-stage processes.

The techniques described above with respect to FIGS. 2 and 4 may be applied to the training and operating of neural networks. In this case, the data that is loaded and/or unloaded from storage comprises one or more of: weights, activations, biases. These may be stored in the storage to be accessed when needed.

Neural networks are used in the field of machine learning and artificial intelligence. Neural networks comprise arrangements of sets of nodes which are interconnected by links and which interact with each other. The principles of neural networks in computing are based on information about how electrical stimuli convey information in the human brain. For this reason, the nodes are often referred to as neurons. They may also be referred to as vertices. The links are sometimes referred to as edges. The network can take input data and certain nodes of the network can perform operations on the data. The results of these operations are passed to other nodes. The output of each node is referred to as its activation or node value. Each link is associated with a weight. A weight defines the connectivity between nodes of the neural network. Many different techniques are known by which neural networks are capable of learning. The learning takes place by altering values of the weights.

Figure 6:
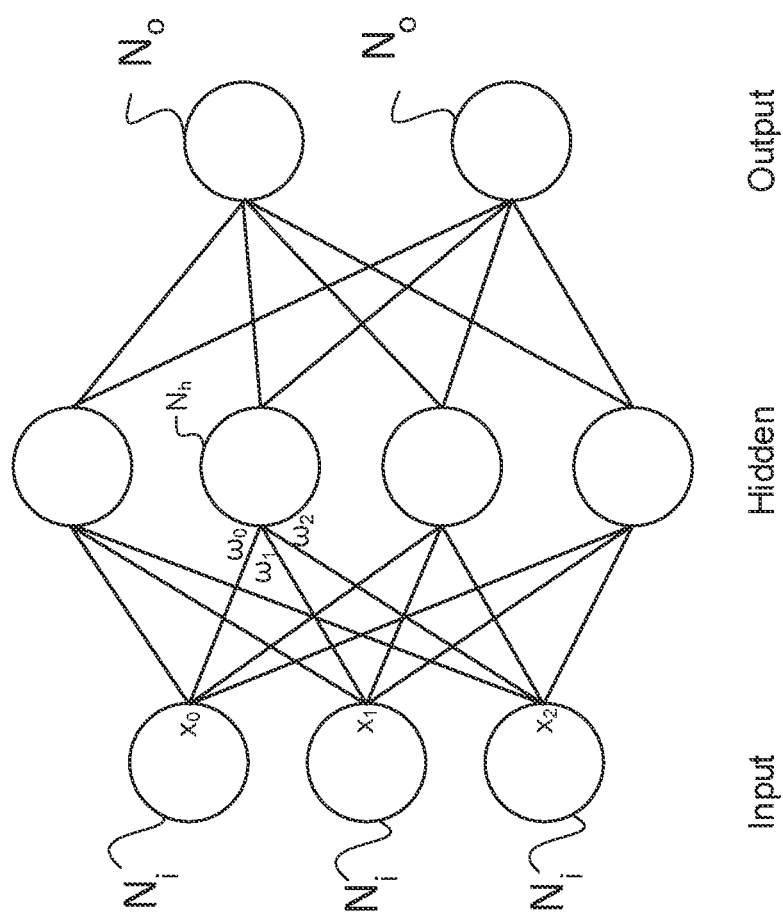
FIG. 6 illustrates a simplified example of a neural network.
Figure 6A:
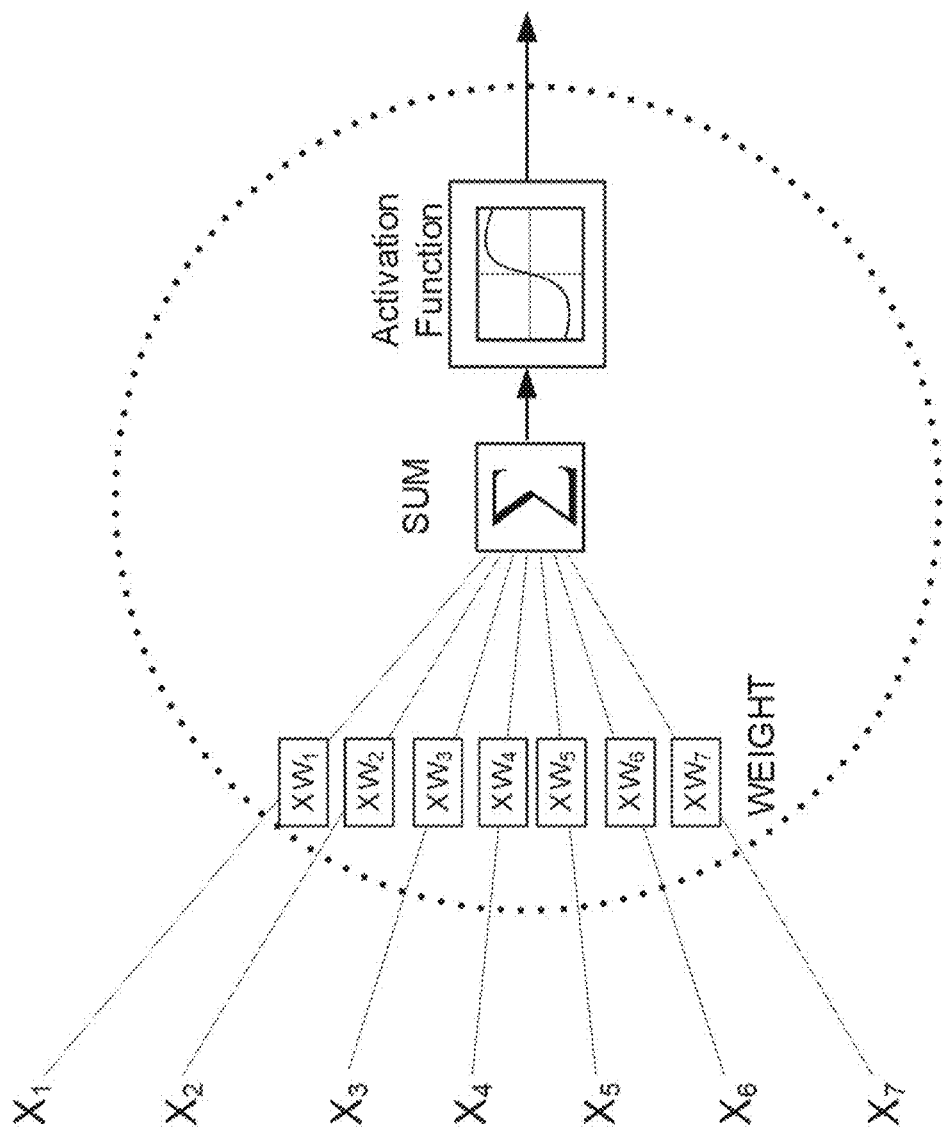
FIG. 6A illustrates an example of the calculation of the activation of a node in a neural network.

FIG. 6 shows an extremely simplified version of one arrangement of nodes in a neural network. This type of arrangement is often used in learning or training and comprises an input layer of nodes, a hidden layer of nodes and an output layer of nodes. In reality, there will be many nodes in each layer, and often more than one hidden layer. Networks may have millions of nodes and be connected multi-dimensionally. Each node of the input layer Ni is capable of producing at its output, an activation or node value which is generated by carrying out a function on data provided to that node. Each of the weights defines the connectivity of a particular node with a connected node in the hidden layer. A vector of node values output from the input layer is scaled by a matrix of respective weights to provide a set of input values for the nodes in the hidden layer. The weights applied to determine the inputs of the node $N_h$ are labelled $w_0 \ldots w_2$. After the matrix of weights is applied to the outputs of one layer, to determine the weighted incoming data for the next layer, each node in the next layer performs an activation function on the weighted incoming data. The activation function can be, for example, a sigmoid. See FIG. 6A. Each node in the input layer is connected, at least initially, to each node in the hidden layer. Each node in the hidden layer can perform an activation function on the data which is provided to it and can generate similarly an output vector which, after applying another matrix of weights, is supplied to each of the nodes No in the output layer. The nodes No in the output layer then apply an activation function to the incoming weighted data to determine the output values for the network.

There are different learning approaches, but in each case there is a forward propagation through the network from left to right in FIG. 6, a calculation of overall loss, and a backward propagation from right to left in FIG. 6 through the network of the loss. In the next cycle, each node takes into account the back propagated loss and produces a revised set of weights. In this way, the network can be trained to perform its desired operation. In addition to updating the weights, other model parameters, such as the biases that are applied at each of the nodes to calculate the activations may also be updated as part of the learning process.

As may be understood from FIG. 6, each of the layers in the neural network constitutes a stage, where (with the exception of the input layer) the processing associated with each of the stages depends on the output from the previous stage. Therefore, since the training and operating of a neural network comprises a plurality of stages, where each stage depends upon the results of the previous stage, embodiments can be applied to the training and operating of neural networks.

Figure 7:
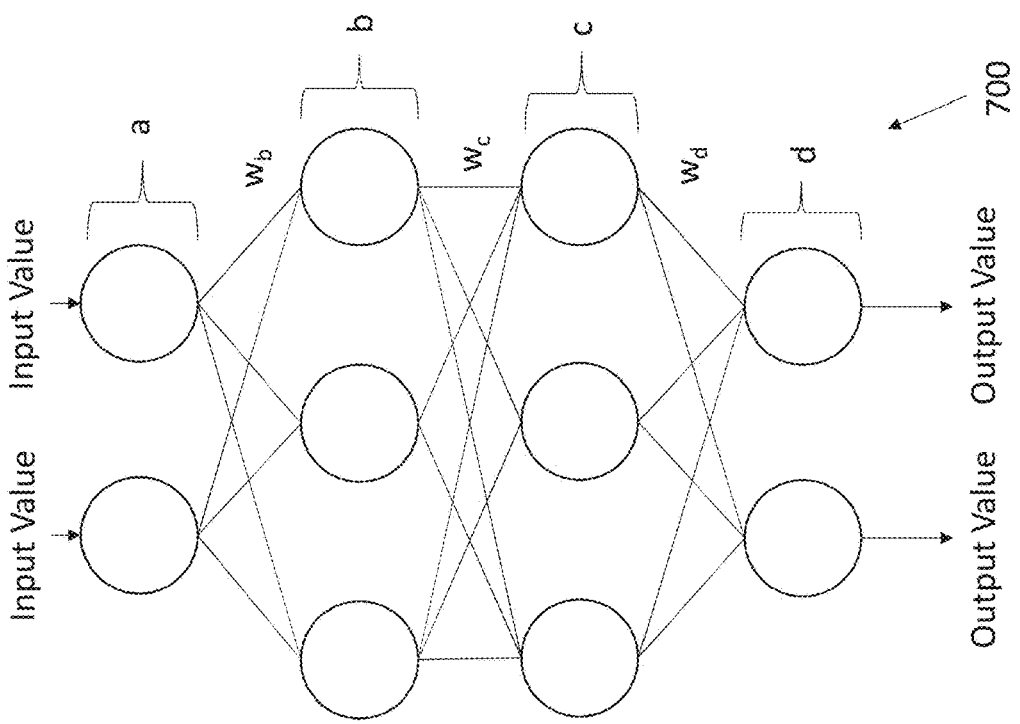
FIG. 7 illustrates an example of the tasks performed by each processing node in a two processing node system when running an example neural network in the case that the processing nodes swap roles.

Reference is made to FIG. 7, which illustrates how the system 200 shown in FIG. 2 may be applied when calculating an output from a neural network 700 given a particular input. As shown in FIG. 7, the neural network comprises a plurality of stages a, b, c, d. The neural network may comprise further stages not shown in FIG. 7. One of the processing nodes 205a, 205b must compute the activations (i.e. the outputs) from one stage, before the activations may be calculated for the following stage.

The table 720 comprises an indication of the processes performed by each of the processing nodes 205a, 205b when running the neural network 700. The operations indicated in the table 720 may constitute only part of the total processing performed when running the neural network, but provides an example of how the processing node system 200 shown in FIG. 2 may be applied to efficiently perform processing of such a neural network 700. In the first compute phase, the processing node 205a computes the activations for layer 'a' of the neural network. The activations of the layer 'a' may be determined in dependence upon input values for the neural network 700. The activations of layer 'a' may be determined in dependence upon activations from a previous layer of the neural network 700 (not shown), which were calculated in an earlier compute phase. Also, during the first compute phase, the second processing node 205b loads from storage 210 the weights, $W_b$. These weights $W_b$ are part of the data required by the second processing node 205b during the subsequent compute phase, since the second processing node 205b requires them to calculate the activations for layer b.

During the first inter-processing node exchange phase, the first processing node 205a sends the activations of layer a to the second processing node 205b. These activations are also data that is required by the second processing node 205b when calculating the activations of layer b.

During the second compute phase, the first processing node 205a unloads the activations of layer a to the storage 210. These activations are stored in the storage 210 so as to be available when needed for subsequent processing. For example, when training a neural network, the backpropagation that is used to adjust the weights of the neural network requires the activations that were calculated for the neural network 700. Therefore, by storing the activations in the storage 210, these may then be unloaded when backpropagation is carried out to adjust the weights. Also, during the second compute phase, the first processing node 205a loads the weights, We, as these will be required for use in calculating the activations for layer c. The processing node 205a may also load any biases for layer c from storage 210 that are required to calculate the activations of layer c.

During the second compute phase, the second processing node 205b computes the activations for layer b. The second processing node 205b computes the activations for layer b from the activations for layer a, which are received from the first processing node 205a during the first inter-processing node exchange phase, and the weights $w_b$ and biases that were loaded from storage 210 during the first compute phase.

During the second inter-processing node exchange phase, the second processing node 205b sends the activations of layer b to the first processing node 205a. These activations are required by the first processing node 205b when calculating the activations for layer c.

During the third compute phase, the first processing node 205a computes the activations for layer c. The first processing node 205a computes these activations in dependence upon the activations of layer b received from processing node 205b during the second inter-processing node exchange phase. The first processing node 205b also computes the activations for layer c in dependence upon the weights, We, and any biases, loaded from storage 210 during the second compute phase.

Also, during the third compute phase, the second processing node 205b loads the weights, $W_d$, from storage 210. The second processing node 205b also loads any biases for calculating the activations of layer d. Also during the third compute phase, the second processing node 205b unloads or deletes the weights, $W_b$, that were used to calculate the activations for layer b. Since these weights, $W_b$, are no longer required, the second processing node 205b removes them from memory to save space.

Also, during the third compute phase, the second processing node 205b unloads the activations of layer b to the storage 210. These activations are stored in the storage 210 so as to be available when needed for subsequent processing, e.g. when performing backpropagation.

The processing using system 200 may continue on in this manner through layers of the neural network, until a final output from the neural network 700 is obtained.

Therefore, the system 200 may enable more rapid running of a neural network for training or operating purposes, by having one of the processing nodes perform the processing to calculate activations for a layer during every compute phase.

In some embodiments, the system 200 may be applied in the manner shown in FIG. 2A to the training or operation of a neural network. This is shown in FIG. 7A, in which the first processing node is dedicated to computing activations, whilst the second processing node is dedicated to performing the preparation, including loading/unloading, operations. The operations performed by each of the processors is indicated in table 730.

The system 400 illustrated in FIG. 4 may also be used to perform processing (either operating or training) for a neural network.

Reference is made to FIG. 8, which illustrates an example table 800 illustrating operations that may be performed by each of the processing nodes 405 in system 400 when running a neural network. In this example, each of the different multi-stage processes discussed above with respect to FIG. 5 corresponds to the use of different sets of input data fed into the same neural network. Therefore, each multi-stage process is a single iteration of the neural network. Similarly as in FIGS. 7 and 7A, the results produced by each stage are activations, and the data that is loaded from storage in order to calculate activations includes weights. In FIG. 8, at compute stage 3, processing node 1 loads from storage, input data which is used for performing a fourth iteration of the neural network. This input data may be the same as the activations for layer 1, such that the processing node 4 does not modify this data.

It is noted that, in each of the examples above, during a particular compute phase, there is an N:1 ratio between processing nodes performing computations and processing nodes performing the data load/unload operations. However, in other embodiments, this ratio could be different. For example, during any given compute phase, there may be an N:M ratio between computing processors and loading/unloading processors, where N and M are any positive integers.

As has been seen above, different processing nodes in a system of processing nodes may be configured to perform the same operations on different sets of input data. When doing so, each processing node produces different results.

This may be referred to as data parallelism. In such a system, the results of the processing may be shared amongst the processing nodes, so that each processing node in the system has access to final results, which may represent an average of the results calculated by each processing node. One application of such a process is the training of a neural network, where each processing node in a group of processing nodes determines new values for weights for a particular layer during backpropagation based on a different set of training data. The updated weights (or weight updates) for each layer are then shared amongst the set of processing nodes, such that the benefits of distributed training may be had. Collectives are routines for sharing data that may be used to share the updated weights/weight updates between processing nodes.

Figure 14:
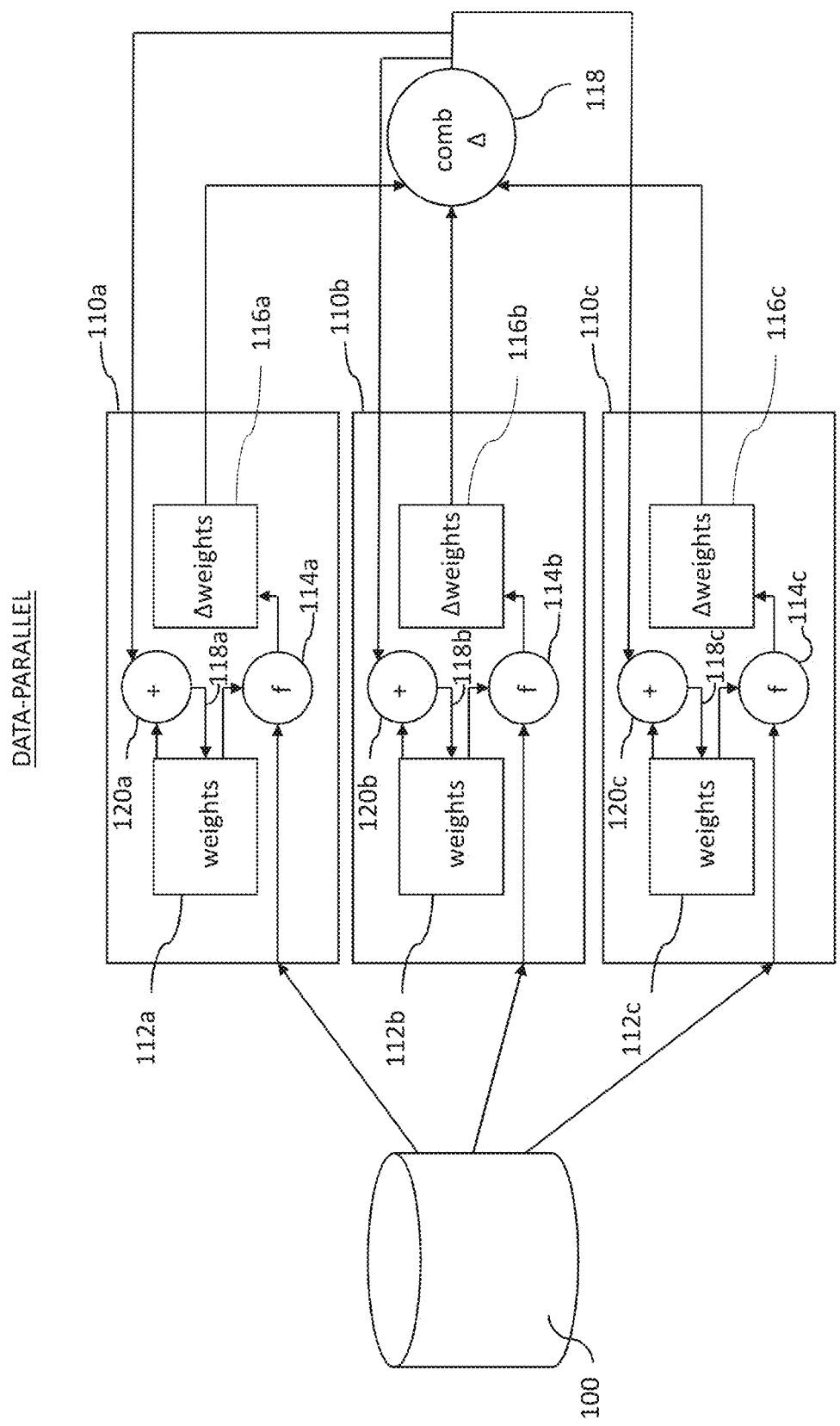
FIG. 14 is a schematic diagram illustrating distributed training of a neural net.

Reference is made to FIG. 14, which shows a schematic block diagram of a distributed architecture for training a neural network. A source of training data 100 is provided. This may be a database or any other kind of data store capable of holding training data applicable to the neural network model being trained. Processing according to the neural network model is itself distributed across multiple processing nodes 110a, 110b, 110c etc. Only three units are shown in FIG. 14, but it will readily be appreciated that any number of processing nodes could be utilised. Each processing node 110a, b, c receives batches of training data from the training data source 100. Each processing node 110a, b, c holds a set of parameters 112a, 112b, 112c which define the model. An incoming batch of training data is processed with a current set of parameters in a calculation function 114 and the results of the calculation function are used to generate so-called deltas which represent the difference between the original parameter and the new parameter as a result of applying the calculating function on the batch of training data and the current set of parameters. In many neural networks, these parameters are termed "weights" and so the delta values are termed "delta weights". The delta weights may otherwise be known as gradients. The weights are labelled 112a, b, c and the delta weights are labelled 116 a, b, c in FIG. 14. It will be appreciated that in practice, the weights and delta weights are stored in suitable stores accessible by the processing node. If the weights and delta weights can be held in local memory, this renders the training process much more efficient.

The aim with the architecture of FIG. 14 is not to train three separate models but to train a single model in a distributed manner Therefore, the purpose is to have the model parameters (or weights) converged to a single common set in each processing node. Starting from any particular set of weights, and assuming that the batch of training data received at each processing node is not identical, then there will be a variation in the delta weights which are produced by each calculation function in each processing node. What is needed, therefore, is a way to aggregate the delta weights across the processing nodes after each iteration of batched training data. This is shown diagrammatically in FIG. 14, where a combinational function 118 receives the delta weights from each processing node and performs a mathematical function which reduces the delta weights, such as a sum or averaging function.

The output of the combinatorial function 118 is then fed back to combining circuitry 120a, 120b and 120c within each processing node respectively. A new set of weights is thus produced as a combination of the original weights and the combined output from the combinatorial function 118, and the new weights 118a, 118b, 118c are stored back into local memory. Then, the next batch of training data is supplied to each processing node and the process repeats multiple times. If the starting weights of the processing nodes are the same, then after each iteration they will be updated to the same, new values in a consistent manner Delta weights are supplied to the combinatorial function 118 where they are reduced, and they are then supplied back to each of the processing nodes in their reduced form, where they can be combined with the original weights.

One way in which the exchange of data may be efficiently implemented between processing nodes is through the use of communication collectives, which are routines commonly used when processing data in a computer. They are routines which enable data to be shared and processed across multiple different processes, which may be running on the same processing node or different processing nodes. For example, if one process reads data from a data store it can use a "broadcast" process to share that data with other processes. Another example is when the result of a particular function is needed on multiple processes. A "reduction" is a result which has required the application of a compute function to a data value from each of multiple processes. "Gather" and "Scatter" collectives handle more than one data item. Certain collectives have become increasingly important in processing machine learning applications.

MPI (Message Passing Interface) is a message passing standard which can be applied to many parallel computing architectures. MPI defines a number of collectives applicable to machine learning. One such collective is termed "all-reduce". An all-reduce operation enables a result of a compute function acting on equally sized multiple data values from different source processes to be provided at a receiving process. Note that a receiving process may be one of the source processes, and that there may be multiple receiving processes. The all-reduce collective reduces the data values from multiple source processes and distributes the results to all the source processes, (which are acting as receiving processes for the reduced result). According to the MPI Standard, the all-reduce collective may be implemented by reducing the data values from all source processes in a reduce collective (e.g. at one of the processes) and then broadcasting the result to each source process.

Figure 14A:
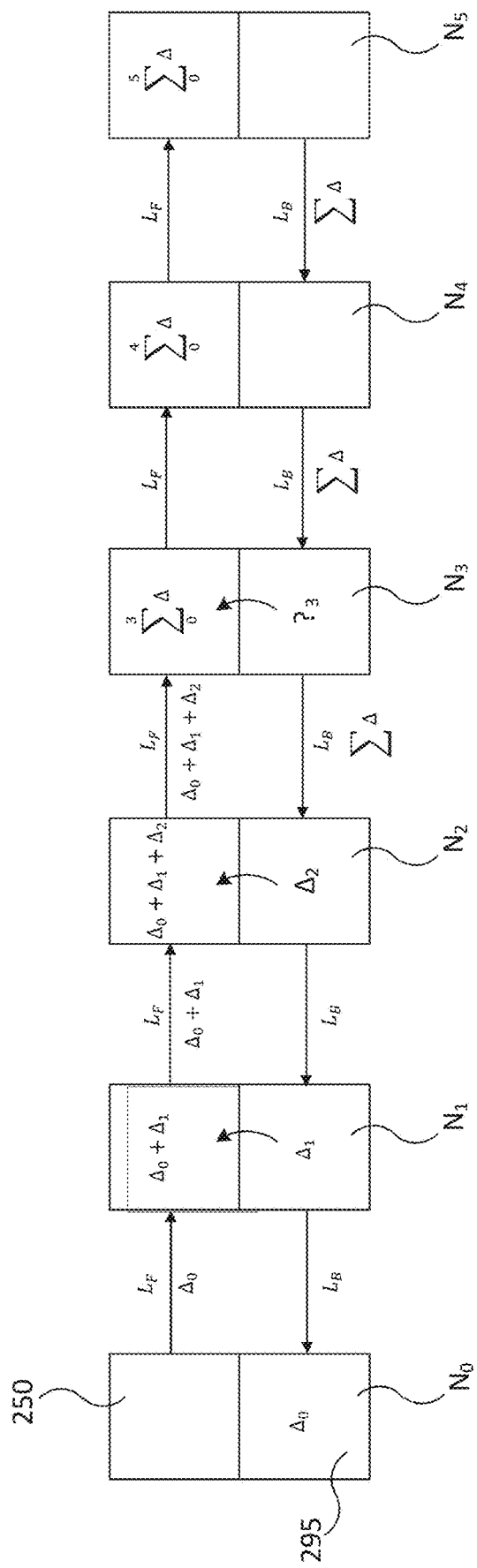
FIG. 14A is a schematic diagram showing a line of processing nodes for implementing a simple "streaming" line all-reduce algorithm.

FIG. 14A is a schematic diagram to illustrate how an all-reduce collective might be implemented in a line connected topology of five processing nodes $N_0 \ldots N_5$. These processing nodes may correspond to the processing nodes of FIG. 14 in which the combinational function is distributed. The processing nodes are shown connected in a line configuration where each processing node is connected to its neighbour by a "forwards" links LF and a "backwards" link LB. As shown in the diagram, and as the directional phrases imply, the forward links connect processing nodes from the left to right in FIG. 14A, and the backwards links connect processing nodes from the right to left in FIG. 14A. Each processing node has a processing capability designated 250, and a storage capability designated 275. Each processing node also has one or more link interface which enables it to be connected to its neighbouring processing node via the links LF/LB.

Furthermore, the backward links are not utilised for broadcast until the fully reduced result has been obtained at the end node. However, if the partial vectors are large, the head of the result will return to the starting node well before that node has finished sending its partial, so there is a substantial overlap of activity on all forward and backward links.

In a modification to this algorithm, which represents a small improvement, processing nodes at each end of the line can start to transmit their partials towards a central node, with the reduction being completed at the central nodes. In that case, the result is broadcast back to the end nodes when continued forwarded throughout to the end of the line. Note that in this scenario, there would be a reversal in the direction of movement, for example between nodes $N_2$ and $N_3$, and $N_3$ and $N_4$ on both the forward and backward links. If a line is closed into a ring (by connecting the final node $N_5$ to the first node No on both the backward and forward links), a pipeline algorithm can serialise reduction and broadcast in the same direction, so that the two logical rings formed by the bi-directional links can each operate independently on half of the data. See FIG. 14B That is, each partial is split into two parts. A first half $\Delta$ A is reduced on the forward links (as in FIG. 14A), and broadcast on the connecting leg between $N_5$ and $N_0$. The other half of the vector $\Delta$ B is reduced on the backward links, and then broadcast on the connecting ring of the backward links.

Using rings in two dimensions, an alternative approach is to implement Allreduce using a reduce-scatter collective followed by an Allgather collective. A paper authored by Jain and Sabharwal entitled "Optimal Bucket Algorithms for large MPI collectives on torus interconnects" (ICS' 10, June 2-4, Tsukuba) presents bucket based algorithms for Allgather, reduce-scatter and Allreduce collectives assuming bi-directional links between processing nodes in a torus interconnected processing node. This approach operates on the basis that there are multiple data values (fragments) to be handled in each step. In the reduce-scatter collective, each process starts with an initial partial vector. It is assumed that a reference here to a process is to a process carried out on a processing node. A partial vector can be divided into multiple elements or fragments. The corresponding elements of all processes are reduced and these reduced elements are then distributed across the processes. In the Allgather collective, every process receives all elements from all other processes. The reduce-scatter collective reduces all partials and stores each reduction on a respective node-see FIG. 15. The Allreduce collective operation can be implemented by performing a reduce-scatter collective followed by an Allgather collective operation.

Figure 15:
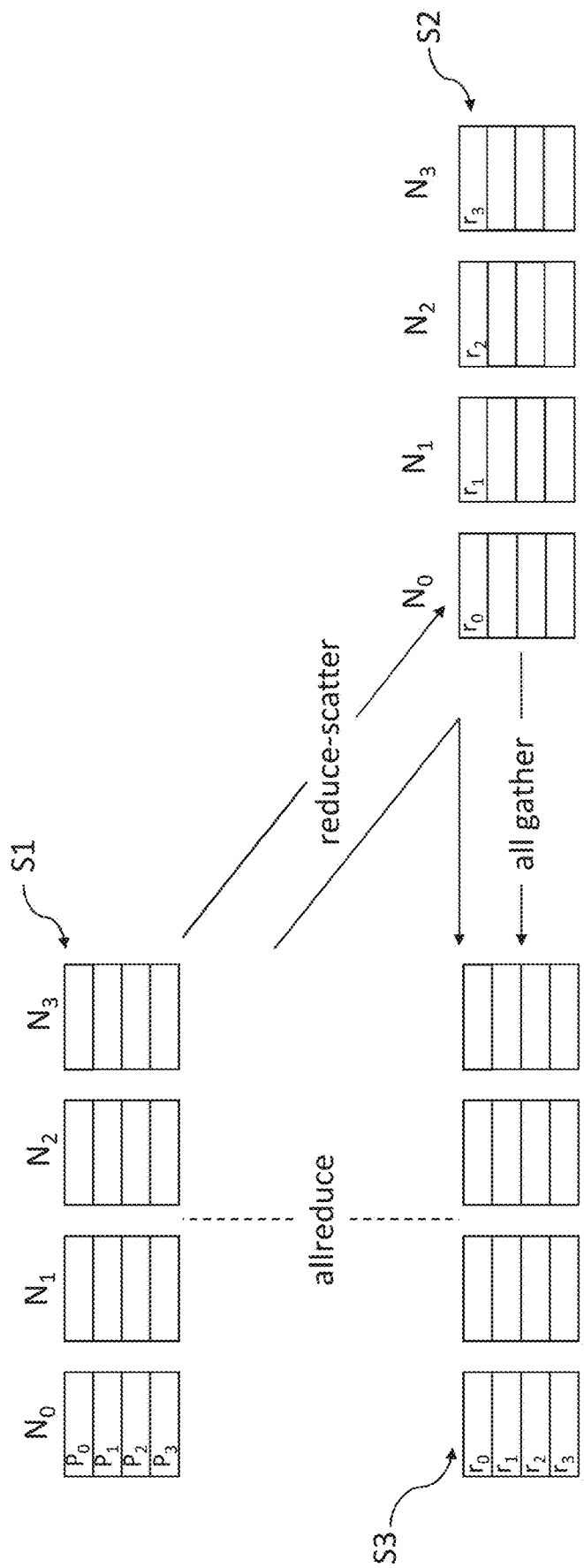
FIG. 15 is a schematic diagram illustrating the implementation of an all-reduce function involving a reduce-scatter step followed by an allgather step.

The all-reduce collective, which may be used to exchange the delta weights between processing nodes, is illustrated in FIG. 15. FIG. 15 shows a set (vector) of partial values or "partial" $P_0$, $P_1$, $P_2$, $P_3$ on each of four processing nodes in a starting state S1. In this context, a processing node is a processing node in a network of processing nodes. Note that each processing node $N_0$, $N_1$, $N_2$, $N_3$ has four "corresponding" partials $P_0$, $P_1$, $P_2$, and $P_3$. That is, each partial has a position in a vector such that $P_0(n)$ has the same position in its vector on processing node n as $P_0$ (n+1) in its vector on processing node n+1. The suffix (n) is used to denote the processing node in which the partial resides-thus $P_0(0)$ is the partial $P_0$ on processing node $N_0$. In a reduce-scatter pass, corresponding partials are reduced and the reduction provided to one of the processing nodes. For example, partials $P_0(0)$, $P_0(1)$, $P_0(2)$, $P_0(3)$ are reduced (to $r_0$) and placed onto processing node $N_0$. Similarly, partials $P_1(0)$, $P_1(1)$, $P_1(2)$ and $P_1(3)$ are reduced (to $r_1$) and placed onto processing node $N_1$. And so forth so that in an intermediate state S2, each processing node has one of the reductions $r_0$, $r_1$, $r_2$ and $r_3$. As explained, the reduction may be by any combinational function $f(P_{i_0}^3)$-which could include independent operators (e.g. max) or associative operators=$P_1(N_0)*P_1(N_1)*P_1(N_2)*P_1(N_3)$. Then, in an all-gather pass, each reduction is provided to all processing nodes to activate a state S3 wherein each processing node now holds all four reductions. Note that in S1, the "corresponding" partials, e.g. $P_0(0)$, $P_0(1)$, $P_0(2)$ and $P_0(3)$ may all differ whereas, in state S3, each reduction, e.g. $r_0$ is the same at all processing nodes, where $r_1=f\{(P_i(0), P_i(1), P_i(2) \text{ and } P_i(3))\}$. In machine learning, the set of partial values $P_0$, $P_1$, $P_2$, $P_3$ is a vector. A vector of partials (e.g. updated weights) is produced on each pass of the model during training. The reduction $r_0$, $r_1$, $r_2$, $r_3$ on each processing node in state S3 is the full reduction vector. In the context of machine learning, each partial could be a set of updating deltas for a parameter in the model. Alternatively (in an arrangement not described further herein) it could be an updated parameter.

Therefore, as noted an all-reduce operation consists of a reduce-scatter operation, followed by an all-gather operation. During the reduce-scatter operation, each node exchanges different elements of the partial. When the reduce-scatter is complete, all nodes have one nth of the final all-reduce. During the all-gather, each node receives an additional 1/n of the final all-reduce until, after n-1 steps, all of the nodes have the complete data set.

Figure 16A:
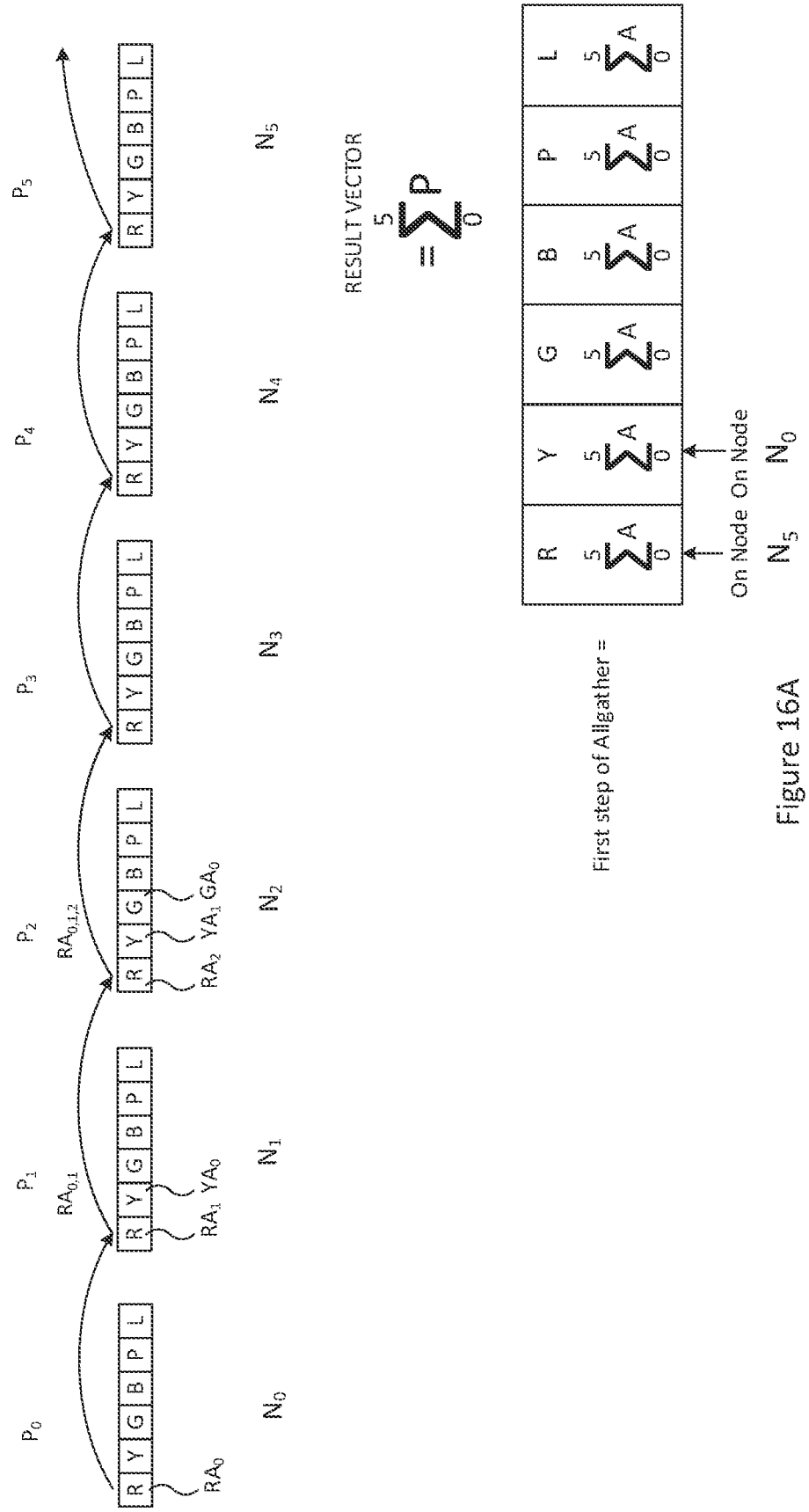
FIG. 16A is a schematic diagram of a stage of a reduce-scatter operation.
Figure 16B:
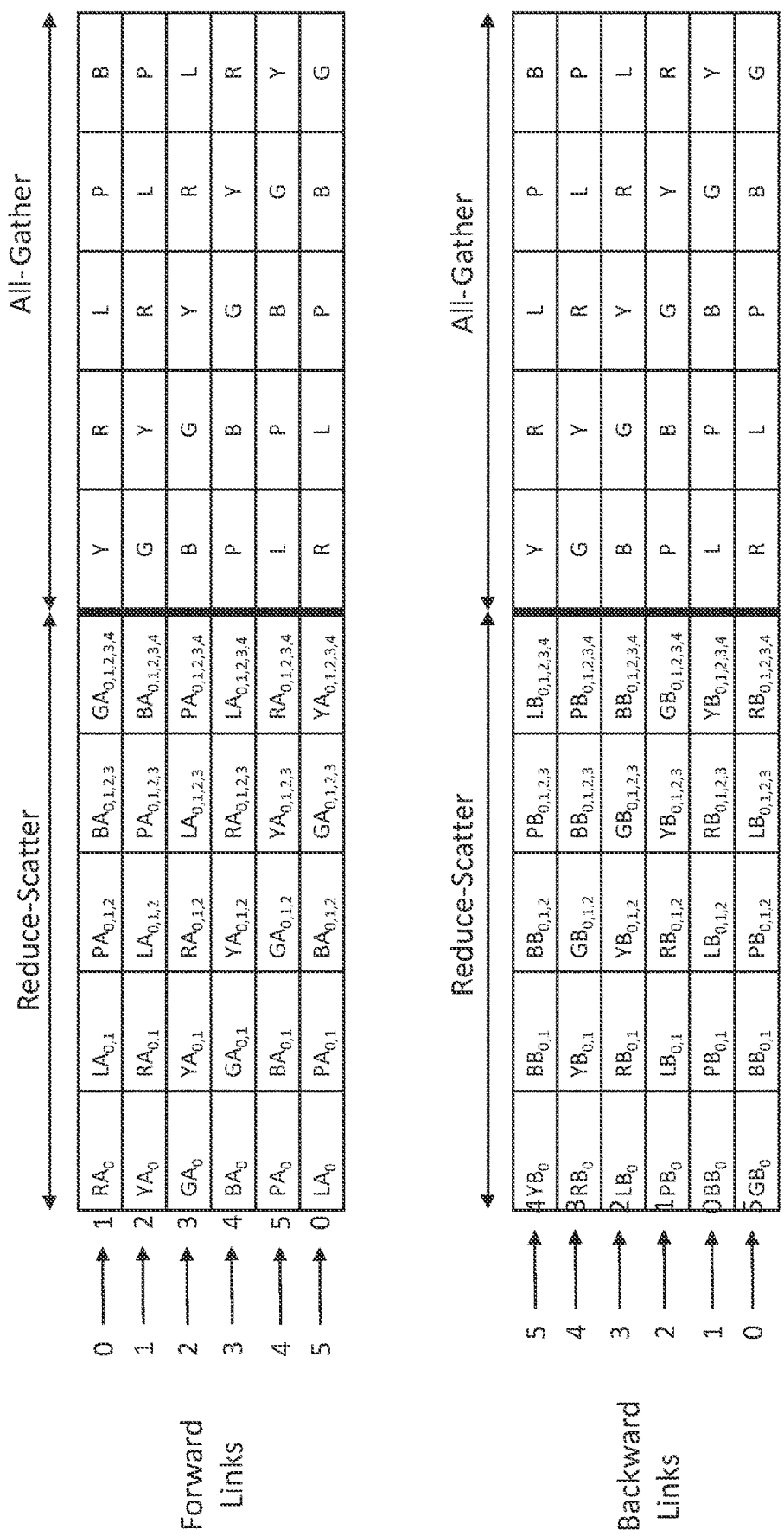
FIG. 16B is a schematic diagram showing timing of operations in an all-reduce operation.

FIGS. 16A and 16B illustrate an example of reduce-scatter/all-gather using six "virtual" ID rings. These are also termed "logical" rings herein. FIG. 16A is a schematic diagram illustrating the reduction of partials in multiple virtual rings. Each partial is split into six fragments. In FIG. 16A, the capital letters R, Y, G, B, P, L each denote a different fragment of a partial stored at each processing node. The letters denote corresponding fragments which are to be reduced with each other, and define the "virtual" or "logical" ring for those fragments. Looking at FIG. 16A, the "R" fragments in each of the partials $P_0$, $P_1$, $P_2$, $P_3$, $P_4$, and $P_5$ are reduced into a single fragment in the result vector ($R\Sigma A_0^5$). Similarly for the Y, G, B, P and L fragments.

FIG. 16B shows a timing diagram with time on the horizontal axis indicating the data exchanges and computations in each step of the all-reduce process. In FIGS. 16A and B, the all-reduce process is accomplished by a reduce-scatter phase followed by an all-gather phase.

The notation in FIGS. 16A and 16B is as follow. The partials are each denoted $P_0$, $P_1$, $P_2$, $P_3$, $P_4$, and $P_5$. At the start of the process, each partial is stored on a respective processing node $N_0$, $N_1$, $N_2$, $N_3$, $N_4$, $N_5$. Each fragment is labelled according to its fragment and its position in the virtual ring in which it is deemed to be reduced. For example, $RA_0$ denotes the R fragment in partial $P_0$, because this is the first fragment in a virtual ring formed by processing nodes $N_0$-$N_1$-$N_2$-$N_3$-$N_4$-$N_5$. $RA_1$ denotes the R fragment calculated at processing node $N_1$, which is in the second position in its virtual ring. $YA_0$ denotes the Y fragment calculated at processing node $N_1$. The "0" suffix indicates it is the first fragment in its virtual ring, the Y-ring being $N_1$-$N_2$-$N_3$-$N_4$-$N_5$-$N_0$. Note, in particular, that the suffixes on A reflect the virtual rings, and do not correspond to the physical processing nodes (or the partials). Note that FIG. 16A shows only the virtual rings on the forward links. FIG. 16B shows that an equivalent process is occurring on the backward links, with the fragments denoted as B.

In step one, the first fragment (the $A_0$) in each virtual ring is transferred from its processing node to the next adjacent processing node where it is reduced with the corresponding fragment at that processing node. That is, $RA_0$ moves from $N_0$ to $N_1$ where it is reduced with $RA_1$ to form $RA_{0,1}$. The notation 0, 1 indicates that the fragment is formed by the reduction of the first and second fragments in the virtual ring. Note that, in the same step, the $A_0$ fragments of each virtual ring are simultaneously transmitted. That is, the link between $N_1$ and $N_2$ is used to transmit $YA_0$, the link between $N_2$ and $N_3$ is used to transmit $GA_0$, et cetera. In the next step, the corresponding reduced fragments are transmitted over the forward links to their next adjacent processing node. For example, $RA_{0,1}$ is transmitted from $N_1$ to $N_2$, and $YA_{0,1}$ is transmitted from $N_2$ to $N_3$. Note that for reasons of clarity, not all fragments in FIG. 16A are numbered. The full set of fragments and numbers are shown in FIG. 16B. This process carries on for five steps. After five steps, there is a reduction of all fragments on each processing node. At the end of the fifth step, this reduction is on the last processing node of each corresponding ring for that fragment. For example the R reduction is on processing node $N_5$.

The beginning of the all-gather phase starts by a transmission from the last to the first processing node in each virtual ring. Thus, the final reduction for the R fragments ends on processing node $N_5$ ready for the first step of the all-gather phase. The final reduction of the Y fragments correspondingly ends up on the processing node $N_0$. In the next step of the all-gather phase, the reduced fragments are transmitted again to their next adjacent processing node. Thus the fully reduced R fragment is now also at $N_2$, the fully reduced Y fragment is now also at $N_3$ and so on. In this way, each processing node ends up at the end of the all-gather phase with all fully reduced fragments R, Y, G, B, P, L of the partial.

According to embodiments of a second implementation, a group of processing nodes may be applied to perform data parallel processing and to exchange the results of that processing in a new way. Each processing node in the group belongs to at least two different sets.

Figure 9:
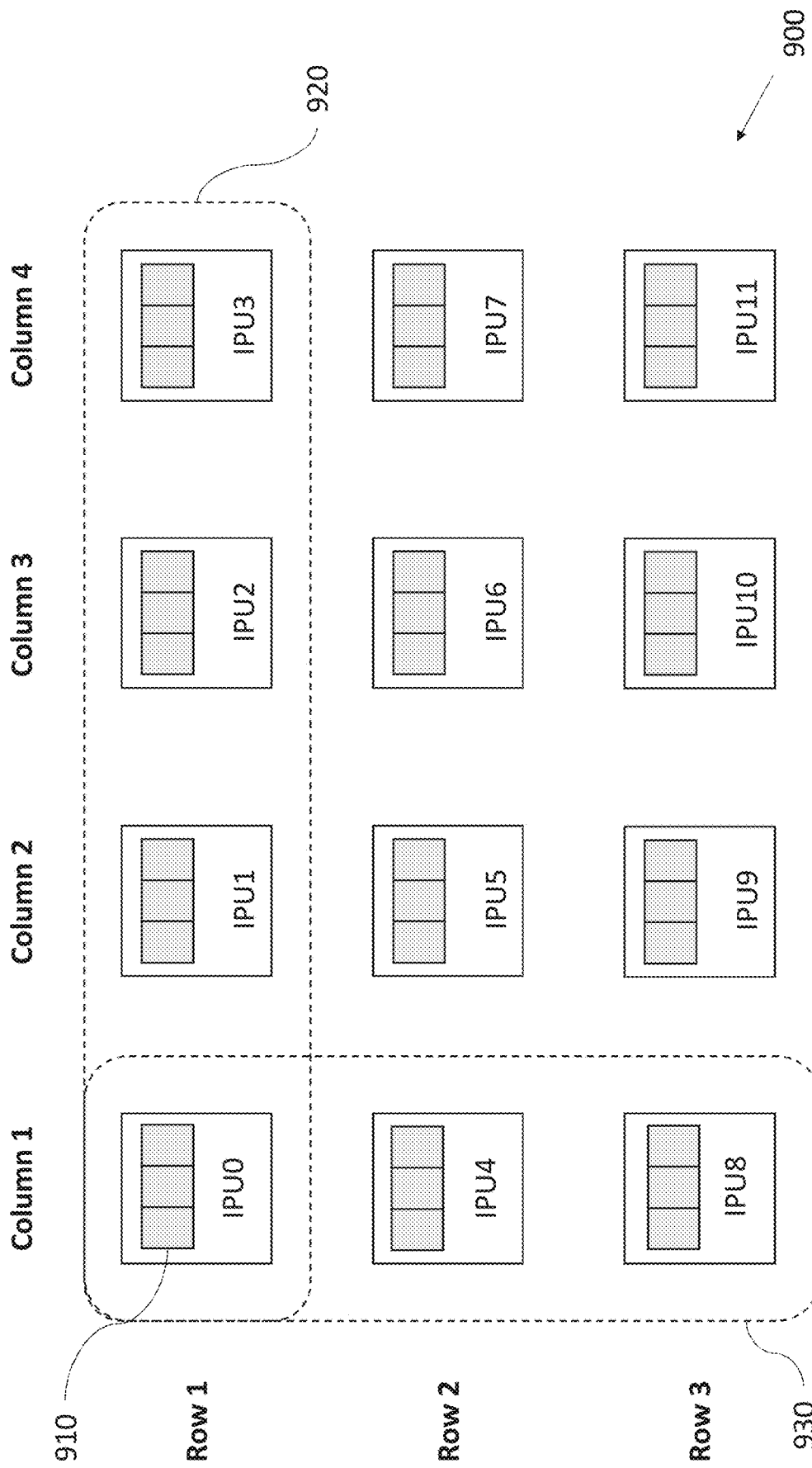
FIG. 9 illustrates an example of a processing node system arranged into different sets for performing collective operations.

Reference is made to FIG. 9, which illustrates an example of a group 900 of processing nodes, in which each of the processing nodes in the group 900 belongs to two sets of processing nodes, which in this example are shown as rows and columns. For example, IPU0 belongs to row 1 (a first set 920) and column 1 (a second set 930). Although in FIG. 9, the sets to which each processing node belongs are shown as rows and columns, in other embodiments, the group 900 need not be physically arranged in such a grid format, and the physical arrangement of nodes could be different. Each of the processing nodes is shown as an IPU, but the invention is not so limited.

Each of the processing nodes in FIG. 9, is configured to calculate a different output array of data based on a different set of input data provided to it. Each of the output arrays of data is shown in FIG. 9. For example, the processing node, IPU0, stores array 910. In a machine learning context, each set of input data may be a different set of training data and each array of output data may be a different set of updated weights or a different set of delta weights that are produced when performing training using the training data.

The collective operations that are performed to exchange the output arrays such that a single output array dependent upon each of the individually calculated output arrays is present on each processing node may be understood to involve three steps.

Figure 9A:
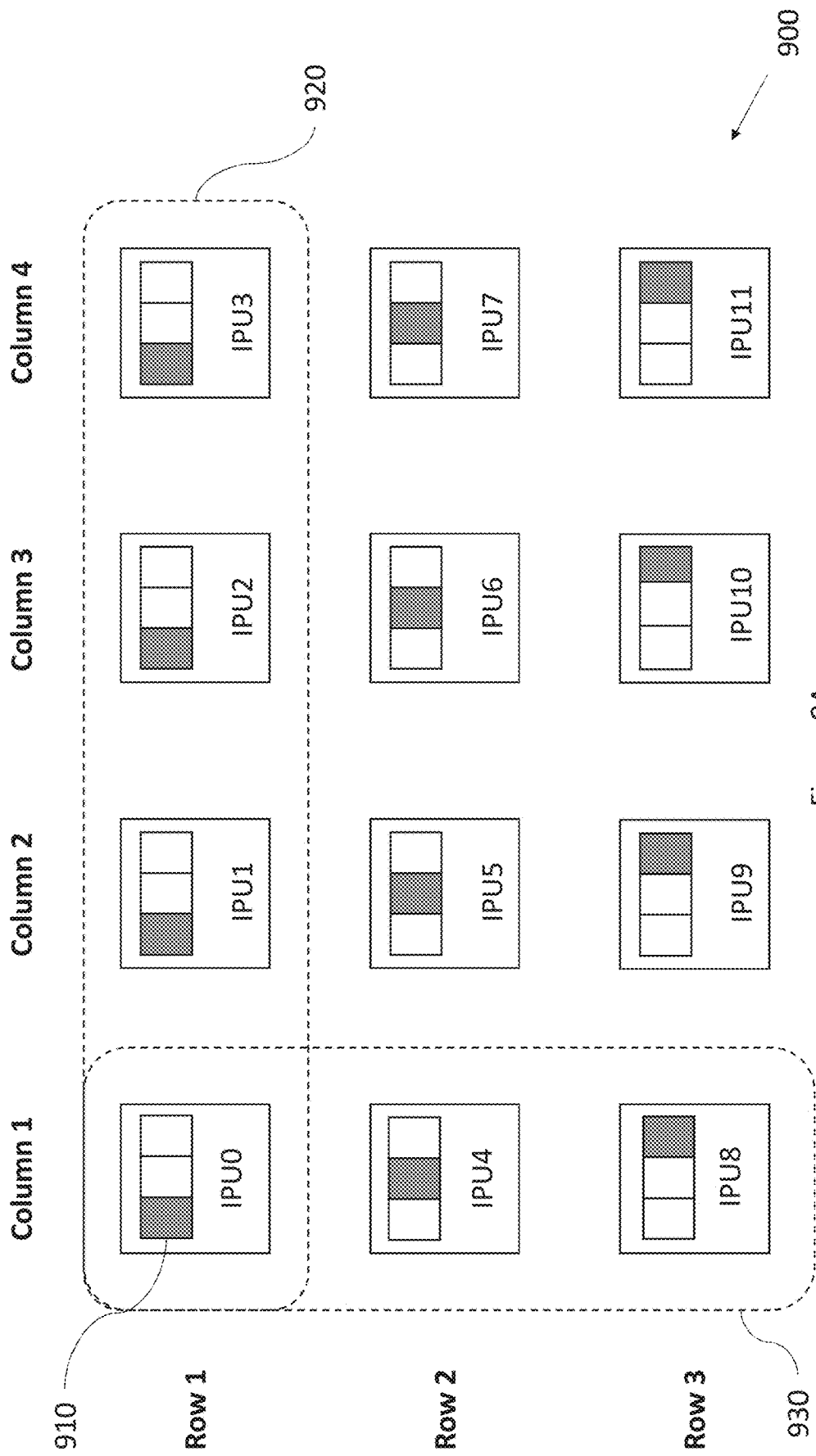
FIG. 9A illustrates the processing node system after reduce-scatter operations have been performed.

As a first step, in each column, a reduce-scatter operation is performed between each of the processing nodes in that column. FIG. 9A illustrates the resulting group 900 after the reduce-scatter operations have been performed. As shown, after performing the reduce-scatter operation, each of the processing nodes in a particular column ends up with reduced values for a subset of the array. In each column, each processing node in that column stores a subset of values at different positions in the array. In each row, each processing node in that row stores a subset of values at the same positions in the array.

Figure 9B:
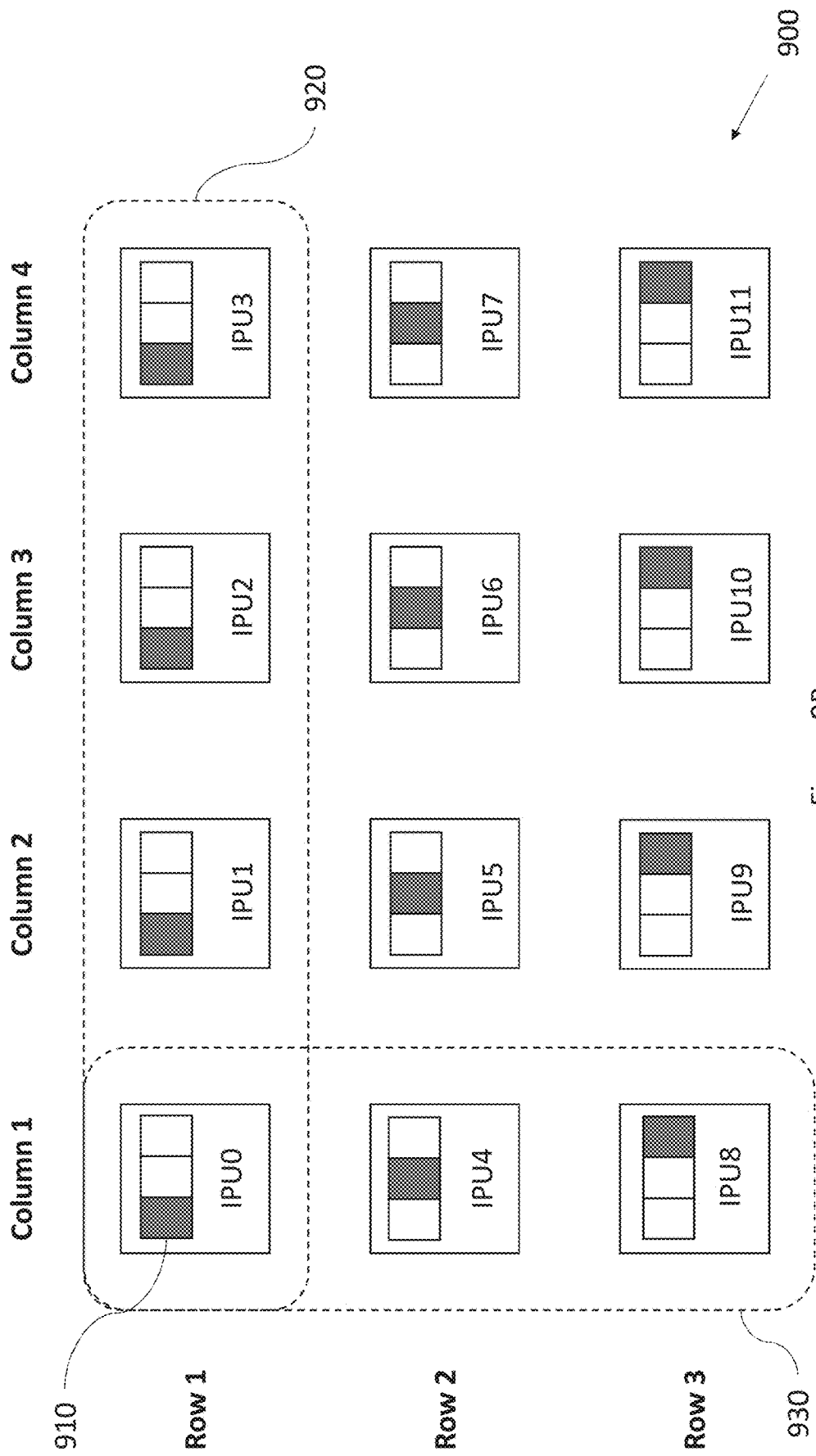
FIG. 9B illustrates the processing node system after an all-reduce has been performed.

As a second step, in each row, an all-reduce operation is performed between each of the processing nodes in that row. Since, following the first step, each of the processing nodes in a given row contains only a subset of values for the whole array, the all-reduce operation that is performed in a given row is performed using only each subset of array values for that row. The result of the all-reduce operation is shown in FIG. 9B. After performing the all-reduce operation, in each row, each processing node of the respective row has the same subset of values.

Figure 9C:
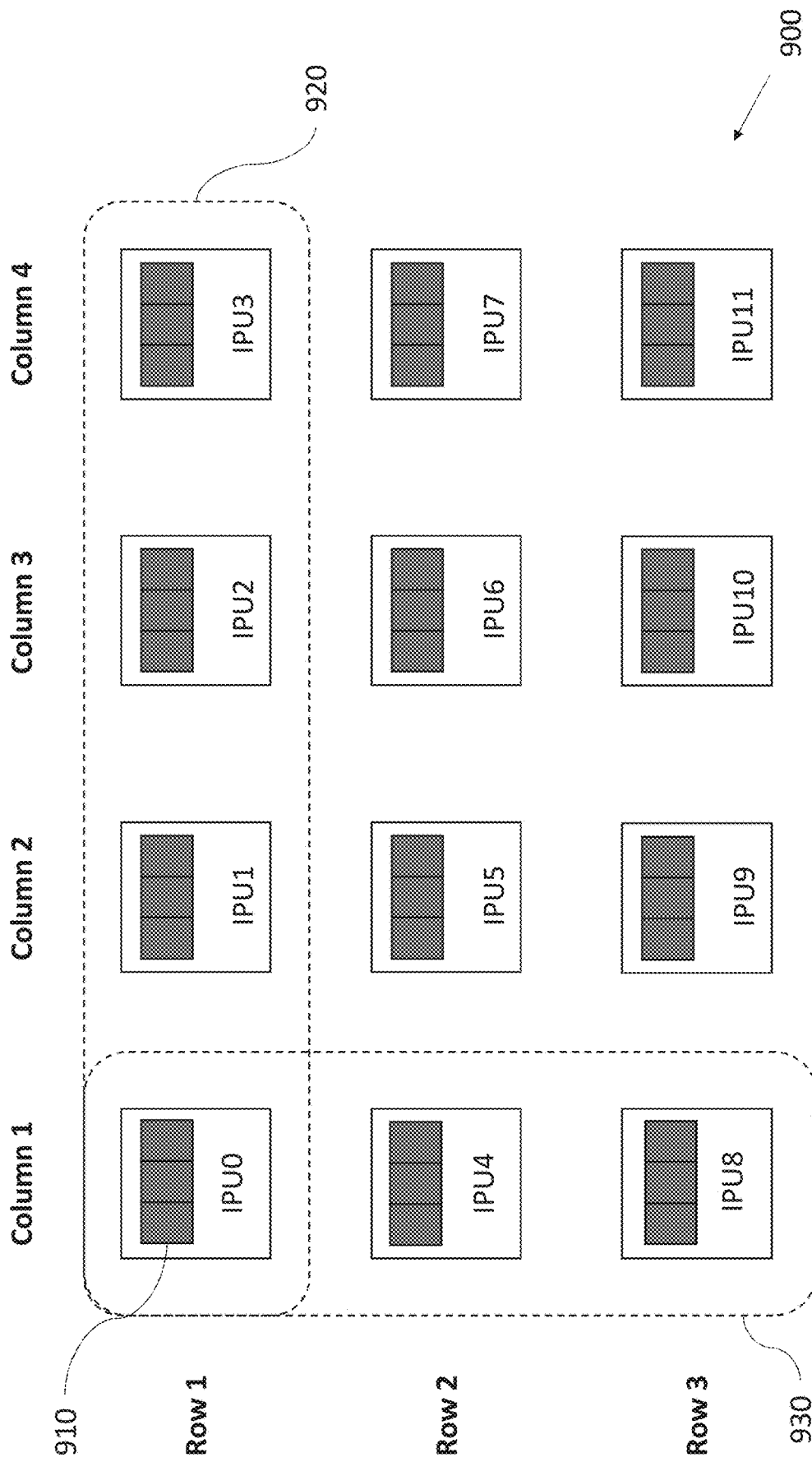
FIG. 9C illustrates the processing node system after all-gather operations have been performed.

As a third step, in each column, an all-gather operation is performed between each of the processing nodes in the respective column. The result of the all-gather operation is shown in FIG. 9C. After performing the all-gather operation, each processing node in the group 900 has the same set of data in its array.

The example illustrated by FIGS. 9 to 9C illustrates this principle in only two dimensions. In other words, each of the processing nodes belongs to only two sets of processing nodes.

However, in other embodiments, each of the processing nodes belongs to more than two sets of processing nodes.

Therefore, more generally each processing node takes part in a series of one or more reduce-scatter collectives, in which each reduce-scatter collective is performed between a different set of processing nodes to which the respective processing node belongs. For any given processing node in the system, that processing node is the only processing node that is common to the sets to which it belongs. All of the other processing nodes that belong to the sets for a given processing node appear no more than once.

Following the one or more reduce-scatter collectives, each processing node participates in an all-reduce collective. All-reduce collectives are performed between processing nodes of further sets. Each of the further sets is different to the different sets used for the reduce-scatter collectives. For any given processing node, each of the nodes in the further set for that processing node do not belong to one of the different sets for that processing node used for the reduce-scatter collectives.

Following the all-reduce, each processing node takes part in a series of one or more all-gather collectives. The number of all-gather collectives is the same as the number of reduce-scatter collectives. Each of the all-gather collectives is performed using the same sets used for the reduce-scatter collectives. The order of use of sets for the reduce-scatter and all-gather is reversed. For example, for a given processing node, if that processing nodes takes part in reduce-scatter collectives for a first, second and third set of processing nodes in that order, when performing the all-gather collectives, the same processing node takes part in all-gather collectives for the third, second, and first set of processing nodes in that order.

One way of describing the above scheme is to consider all of the processing nodes in the system as being arranged in a multi-dimensional grid. A 2D example of this is shown in FIGS. 9 to 9C. However, a greater number of dimensions is possible. It is understood that the processing nodes need not be physically arranged in such a multi-dimensional grid, but that such a grid is useful visualisation for understanding how the collectives are performed. In a grid having n dimensions, reduce-scatter collectives are performed for each line of processing nodes across the first n-1 of the dimensions, with the reduce-scatter collectives being performed for each dimension in turn. An all-reduce collective is then performed for each of the lines of processing nodes in the nth dimension. The all-gather collectives are then performed for each line of processing nodes across the first n-1 dimensions, with the order of the dimensions for which all-gather collectives are performed being reversed with respect to the order of the dimensions for the reduce-scatter collectives.

The new collective scheme is implemented in one or more inter-processing node exchange phases for the system of processing nodes. These one or more exchange phases begin following a pre-compiled synchronisation barrier between the processing nodes in the system. The pre-compiled synchronisation barrier separates these one or more exchange phases from a preceding compute phase.

According to embodiments of a third implementation, when a plurality of processing nodes are applied to perform parallel processing to update a model, a new method is provided for the update of the model without requiring each processing node to independently update the entire model. This reduces the amount of processing required to update the model and, furthermore, reduces the amount of memory required by the process of updating the model in the parallel processing system.

Figure 17A:
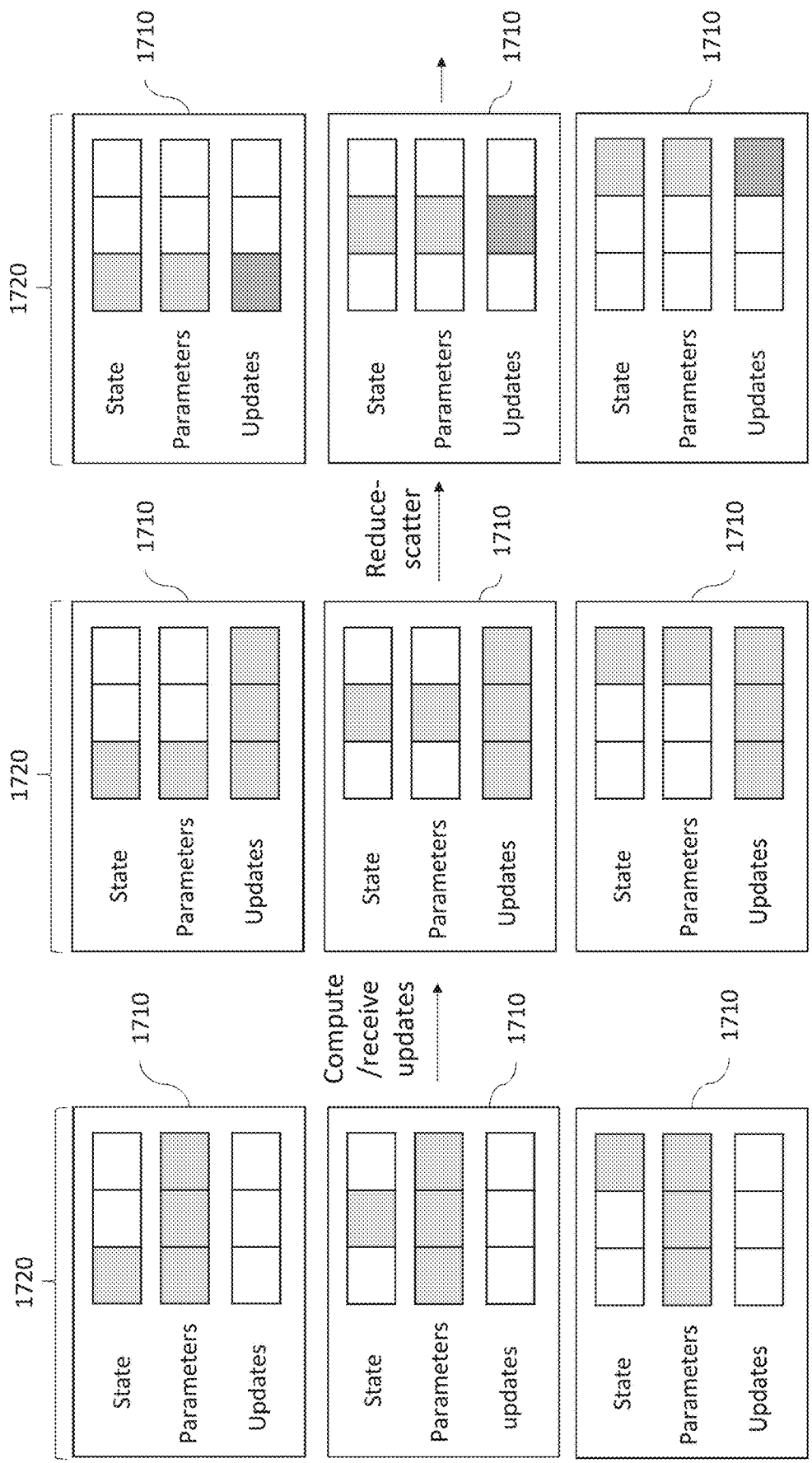
FIG. 17A is a schematic diagram of a system, where the diagram illustrates a process for updating model parameters.
Figure 17B:
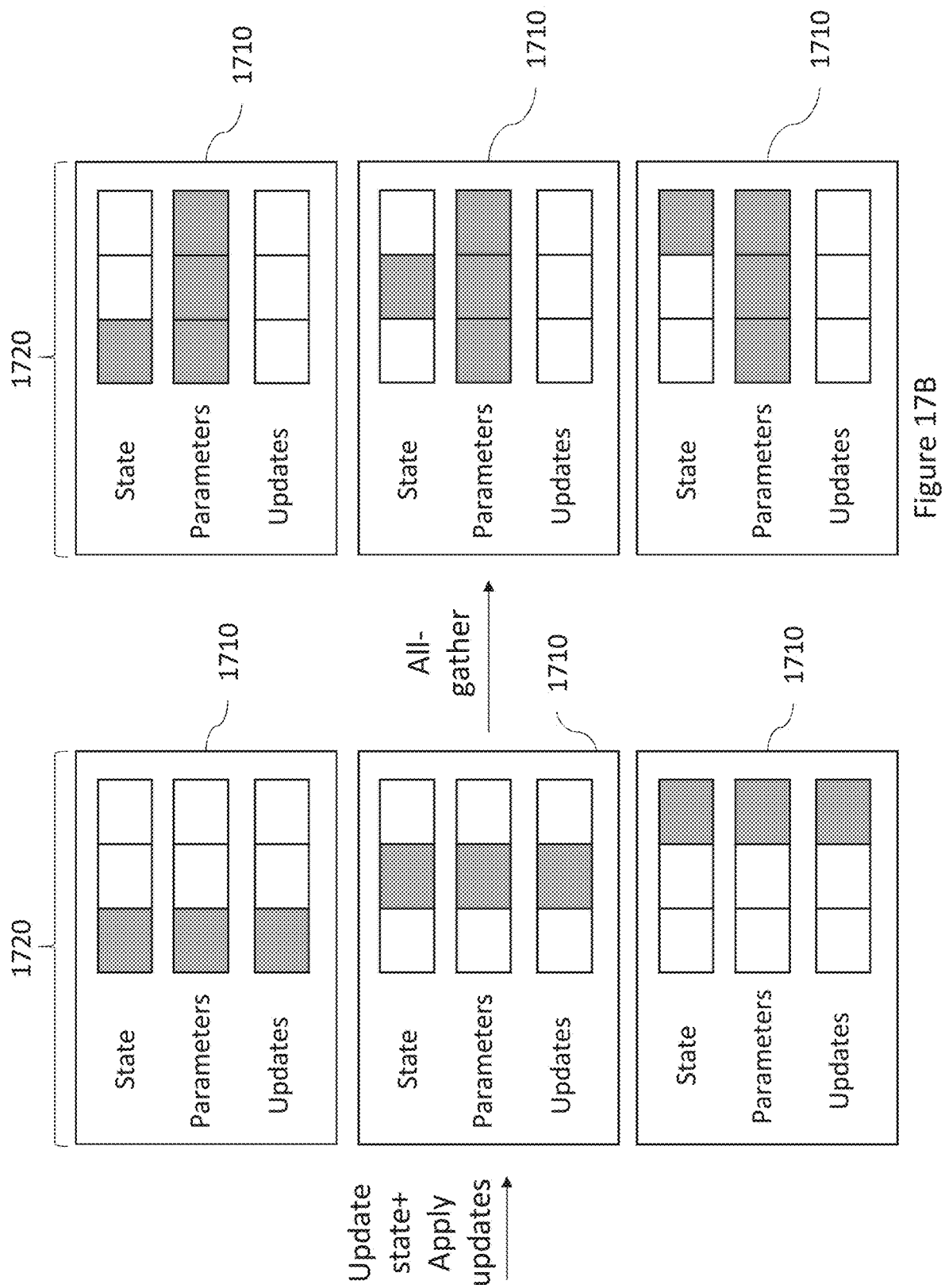
FIG. 17B is a schematic diagram of a system, where the diagram illustrates a process for updating model parameters

Reference is made to FIGS. 17A and 17B, which illustrate the exchange and update of data over time for a system 1720 of processing nodes 1710. The processing nodes 1710 of the system 1720 are shown arranged in a column. The system 1720 is shown multiple times in the Figures, with each instance of the system 1720 showing how the data stored in the memory of the data processing nodes 1710 changes over the process of updating the model.

Firstly, each of the processing nodes 1710 has to obtain a full set of updates to the parameters. Each set of updates is obtained using a different set of input data. In some embodiments, using a set of input data and the stored parameters, each of the processing nodes 1710 calculates a set of updates for the model. In this case, each processing node 1710 stores the same full set of model parameters and uses a different set of input data with those model parameters to derive a different set of updates. In other embodiments, the processing nodes 1710 receive the set of updates for the model from other processing nodes that determine the updates from the model parameters. In some embodiments, a hybrid of these may be performed, wherein each processing node 1710 derives some of the updates and receives others of the updates from another processing node 1710.

At the next stage shown in FIG. 17A, each of the processing nodes 1710 stores a full set of updates for the parameters. The updates stored by each processing node 1710 comprise an update for each of the parameters. The processing node 1710 does not need to store the full set of parameters. Instead, each processing node 1710 stores only the parameters it will update. If the processing node 1710 stores any other parameters, these may be deleted or unloaded to storage.

A reduce-scatter collective is then performed between each of the processing nodes 1710 so as to exchange the updates between the processing nodes 1710. As may be understood from FIGS. 15, 16A, and 16B— which describe the all-reduce collective—the reduce-scatter involves exchanging and reducing the updates such that, following the reduce-scatter, each processing node 1710 has a subset of the full set of reduced updates. The updates held by any one of the processing nodes 1710 following the reduce-scatter comprise updates to only a portion of the parameters held by each processing node 1710, with each processing node 1710 holding updates to a different portion of the parameters held by the processing nodes 1710.

Following the reduce-scatter, each processing node 1710 of the system 1720 of processing nodes 1710 applies the updates it has derived to the parameters to derive updated parameters. The result of this process is shown in FIG. 17B. As seen, since each processing node 1710 stores updates for only a portion of the parameters, and each processing node 1710 therefore only updates the corresponding portion of the parameters. However, between the processing nodes 1710, the full set of updated parameters is derived. Following the update of the parameters, the parameter updates are no longer needed and may be deleted or offloaded from the nodes 1710.

Following the calculation of the updated parameters, an all-gather is carried out between processing nodes 1710 of the system 1720, so as to share the updated parameters between the processing nodes 1710. As may be understood from FIGS. 15, 16A, and 16B— which describe the all-reduce collective—the effect of the all-gather is to distribute the updated parameters such that following the all-gather, each of the processing nodes 1710 stores the full set of updated parameters.

Embodiments of the third implementation, therefore, have the advantage that it is not required for every processor to independently update each of the model parameters, but rather, the updating of the model can be performed in a distributed fashion.

As is shown in FIGS. 17A and 17B, in some embodiments, each of the nodes 1710 may also store additional information-referred to as state information-that is used for updating certain parameters. Each set of state of information is held and updated by one of the nodes 1710 in the system 1720 and is used to update an associated portion of the parameters. Unlike the updates, each set of state information is derived and updated independently of the other sets of state information. In other words, each processing node 1710 maintains only a portion of the total state information, i.e. the portion of the state information that is used by that node 1710 to update the parameters during the parameter update step.

As shown in FIG. 17A, initially, each processing node 1710 stores a subset of the total state. Between them, the processing nodes 1710 store the entire state used for updating the entire set of parameters. The state remains unused and unchanged throughout the determination of the updates and the reduce-scatter of the updates. Following the reduce-scatter, each processing node 1710 updates its respective state, and the uses its respective updated state, along with the updates it received following the reduce-scatter, to update a portion of the parameters as shown in FIG. 17B.

Therefore, in embodiments in which state information is used, each processing node 1710 only needs to maintain a portion of the total state. It is not necessary for each processing node 1710 to maintain the entire set of state so as to update all of the parameters, which would be burdensome on the storage space and processing resources of the nodes 1710.

In some embodiments, the new method for updating a model in a parallel system may be applied to train a neural network. In this case, the parameters that are updated are parameters-i.e. weights and, optionally, biases—of the neural network. The updates are gradients of the neural network that are derived during the backpropagation stage of training.

In the neural network example, each of the processing nodes 1710 uses the parameters of the neural network along with training data to determine one or more output values of the neural network. These output values are compared to labels of the neural network to determine an error or loss associated with the training data and current parameters. The error or loss is used in a backpropagation process to determine a set of gradients. Since each processing node 1710 in the neural network uses a different set of training data with the same parameters, each node 1710 derives a different set of gradients.

Following the calculation of the sets of gradients, each processing node 1710 in the system 1720 is configured to participate in the reduce-scatter collective so as to exchange the gradients. Following this, each processing node 1710 has a subset of the reduced gradients that result from the reduce-scatter. Each processing node 1710 then applies its subset of reduced gradients to update a corresponding portion of the parameters. Following the parameter updates, an all-gather is performed so that each processing node 1710 ends up with the full set of updated parameters for the neural network.

The training of the neural network is performed by system 1720 in a plurality of training iterations, where the process illustrated by FIGS. 17A and 17B illustrates a single training iteration for the neural network. Following the final state shown in FIG. 17B, each processing node 1710 would use a new set of training data and the updated parameters to again derive a new set of gradients to be applied to again update the parameters.

The update of the parameters of the neural network is referred to as the 'optimisation step'. The optimisation step may be performed in different ways. Some types of optimisation, such as stochastic gradient descent are stateless. In this case, the changes applied to the model parameters are equal to the value of the gradients. In this case, at each processing node 1710, the updated weights for the neural network are calculated as:

$$W_{i+1} = W_i + G_{i+1} \qquad \text{Equation 1}$$

where $W_i$ are the weights following the ith training iteration, $W_{i+1}$ is the are the weights following the i+1th training iteration, and $\Delta W_{i+1}$ are the gradients derived during the i+1th training iteration.

Other types of optimisation are statefull. With statefull optimisation, state is maintained for each weight in the neural network and is used, along with the gradients, to determine how each weight is updated. Each node 1710 stores and maintains the state for each weight that it is dedicated to update. The state may represent a learning rate, which controls how much the gradients affect the neural network weights.

One type of statefull optimisation is known as 'Adam'. Adam uses two state parameters, represented as V and S, to modulate the learning rate throughout the training process. These parameters are updated at every optimisation step and used to update the parameters of the neural network. At each optimisation step, the value of state V for a weight, is updated using the previous value of $V_i$ as:

$$V_{i+1} = B_1 * V_i - (1 - B_1) * G \qquad \text{Equation 2}$$

where $B_1$ is a hyperparameter, and G is the gradient associated with the same weight.

Similarly, at each optimisation step, the value of state S for a weight, is updated using the previous value of $S_i$ as:

$$S_{i+1} = B_2 * S_i - (1 - B_2) * G^2 \qquad \text{Equation 3}$$

where $B_2$ is a hyperparameter, and G is the gradient associated with the same weight.

Once the state values, S and V, have been updated using the newly determined gradients, they are applied to determine the new weight. Using the state information and the gradient, an updated weight is calculated as:

$$W_{i+1} = W_i - \frac{G * \eta * V_{i+1}}{\sqrt{\varepsilon + S_{i+1}}} \quad \text{Equation 4}$$

where η and ε are hyperparameters.

Following the reduce-scatter, each processing node 1710 in the system 1720 may apply the equations 2 and 3 to update the state values associated with the weight that it is assigned to update. Having updated the state values, each node 1710 then updates those weights using the updated state according to equation 4.

It would be appreciated by the skilled person that these optimisation steps described are examples and that other types of stateless and statefull optimisation algorithms may be used.

The above described concepts are capable of combination. For example, the second implementation and third implementation may be combined. In this case, instead of a single reduce-scatter collectives being performed before updating the model parameters, the update of the model parameters is performed following a plurality of reduce-scatter collectives that are carried out. Following the update of the model parameters, a plurality of all-gather collectives (the same number as the reduce-scatter collectives) are performed.

As would be understood from the description of FIGS. 9 to 9C above, in the case that a plurality of reduce-scatter collectives are performed and then a plurality of all-gathers, the system 1720 of processing nodes 1710 is divided into a plurality of different sets. Each of these sets may be conceptualised as being arranged along a different dimension of the system 1720. Although, in FIGS. 17A and 17B, only three processing nodes 1710 are shown as being part of the system 1720, in practice there are likely to be many more processing nodes 1710.

In the system 1720, when the second and third implementation are combined, each processing node 1710 belongs to two or more different sets and is arranged to perform each of the reduce-scatters between different ones of the sets to which it belongs using the updates Following this, each processing node 1710 then performs the update step using the reduced set of updates that it obtains to update a corresponding portion of the model parameters. Each processing node 1710 then performs each of the all-gathers between different ones of the sets to which it belongs using the updated model parameters. The end result being that each processing node 1710 stores the full set of updated model parameters.

The state information as discussed above can also be implemented in this embodiment. In this case, each processing node 1710 maintains the state associated with the model parameters that it updates following the plurality of reduce-scatter collectives.

Other combinations of the implementations are possible. For example, the first and third implementation may be combined. In this case, the separate execution and preparation by different processing nodes during each compute phase may be applied to derive a set of updates for a model. Multiple groups of execution and preparation processing nodes are used to derive multiple sets of updates. The set of updates are then exchanged using one or more reduce-scatter collectives, the model parameters updated, and the updated model parameters exchanged using one or more all-gather collectives. One of the processing nodes in each group of executing and preparation nodes may participate in the all-reduce and perform the update step. For example, the processing nodes 1710 of system 1720 could be the preparation nodes, with each of these nodes 1710 being associated with a different executing node.

Figure 18:
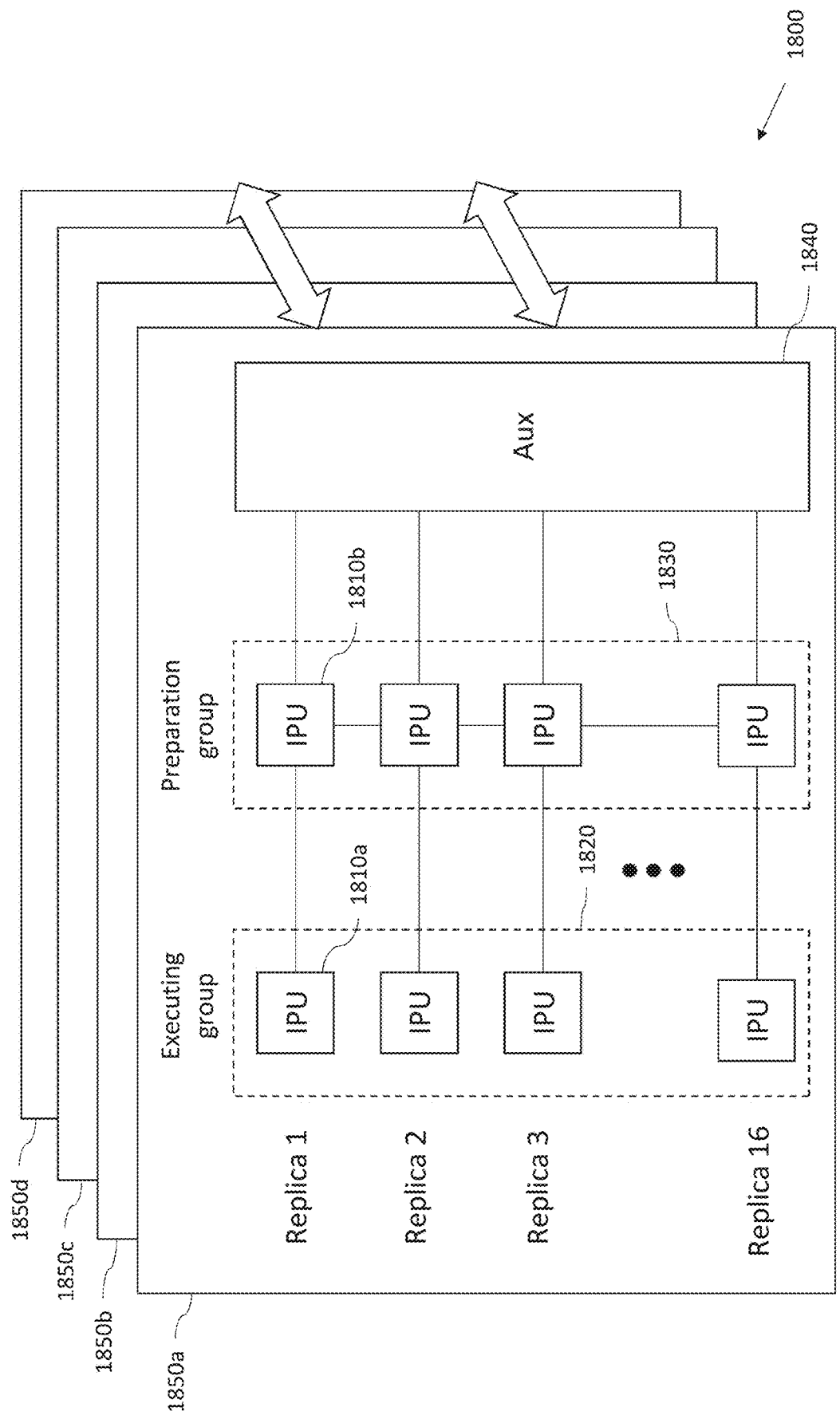
FIG. 18 is a schematic diagram showing a data processing system having multiple third sets of processing nodes.

In some embodiments, all three implementations may be combined. Reference is made to FIG. 18, which illustrates an example system 1800 in which the three implementations may be combined together. The system 1800 comprises pairs of processing nodes (shown as IPUs) that are each configured to derive a set of data (e.g. updated weights of a neural network) based on a different set of input data. Each of the pairs of processing nodes comprises a processing node belonging to an executing group 1820 and a processing node belonging to a preparation group 1830. For example, one pair of processing nodes comprises processing node 1810a, which belongs to the executing group 1820, whilst another processing node belongs 1810b to the preparation group 1830. The processing nodes in the preparation group 1830 are configured to communicate with the storage 1840 by loading data required for processing by the processing nodes of the executing group 1820 and unloading data calculated by the processing nodes of the executing group 1820.

As shown, the system 1800 is arranged into several subsystems 1850a, 1850b, 1850c, 1850d (collectively referred to herein as subsystems 1850). FIG. 18 shows the components only for the first subsystem 1850a. However, the other subsystems 1850 each comprise a substantially identical set of processing nodes, split into an executing group 1820 and a preparation group 1830. Each of the processing nodes in an executing group 1820 may be referred to as an executing processing node, whilst each of the processing nodes in a preparation group may be referred to as a preparation processing node. The storage 1840 may be shared between each of the subsystems 1850 or the storage 1840 may comprise separate storages for each subsystem 1850. In some cases, each of the preparation processing nodes in the system 1800 may be associated with a different storage.

Each of the pairs of processing nodes may operate as the pair of nodes 205a, 205b shown in FIG. 2A are configured to operate. Specifically, each executing processing node performs the processing associated with one stage, whilst the corresponding preparation processing node unloads the results calculated by its executing processing node in the preceding compute phase and loads the data required by its executing processing node in the following compute phase. The operations shown as being performed by each pair of processing nodes in the system 1800 may be as illustrated by the table 220A in FIG. 2A. This table 220A illustrates the operations performed by each pair of processing nodes in the system 1800 in an embodiment in which the processing nodes in each pair do not swap roles between compute phases. However, in other embodiments, the system 1800 may be implemented with each processing node in a pair of processing nodes swapping roles between each compute phase. In this case, each pair of processing nodes in the system 1800 may operate as the processing nodes 205a, 205b shown in FIG. 2, with the operations performed by each node being as shown in table 220 of FIG. 2.

Once each executing processing node has proceeded to perform the calculations associated with each stage of the multi-stage process and provided the results to its corresponding preparation processing node, the new type of collective will be performed to exchange the results between all preparation processing nodes in the system 1800. The results that are exchanged comprise updates to model parameters that were used to calculate the updates to the model.

The new multi-dimensional collective scheme described above is performed between all of the preparation processing nodes in the system 1800. To perform the new multi-dimensional collective, each preparation processing node loads the updates that were calculated by the executing processing nodes and unloaded to storage 1840. Each preparation processing node then holds all of the updates determined from the processing of the multi-stage process. Each preparation processing node belongs to at least two different sets of preparation processing nodes. These different sets are used to perform the plurality of reduce-scatters and the plurality of all-gathers as described above, with the update of the model parameters taking place between these two sets of collectives.

FIG. 18 illustrates an example where the preparation processors are arranged in a two dimensional grid. In this two dimensional example, the preparation processing nodes of system 1800 may be arranged as the group 900 of processing nodes illustrated in FIGS. 9 to 9C. It may, therefore, be understood that the rows of processing nodes shown in FIGS. 9 to 9C extend into the page in the arrangement shown in FIG. 18. Each subsystem 1850 contains the processing nodes of a different one of the columns of processing nodes described above with reference to FIGS. 9 to 9C. The collective operations are performed between the preparation processing nodes of the system 1800.

As may be understood from FIGS. 9 to 9C, each of the preparation processing nodes, first performs a first reduce-scatter using the updates, with the first reduce-scatter being performed amongst a first set of preparation processing nodes to which it belongs. The first sets may be columns, in which case, the processing node 1810b would perform a reduce-scatter with all of the processing nodes in the preparation group 1830 of subsystem 1850a. Following the reduce-scatters performed in each subsystem 1850, each of the preparation processing nodes performs a second reduce-scatter with a second set of preparation processing nodes to which it belongs. The second reduce-scatter is performed by each processing node using the reduced updates it obtained as a result of the first reduce-scatter. The second sets may be rows, in which case, each processing node in each of the subsystems 1850, will perform the second reduce-scatter with all of its corresponding processing nodes in the others of the subsystems 1850. For example, the processing node 1810b would perform the second reduce-scatter with all of the corresponding processing nodes in the subsystems 1850b, 1850c, 1850d.

Following the two reduce-scatters, each of the preparation processing nodes applies the subset of the reduced updates it obtains as a result of the reduce-scatters to update a corresponding subset of the model parameters.

Each of the processing nodes then performs a first all-gather using the updated model parameters with the second set of processing nodes to which it belongs. For example, the processing node 1810b would perform the first all-gather with all of the corresponding processing nodes in the subsystems 1850b, 1850c, 1850d. Each of the preparation processing nodes, then performs a second all-gather using the updates, with the second all-gather being performed amongst the first set of preparation processing nodes to which it belongs. For example, the processing node 1810b would perform an all-gather with all of the processing nodes in the preparation group 1830 of subsystem 1850a.

At the end of this collective process, each of the preparation processing nodes will have a copy of the same updated model parameters, which it may unload to storage 1840 during the next compute phase. These updated model parameters may be used to derive further updates by again performing the processing using the multi-stage process as shown in FIG. 2 or 2A.

The collective process described above may be performed in a single exchange phase of the preparation nodes of the system 1800 following the processes shown in tables 220, 220A.

As mentioned, the techniques described above with respect to FIG. 18 may be applied for training a neural network. The results obtained by the executing processing nodes may include updates to or updated versions of model parameters, such as weights of a neural network. The updated weights/weight updates differ for each pair of processing nodes, since each executing group of processing node derives the updates to the weights using a different set of training data. The collectives that are carried out then share and average the weight updates between the pairs of processing nodes. Following this, each processing node pair will have the same updated weights, and can proceed to a further training iteration to determine further weight updates based on a set of training data.

Figure 10:
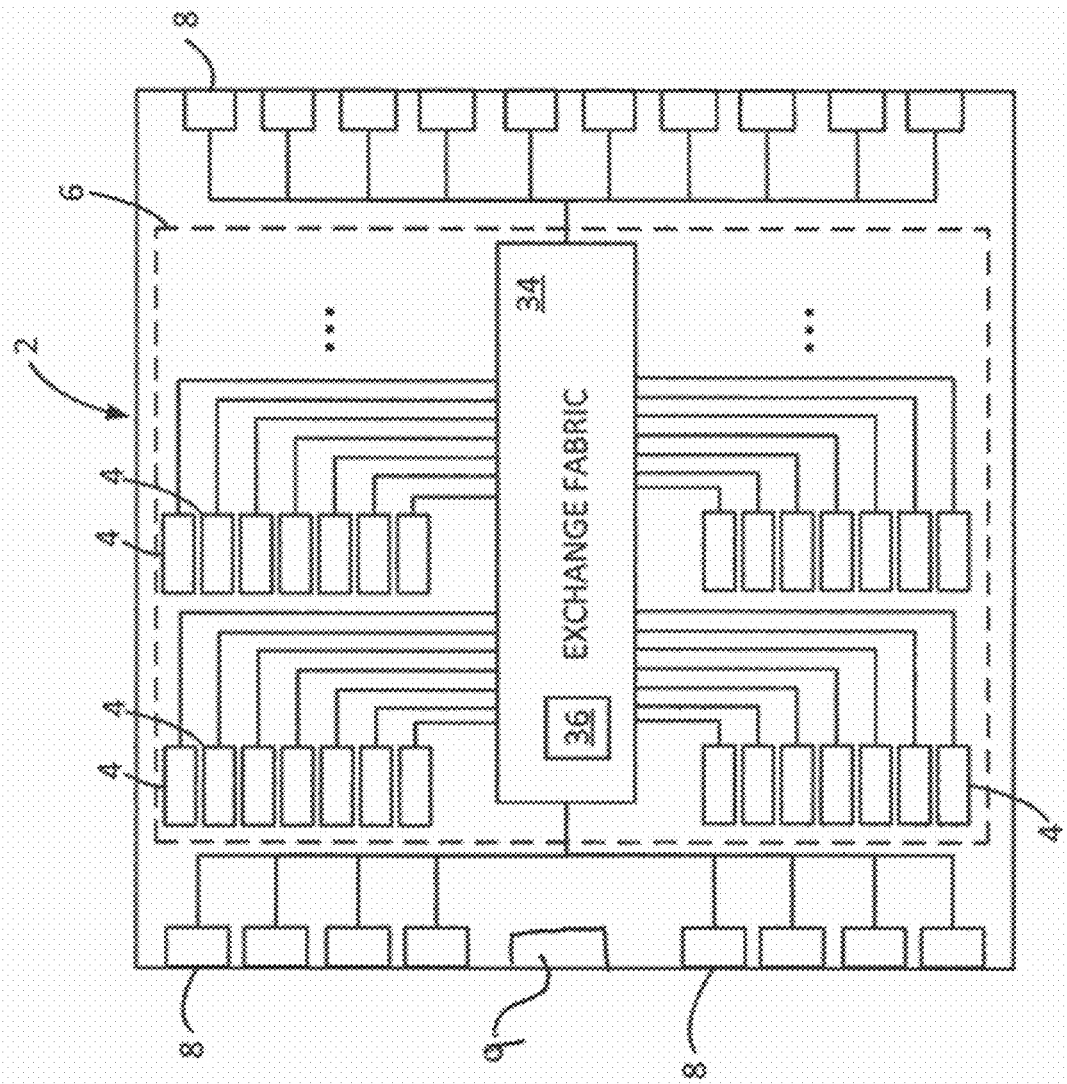
FIG. 10 illustrates an example multi-tile processing node.

Reference is made to FIG. 10, which illustrates an example of a multi-tile processing node 2 which may be used to implement the processing nodes described above. The processing node 2 comprises an array 6 of multiple processing node tiles 4 and an interconnect 34 connecting between the tiles 4. The processing node 2 may be implemented alone as one of multiple dies packaged in the same IC package. The interconnect 34 may also be referred to herein as the "exchange fabric" 34 as it enables the tiles 4 to exchange data with one another. Each tile 4 comprises a respective instance of a processing node and memory. For instance, by way of illustration the processing node 2 may comprise of the order of hundreds of tiles 4, or even over a thousand. For completeness, note also that an "array" as referred to herein does not necessarily imply any particular number of dimensions or physical layout of the tiles 4.

In embodiments, each processing node 2 also comprises one or more external links 8, enabling the processing node 2 to be connected to one or more other processing nodes (e.g. one or more other instances of the same processing node 2). These external links 8 may comprise any one or more of: one or more processing node-to-host links for connecting the processing node 2 to a host processing node, and/or one or more processing node-to-processing node links for connecting together with one or more other instances of the processing node 2 on the same IC package or card, or on different cards. In one example arrangement, the processing node 2 receives work from a host processing node (not shown) which is connected to the processing node via one of the processing node-to-host links in the form of input data to be processed by the processing node 2. Multiple instances of the processing node 2 can be connected together into cards by processing node-to-processing node links. Thus a host accesses a computer, which is architected as a multi-tile system on a chip, depending on the workload required for the host application.

The interconnect 34 is configured to enable the different tiles 4 in the array 6 to communicate with one another. However, as well as there potentially being dependencies between threads on the same tile 4, there may also be dependencies between the portions of the program running on different tiles 4 in the array 6. A technique is, therefore, required to prevent a piece of code on one tile 4 running ahead of data upon which it is dependent being made available by another piece of code on another tile 4.

Each tile 4 is itself a processing node capable of executing instructions (code) from a local instruction memory and handling data in local data memory. A tile 4 may comprise a respective instance of a barrel-threaded processing node and a memory. For instance, by way of illustration the processing node 2 may comprise of the order of hundreds of tiles 4, or even over a thousand. For completeness, note also that an "array" as referred to herein does not necessarily imply any particular number of dimensions or physical layout of the tiles 4.

Communication between tiles 4 on the processing node 2 occurs in a time deterministic fashion. However, other forms of inter tile exchange are possible. There may be dependencies between the portions of the program running on different tiles 4 in the array 6. That is, processing data on one tile may depend on results from another tile, e.g. may provide results on which another tile depends. A technique is, therefore, required to prevent a piece of code on one tile 4 running ahead of data upon which it is dependent being made available by another piece of code on another tile 4.

Parallel programming models for AI and Data Science usually follows a 3-phase iterative execution model: Compute, Barrier, and Exchange. The implications are that data transfer to and from a processing node is usually barrier dependent to provide data-consistency between the processing nodes and between each processing node and a host. Typically used data consistency models are Bulk Synchronous Parallel (BSP), Stale Synchronous Parallel (SSP) and Asynchronous. Embodiments described herein use a BSP model, but it will be apparent that the other synch models could be utilised as an alternative.

Figure 11:
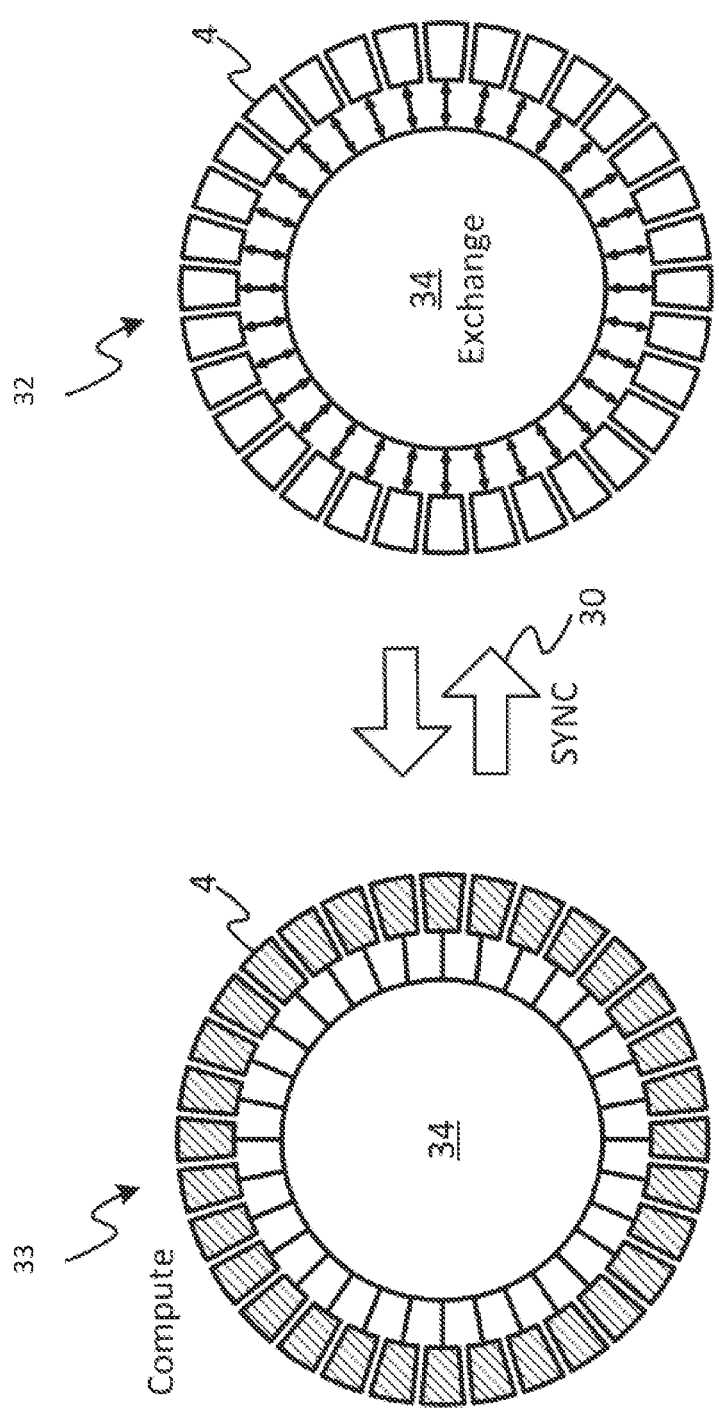
FIG. 11 illustrates the compute phases and exchange phases in an example multi-tile processing node.

Reference is made to FIGS. 11 and 12, which illustrate an implementation of a BSP exchange scheme in which each tile 4 performs a compute phase 33 and an exchange phase 32 in an alternating cycle, separated from one to the other by a barrier synchronization 30 between tiles. A barrier synchronization is placed between each compute phase 33 and the following exchange phase 32.

A compute phase 33 and an exchange phase 32 for communication between tiles may both be implemented in a compute phase shown in FIG. 3 and separated from an inter-processing node exchange phase by a pre-compiled synchronisation barrier.

During the compute phase 33, each tile 4 performs one or more computation tasks locally on-tile, but does not communicate any results of these computations with any others of the tiles 4. In the exchange phase 32, each tile 4 is allowed to exchange one or more results of the computations from the preceding compute phase to and/or from one or more others of the tiles, but does not perform any new computations until it has received from other tiles 4 any data on which its task(s) has/have dependency. Neither does it send to any other tile, any data except that computed in the preceding compute phase. It is not excluded that other operations such as internal control-related operations may be performed in the exchange phase 32. The communication external to the tile group may optionally utilise the BSP mechanism, but alternatively may not utilize BSP and may instead use some other synchronization mechanism of its own.

According to the BSP principle, a barrier synchronization 30 is placed at the juncture transitioning from the compute phase 33 into the exchange phase 32, or the juncture transitioning from the exchange phase 32 into the compute phase 33, or both. That is to say, either: (a) all tiles 4 are required to complete their respective compute phases 33 before any in the group is allowed to proceed to the next exchange phase 32, or (b) all tiles 4 in the group are required to complete their respective exchange phases 32 before any tile in the group is allowed to proceed to the next compute phase 33, or (c) both of these conditions are enforced. In all three variants, it is the individual tiles which alternate between phases, and the whole assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep).

Note also, it is not excluded that multiple different independent groups of tiles 4 on the same processing node 2 or different processing nodes could each form a separate respective BSP group operating asynchronously with respect to one another, with the BSP cycle of compute, synchronize and exchange being imposed only within each given group, but each group doing so independently of the other groups. I.e. a multi-tile array 6 might include multiple internally synchronous groups each operating independently and asynchronously to the other such groups (discussed in more detail later). In some embodiments there is a hierarchical grouping of sync and exchange, as will be discussed in more detail later.

Figure 12A:
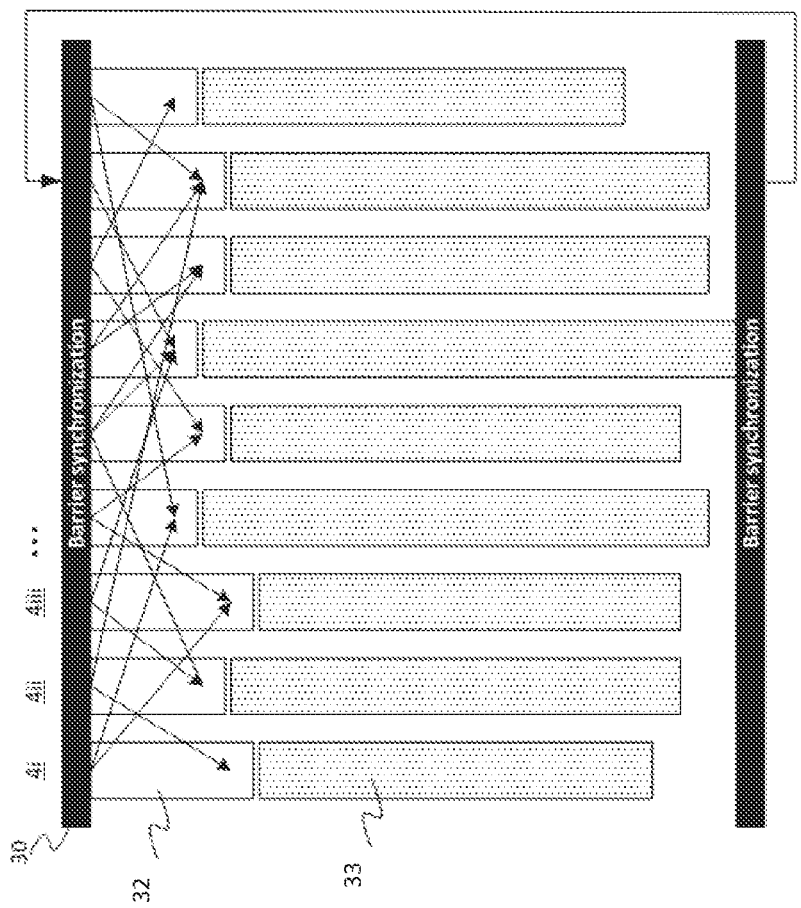
FIG. 12A illustrates the barrier synchronisation in a multi-tile processing node.

FIG. 12A illustrates the BSP principle as implemented amongst a group 4$i$, 4$ii$, 4$iii$ of some or all of the tiles in the array 6, in the case which imposes: (a) a barrier synchronization from compute phase 33 to exchange phase 32 (see above). Note that in this arrangement, some tiles 4 are allowed to begin computing 33 whilst some others are still exchanging.

The communication between tiles 4 on a processing node 2 occurs in time deterministic fashion in which data packets are transmitted without headers. This is explained in our earlier application U.S. patent application Ser. No. 15/886,315, which is incorporated by reference.

Figure 12B:
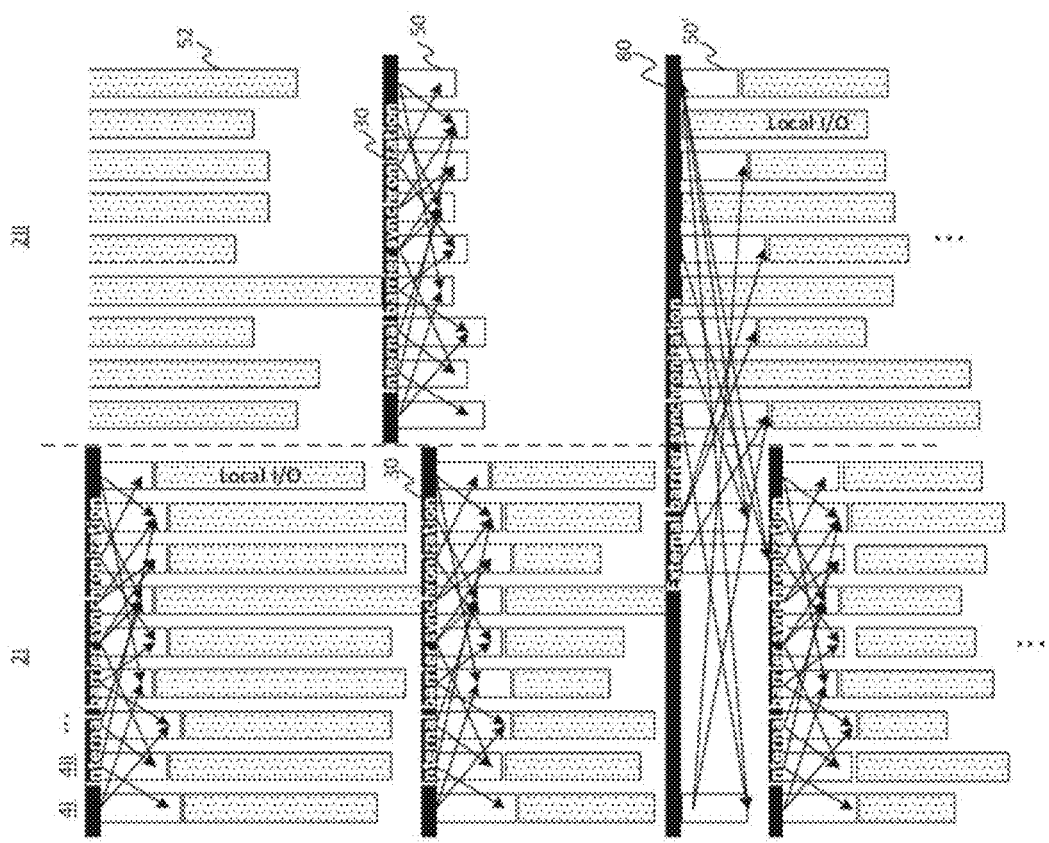
FIG. 12B illustrates internal and external barrier synchronisations.

FIG. 12B illustrates an example BSP program flow involving both internal (on-chip) and external (inter-chip) synchronizations. As shown, the flow comprises internal exchanges 50 (of data between tiles 4 on the same chip 2) and the external exchanges 50' (of data between tiles 4 on different chips 2).

The program may be arranged to perform a sequence of synchronizations, exchange phases and compute phases comprising in the following order: (i) a first compute phase, then (ii) an internal barrier synchronization 30, then (iii) an internal exchange phase 50, then (iv) an external barrier synchronization 80, then (v) an external exchange phase 50'. The external barrier 80 is imposed after the internal exchange phase 50, such that the program only proceeds to the external exchange 50' after the internal exchange 50. Note also that as shown with respect to chip 21 in FIG. 7B, optionally a compute phase may be included between internal exchange (iii) and external barrier (iv).

Therefore, when data is communicated between tiles 4 on a processing node 2, the communication is carried out using headerless data packets. However, when data is sent to a location off of the processing node 2, this data is transmitted with a header indicating the target location.

The storage described above with respect to FIGS. 2, 2A, 4, and 18 may be part of a gateway that interfaces the processing nodes with one another and interfaces the processing nodes with a host storage.

Figure 13:
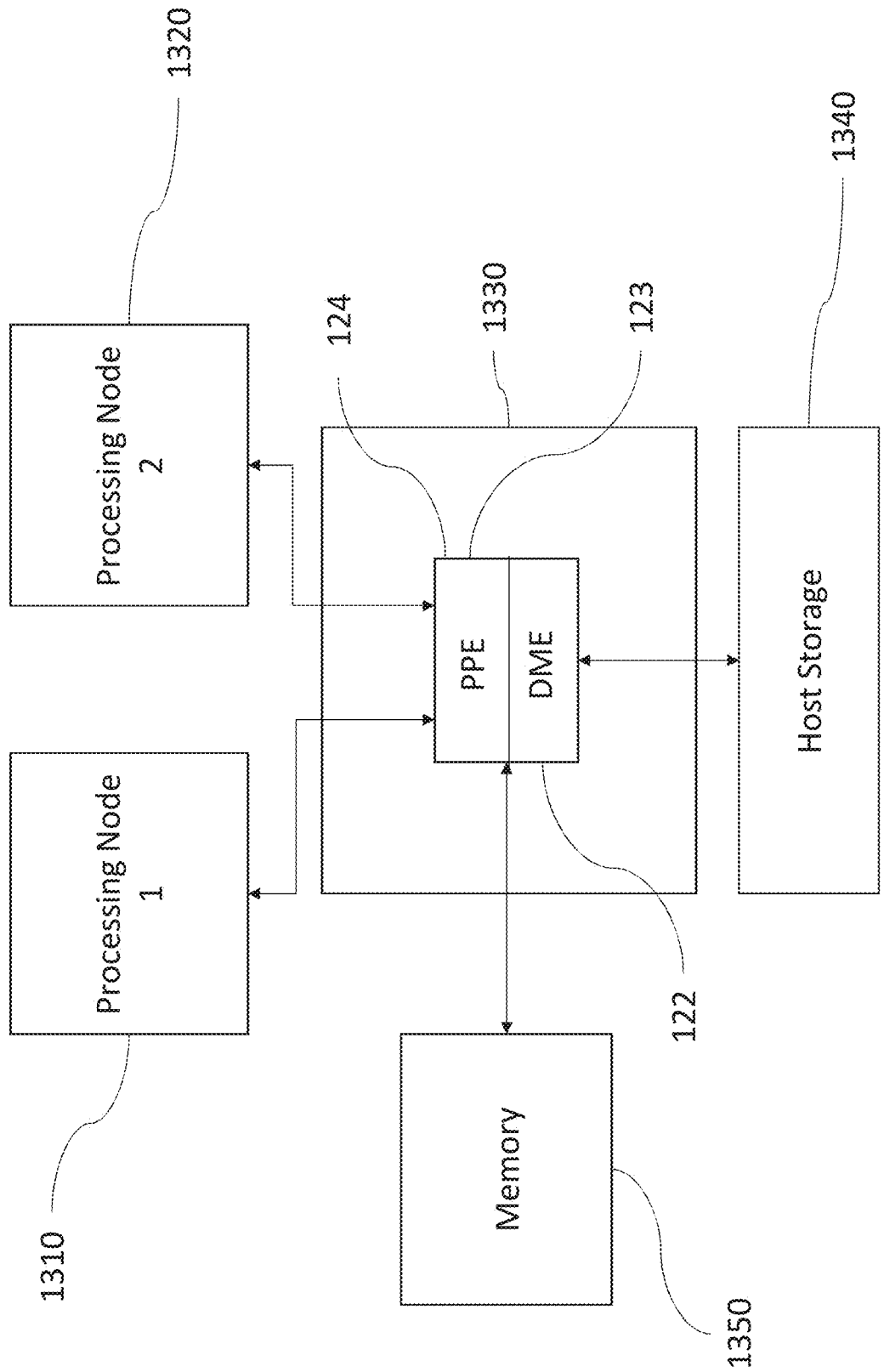
FIG. 13 illustrates a gateway for interfacing with two processing nodes.

Reference is made to FIG. 13, which illustrates an example of a system comprising a gateway 1330 for interfacing the processing nodes 1310, 1320, with host storage 1340. The storage described above with respect to FIGS. 2, 2A, 4, and 18 may be memory 1350. Data, which is for processing by one or more of the processing nodes 1310, 1320, is transferred to the memory 1350 from the host storage 1340. Additionally, as well as retrieving data, the gateway 1330 writes data to the host storage 1340. The data writes are made via the data centre ports. Data may be transferred from gateway memory 1350 to one or more of the processing nodes 1310, 1320.

Instead of, or in addition to, the transfer of data to the processing nodes 1310, 1320 from gateway memory 1350, data may be transferred from the processing nodes 1310, 1320 to the gateway 1330. The processing nodes 1310, 1320 are configured to send the data in the form of data packets to the gateway 1330, wherein each data packet includes a header indicating an address. The gateway 1330 uses the address of the data packets to determine where to send them. For example, the data packets may be stored in local memory 1350. The data packets may be sent to host storage 1340. The data packets may be sent to the other of the processing nodes 1310, 1320. The data packets may be sent to a further processing node via another gateway (not shown).

The data traverses the gateway 1330 to and from the memory 1350 under the control of a streaming engine 124. The streaming engine 124 performs execution of the data streaming operations. These operations for a batch of data may be specified by a work descriptor (WD). The streaming engine comprises two execution engines and code memory (not shown). One of the execution engines is a Data Mover Engine (DME) 122, the other is a Pre/Post Work engine (PPE) 123. They execute instructions loaded into the code memory as an executable image, which is produced by a compiler. The streaming engine 124 has a set of work instructions for execution by the DME 122 and a set of work instructions for execution by the PPE 123. The sets of instructions for the DME and PPE are coordinated by the WD, as set up at compile time. These instructions for a single data exchange synchronisation point may be grouped together into a single WD. The DME 122 is operated by specific DME instructions found in the DME sections of the executable image. The DME 122 uses the WD for navigating to the set of data mover (DMOV) instructions that relates to a given exchange synchronisation point (ESP). The PPE 123 is operated by specific PPE instructions found in the PPE sections of the executable image. The PPE 123 uses the WD for navigating to the set of pre/post-work instructions that relates to a given ESP.

The gateway includes PCIe ports. 4 of these PCIe ports are configured to pass packets to and from the processing nodes 1310, 1320. Each PCIe Port (shown in FIG. 13) can be configured to use a different accelerator specific protocol. A custom gateway transaction layer then converts between that protocol and the gateway internal protocol. The custom gateway layer implements the address map, and provides collective and broadcast/multicast offload support. Each gateway 1330 provides an address mapping scheme, exposing all participating processing nodes in a global address space. The packets received at the gateway 1330 from the processing nodes 1310, 1320 contain a gateway ID, identifying the destination gateway to which the packet is to be routed.

Processing nodes 1310, 1320 may dispatch packets specifying addresses in the global address space. Some parts of the address are used to select the resources on the target gateway. Some parts of the address are used to identify the gateway which is being addressed. Some other parts are used to identify addresses in the gateway memory or memory in an associated accelerator's tile memory. The processing node's tile memory is addressable by a tile index and a memory offset. The address may include this tile index and memory offset to identify a location in the accelerator at which data of the data packet is to be stored.

When a packet is received, the identification of the gateway 1330 in the address is compared against this gateway's global ID. If there is a match, the request is targeting a resource belonging to this gateway (a local accelerator or local memory). Otherwise, the part of the address are used to index a routing table. The contents of the routing table indicate the target port in the system. Some bits of the address will be matched against the gateway routing table to determine where to route the packet.

If the packet is targeting the gateway 1330, then local address bits in the packet address are used to lookup in a set of local gateway base address registers (BARS) consisting of a plurality of regions, i.e. one BAR for gateway memory 1350 and one BAR for each processing node port. If the local address bits indicate that the packet is for storage in gateway memory, e.g. memory 1350, the packet is stored in the gateway memory 1350 according to the address in the BAR for gateway memory 1350. If the local address bits indicate that the packet is for delivery to one of the processing nodes 1310, 1320, then the packet is forwarded to the DME 122 of the gateway 1330. From there, the data packet may be forwarded to the processing node according to the address in the BAR for the relevant processing node port.

The operation of the gateway 1330 is described in more detail in U.S. application Ser. No. 16/428,846, which is incorporated herein by reference.

Figure 22:
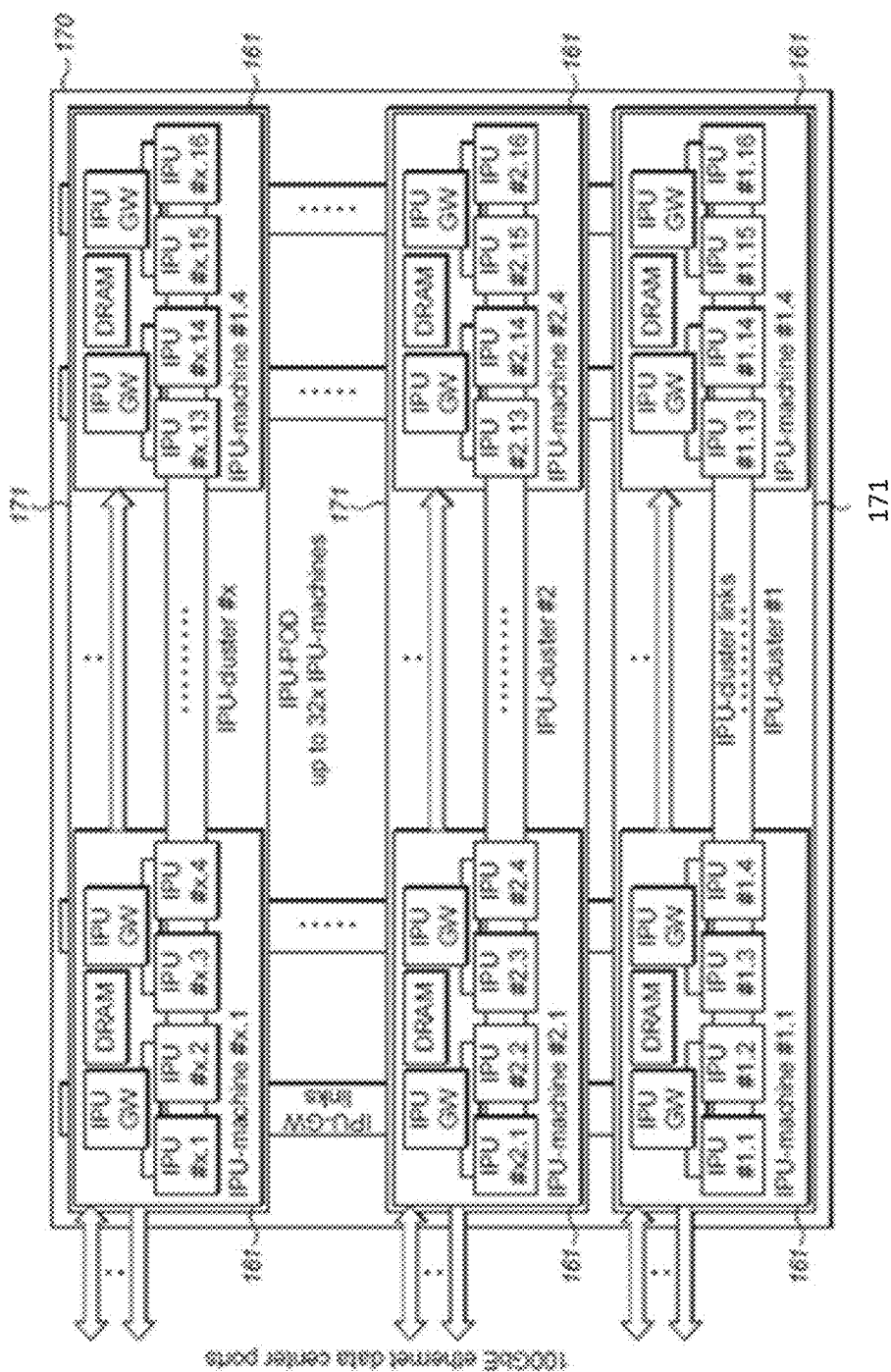
FIG. 22 illustrates one example of a system of gateways and processing nodes.

Gateways, such as gateway 1330, may connected together to form a larger system. Reference is made to FIG. 22, which illustrates an example of such a system 170. The system 170 comprises a plurality of groups of processing nodes and gateways that are each referred to as 'machines'. A plurality of machines 161 are arranged into an apparatus 171, which is referred to as a cluster 171. Each cluster 171 comprises up to 4 machines 161. The machines 161, as well as being connected to machines in the same cluster 171 are also connected over links (shown as IPU-GW links) to machines 161 in different clusters 171. Hence, in the system 170, the processing nodes can communicate along different dimensions.

Figure 23:
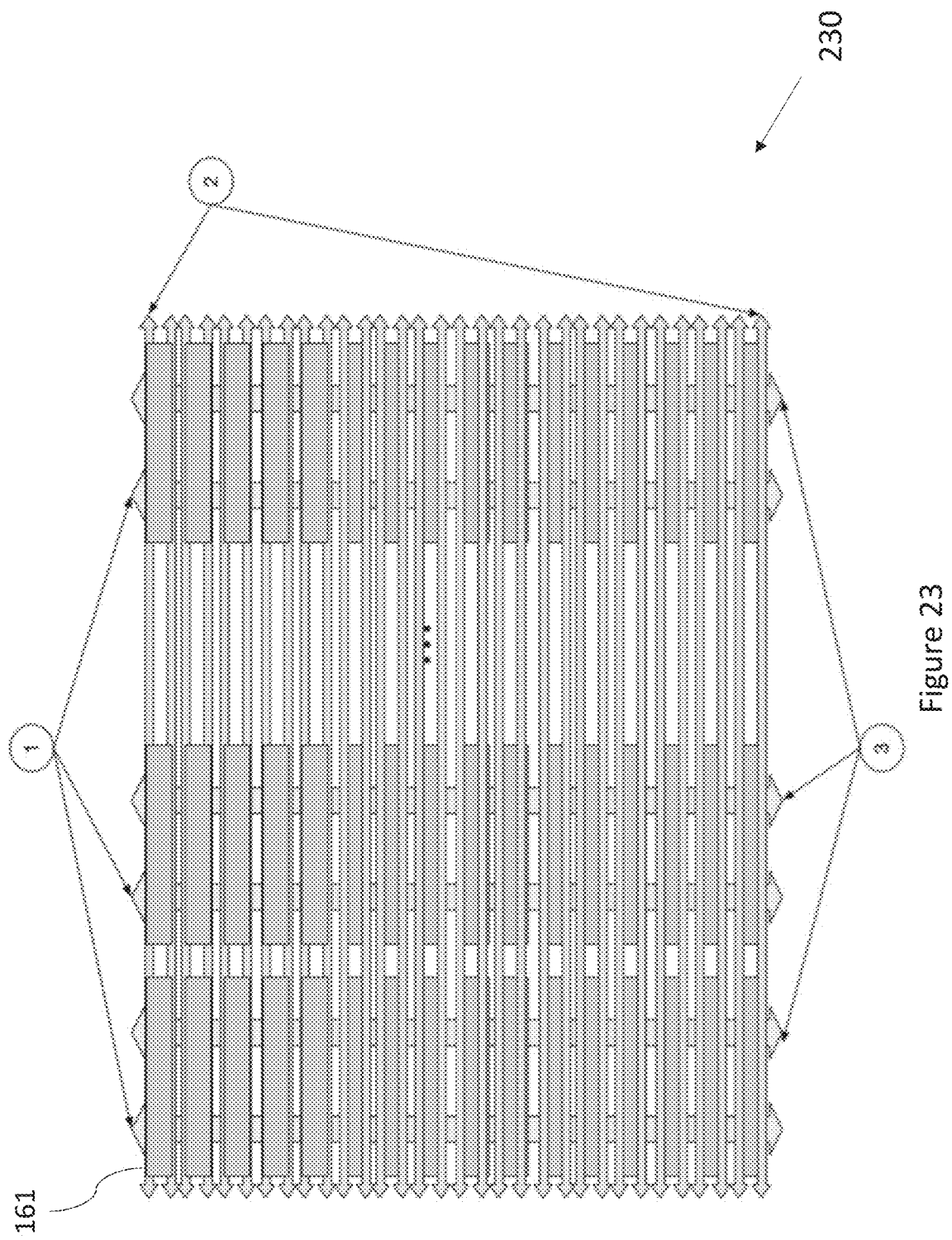
FIG. 23 illustrates another example of a system of gateways and processing nodes.

The machines 161 can be connected together in different configurations. Reference is made to FIG. 23 which illustrates an example of how different machines 161 may be arranged in a system 230. The second implementation and the third implementation may be implemented in the system 230 as will be described. In this example, part of the collective operations are implemented in the gateway. Therefore, in some embodiments, the "processing nodes" of the second implementation and the third implementation comprise the gateway devices as well as the processing units to which those gateway devices are coupled.

Each of the boxes, exemplified by box 161, represents a machine 161. The processing units and gateways in this example are each split into different 'racks'. Each of the vertical arrows represents data transfer between different processing units within a single rack. Each machine 161 is therefore split between two different racks, with one gateway and two processing units of a machine 161 belonging to one rack and another gateway and two processing units of the same machine 161 belonging to another rack. The horizontal arrows illustrate the transfer of data between different racks. In this example, there are 32 processing units in each rack and 32 racks in the system 230.

The numbers in the Figure illustrate the order of the steps performed. At the start of the collective operation, all participating processing units each have their own local set of weight updates (gradients), which are to be reduced across the entire system 230.

At the first step, all processing units in the same rack perform a reduce-scatter such that each processing unit has 1/32nd of the reduced gradients for that rack. At the end of this step, each rack has calculated its entire reduced gradient, and each processing unit in that rack holds 1/32nd of that calculation.

Figure 14B:
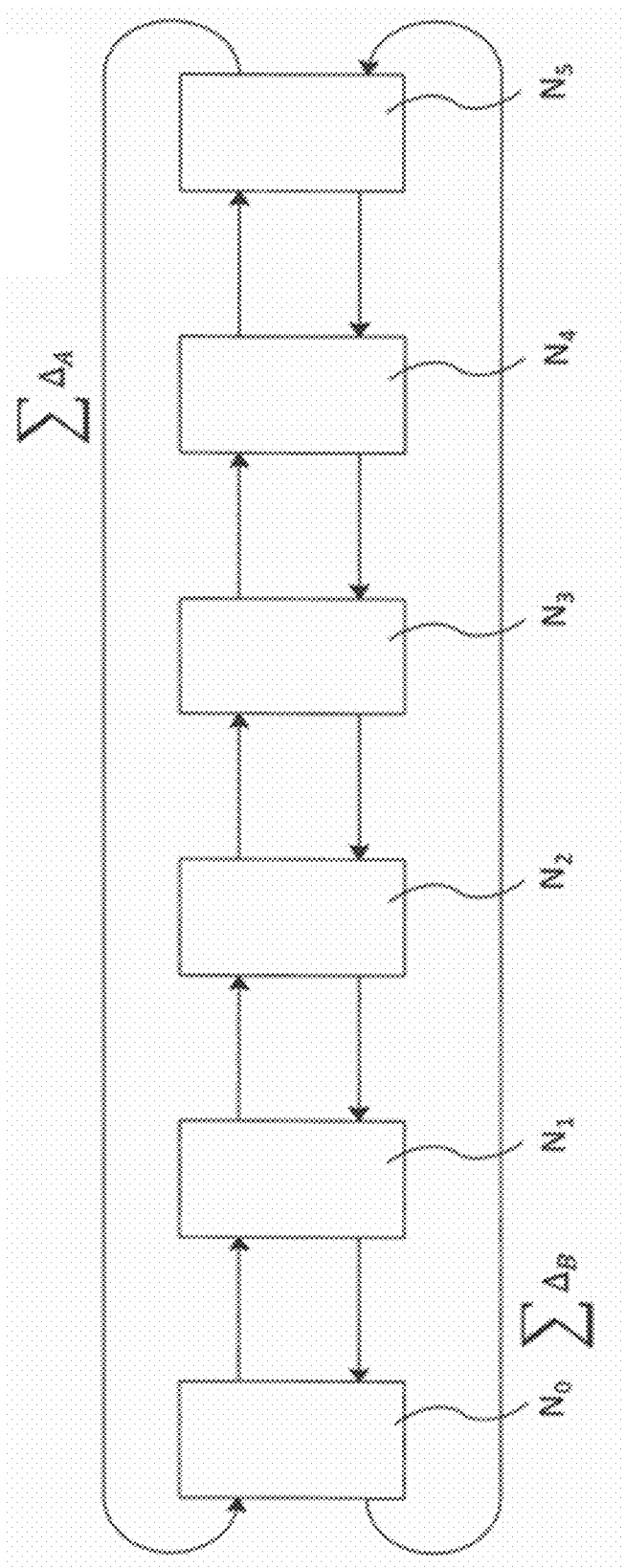
FIG. 14B is a schematic diagram of a line with the end nodes connected into a ring.

At the second step, the processing units in different racks exchange their reduced gradients by performing an all-reduce between gateways in different racks. This may be performed using by exchanging different portions of data in different directions in the ring as illustrated in FIGS. 14A and 14B. 1/32nd portion of the gradient is exchanged in one direction on the ring, and on another 1/32nd portion of the gradient is exchanged in the other direction on the ring. Thus, at the end of this step, all racks have receive the entire set of reduced gradients, and they are spread across the memories of the 16 gateways in each rack.

Optionally, following the second step, the gateways in the system 230 implement the optimizer function, by using the gradients (and potentially other data stored in memory such as optimiser state) to update a copy of the weights in gateway memory.

At the third step, the processing units read the data (reduced gradients or updated weights) from gateway memory. If the Gateway did not perform the optimiser function, the processing units perform the optimiser function to produce the updated weights. The processing units then participate in an all-gather with the other processing units in their rack, following which each processing unit in the system 230 stores the full set of updated weights. FIGS. 24 to 28 illustrate these steps in greater detail.

Figure 24:
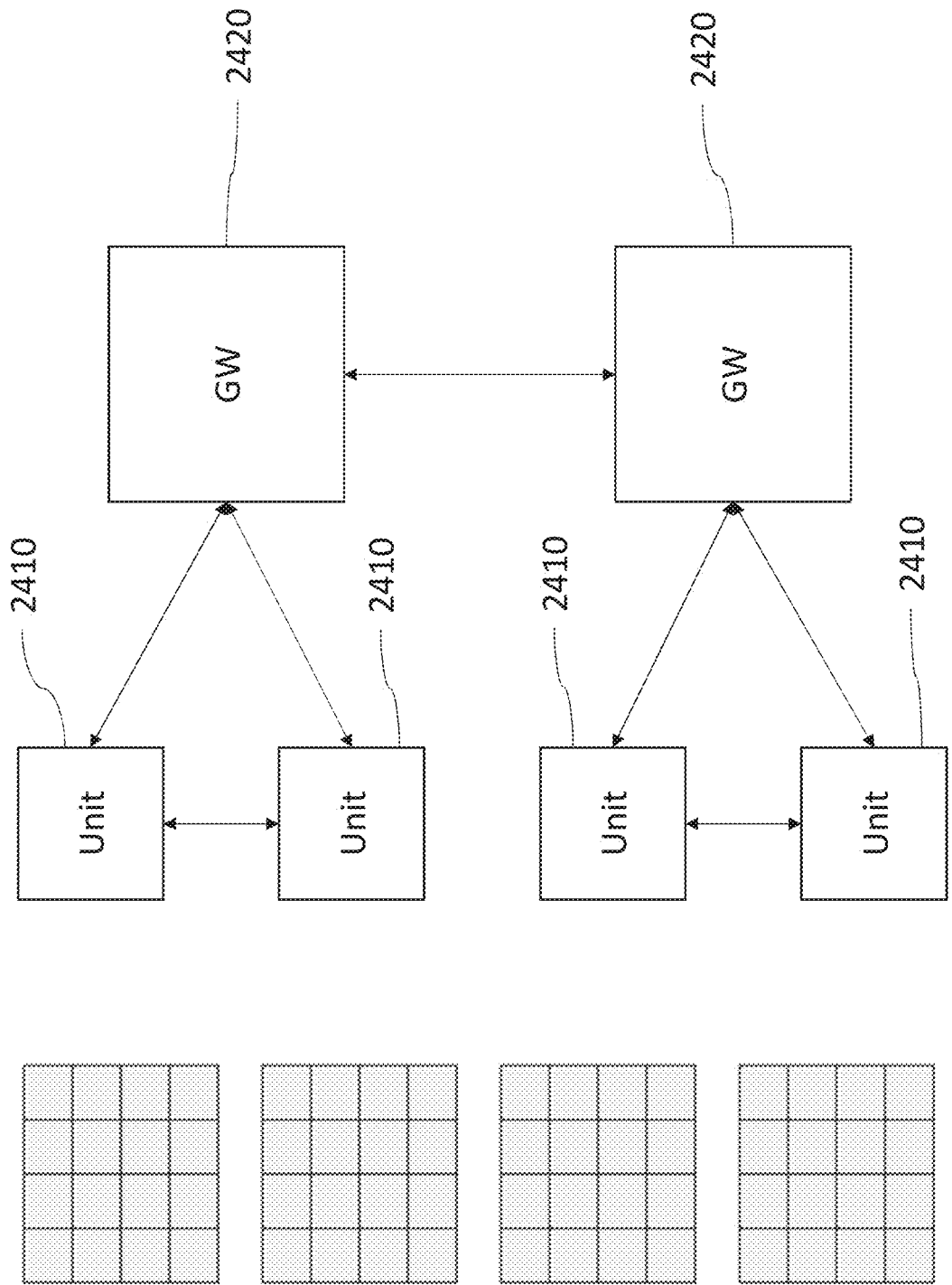
FIG. 24 illustrates processing nodes in a rack, each of which stores different set of the full gradients for a machine learning model.

Reference is made to FIG. 24, which illustrates a set of processing units 2410 and gateway devices 2420 that all belong to the same rack. In practice, there would be more than 4 processing units 2410 in a rack, but only 4 are shown for simplification. Each processing unit 2410 may be the same as the processing nodes 1310, 1320 shown in FIG. 13. Likewise, each gateway device 2420 may be the same as the gateway 1330 shown in FIG. 13.

Each processing unit 2410 stores a full set of gradients for updating the model. A reduce-scatter is performed between the units 2410 to exchange and reduce the gradients. The exchange of the gradients may occur by sending packets comprising the gradients directly between the processing units 2410 and/or by sending the packets via the gateways 2420 connected to the units 2410.

Figure 25:
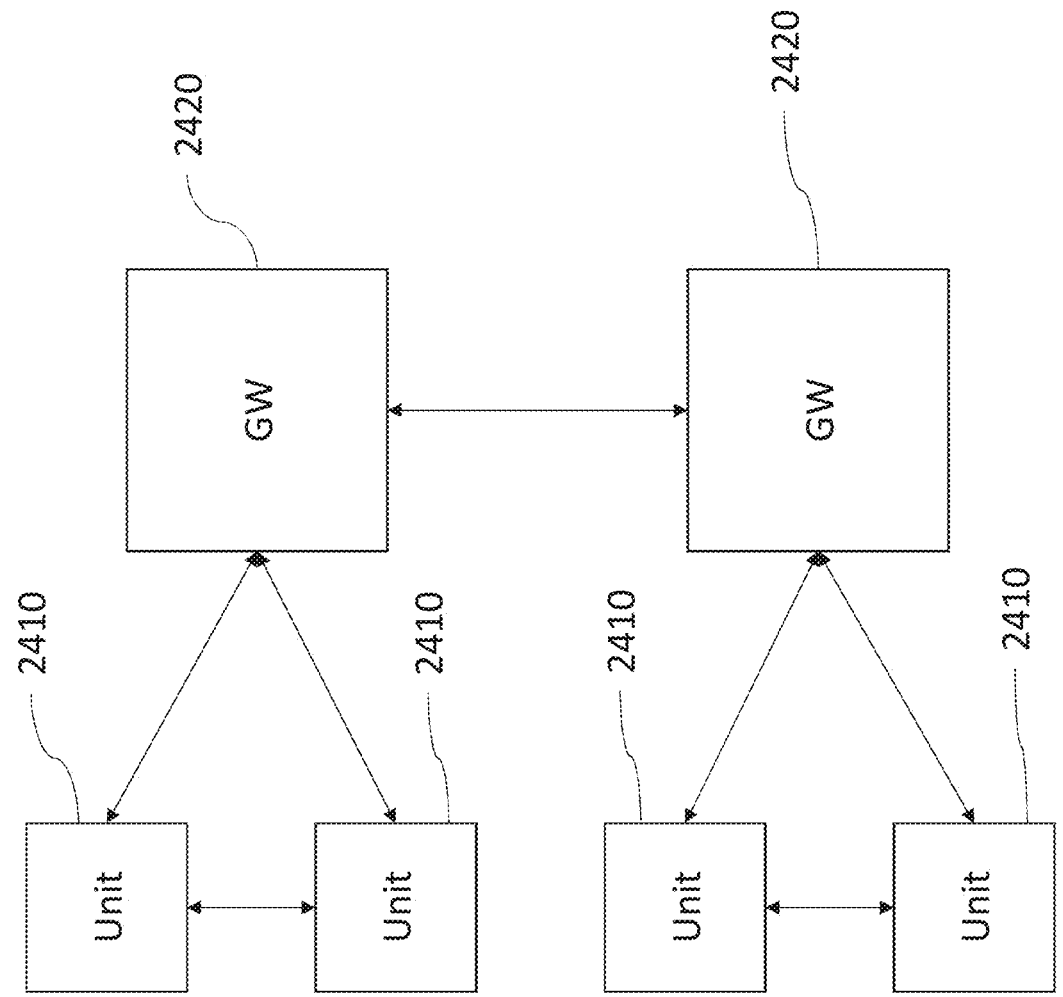
FIG. 25 illustrates processing nodes in a rack, each of which stores a subset of reduced gradients for a machine learning model.

Reference is made to FIG. 25, which shows the results of the reduce-scatter discussed above. Following the reduce scatter, each processing unit 2410 in the rack has a different portion of the reduced gradients. These gradients are then loaded onto the gateways 2420, which perform the next stage in the process.

Figure 26:
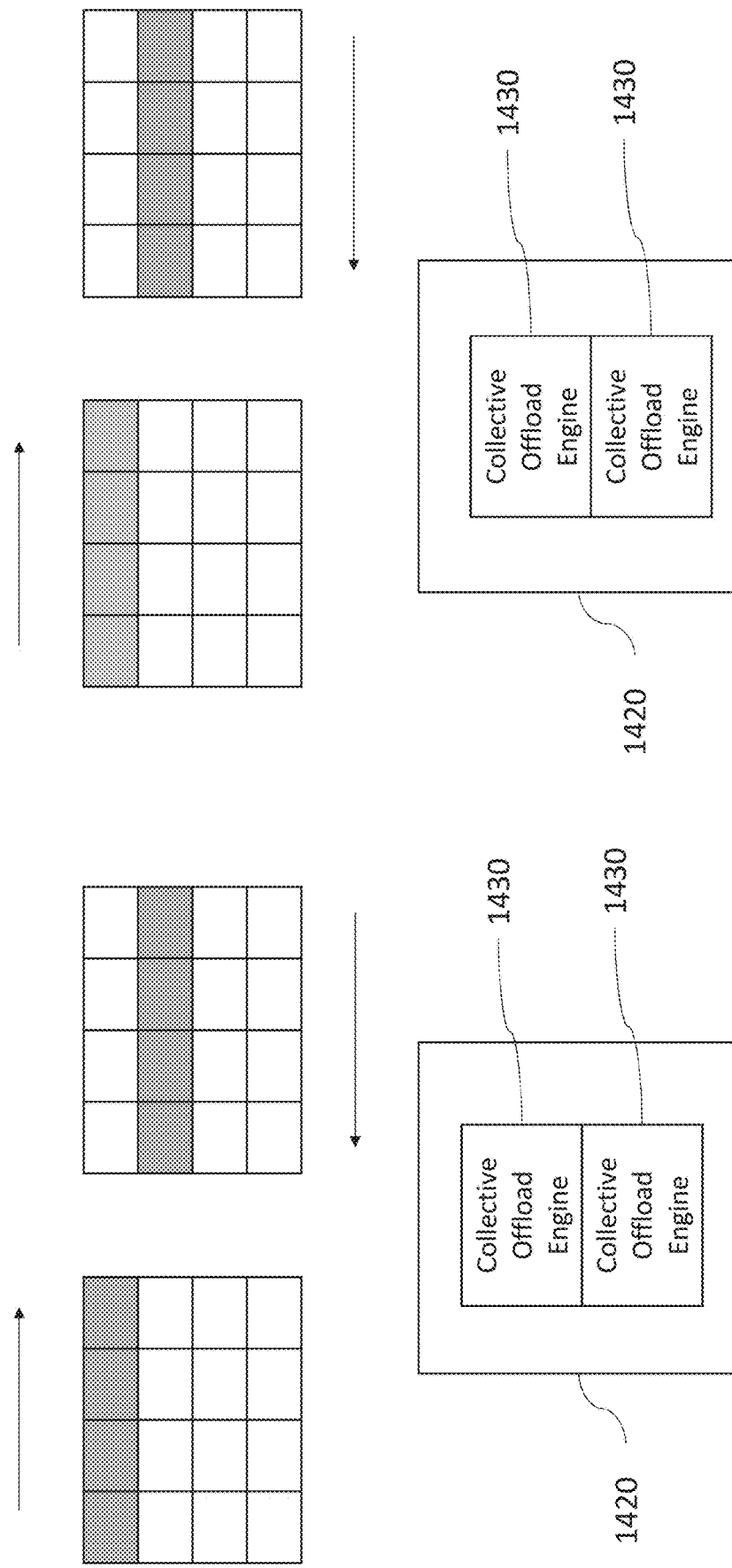
FIG. 26 illustrates gateways in different racks, between which an all-reduce is performed in different directions in a ring.

Reference is made to FIG. 26, which shows the exchange of data between the gateways 1420 when performing an all-reduce between gateways of different racks. For simplification, only two gateways 1420 from two different racks are shown. Each gateway 1420 stores the data received from its two connected processing units 1410. Each of the gateways 1420 comprises two collective offload engines 1430. The gateway collective offload engines 1430 are each designed to implement a collective operation across N instances of the engine 1430 spread across N gateways, connected through the Gateway Ethernet ports. Each collective offload engine 1430 comprises an FPGA for performing the data transfer operations and, optionally, for performing the optimisation step. The two engines 1430 on each gateway 1420 are configured to send in opposite directions around the ring, allowing the full available bandwidth of the gateway Ethernet ports to be used. The collective engines 1430 in each gateway 1420 cause data to be exchanged and reduced in two directions in the ring in all-reduce collective. Following the all-reduce, the collective offload engines 1430 of the gateways 1420 may perform the optimisation step to derive the new weights from the gradients and return the new weights to the connected processing units 1420. Alternatively, the gateways 1420 may return the gradients to the processing units 1420, which then perform the optimisation step. In either case, the result is shown in FIG. 27.

FIG. 27 illustrates that each processing unit 2410 in a rack stores a different subset of the updated weights for the entire model. An all-gather step is then performed between the processing units 2410 in the rack to distribute these updated weights between the processing units 2410. The final result is shown in FIG. 28, in which each processing unit 2410 in the rack has the full set of updated weights for the model. The result is the same in each rack of the system 230, i.e. each rack stores the full set of updated weights.

Figure 19:
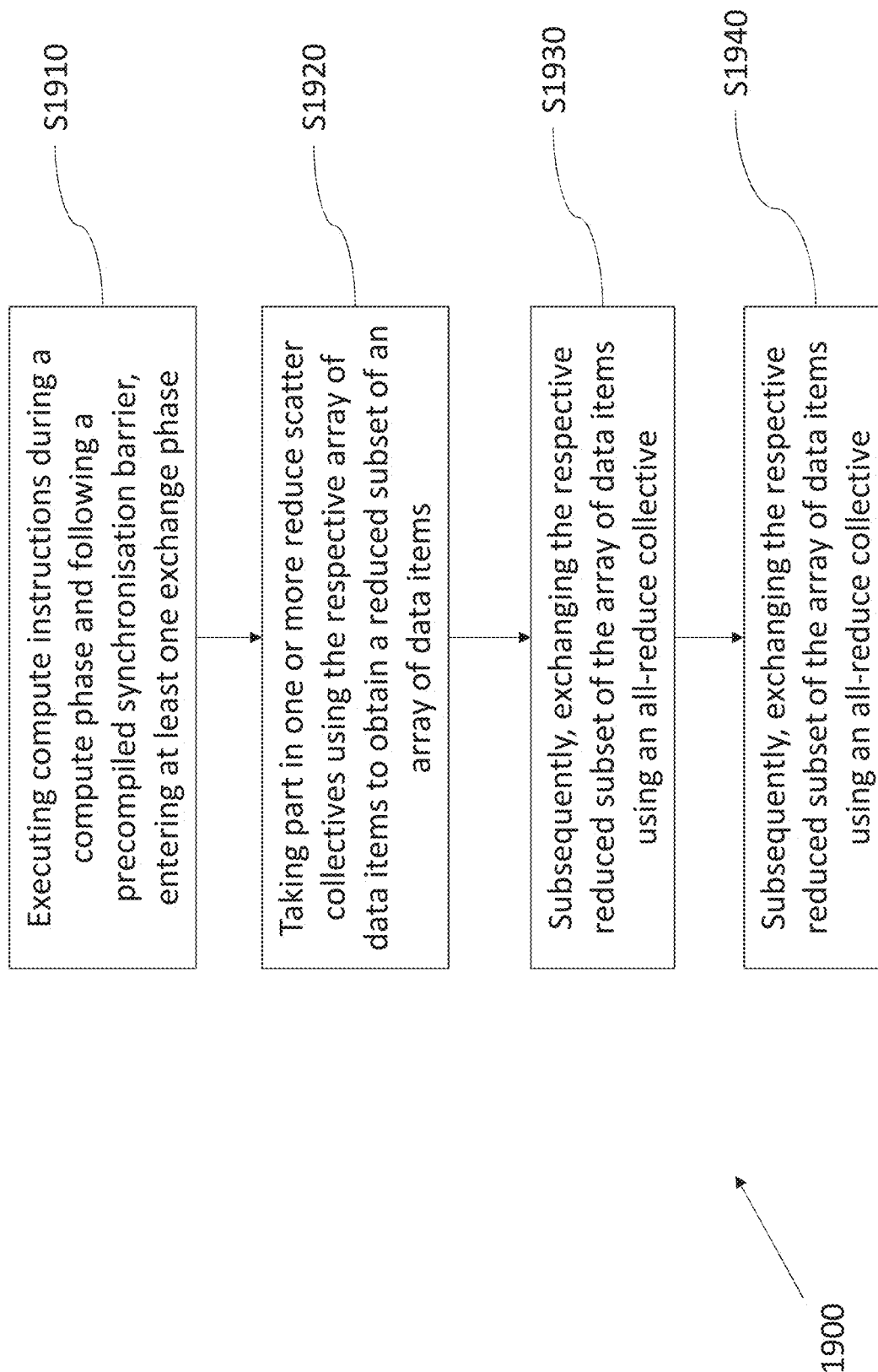
FIG. 19 illustrates a method for exchanging an array of data items.

Reference is made to FIG. 19, which illustrates an example method 1900 implemented in a data processing system for exchanging an array of data.

At S1910, each of the plurality of first processing nodes executes compute instructions during a compute phase and following a precompiled synchronisation barrier, enters at least one exchange phase.

At S1920, each of the first processing nodes takes part in one or more reduce scatter collectives using the respective array of data items to obtain a reduced subset of an array of data items.

At S1930, each of the first processing nodes exchanges the respective reduced subset of the array of data items using an all-reduce collective with processing nodes to obtain a further reduced subset of the array of data items.

Figure 20:
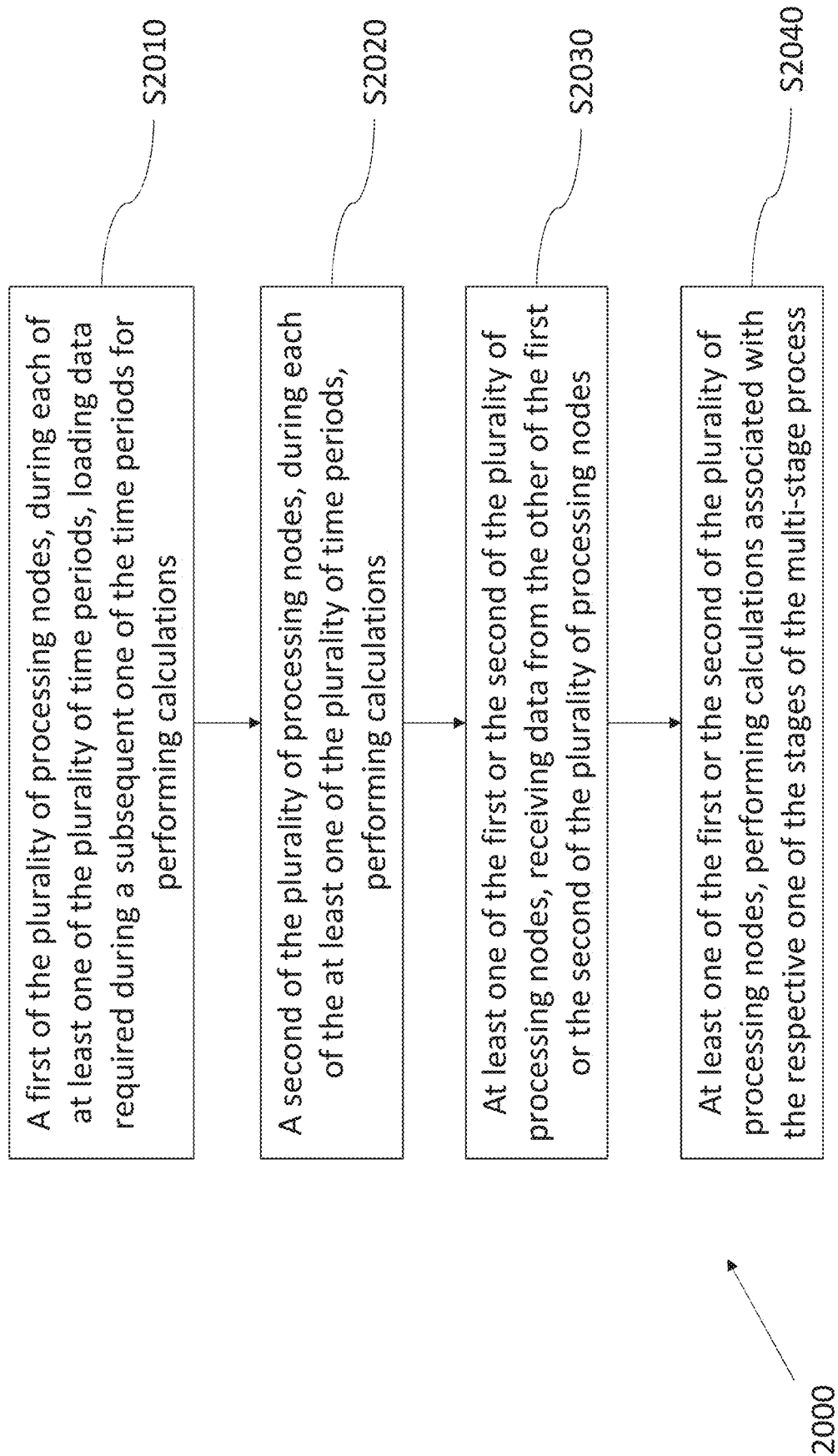
FIG. 20 illustrates a method for implementing a multi-stage process.

At S1940, each of the first processing nodes performs one or more all-gather collectives using the further reduced subset of the array of data items to obtain a reduced array of data items Reference is made to FIG. 20, which illustrates an example method 2000 implemented in a data processing system for performing a multi-stage process.

At S2010, a first of the plurality of processing nodes, during each of at least one of the plurality of time periods, loads data required during a subsequent one of the time periods for performing calculations associated with one of the stages of the multi-stage process from the at least one data storage.

At S2020, a second of the plurality of processing nodes, during each of the at least one of the plurality of time periods, performs calculations associated with one of the stages of the multi-stage process using data loaded from the at least one data storage during an earlier one of the time periods.

At S2030, at least one of the first or the second of the plurality of processing nodes, receives data from the other of the first or the second of the plurality of processing nodes.

At S2040, the at least one of the first or the second of the plurality of processing nodes, during each of at least one of the subsequent one of the time periods, performs calculations associated with the respective one of the stages of the multi-stage process using the data received from the other of the first or the second of the plurality of processing nodes.

Figure 21:
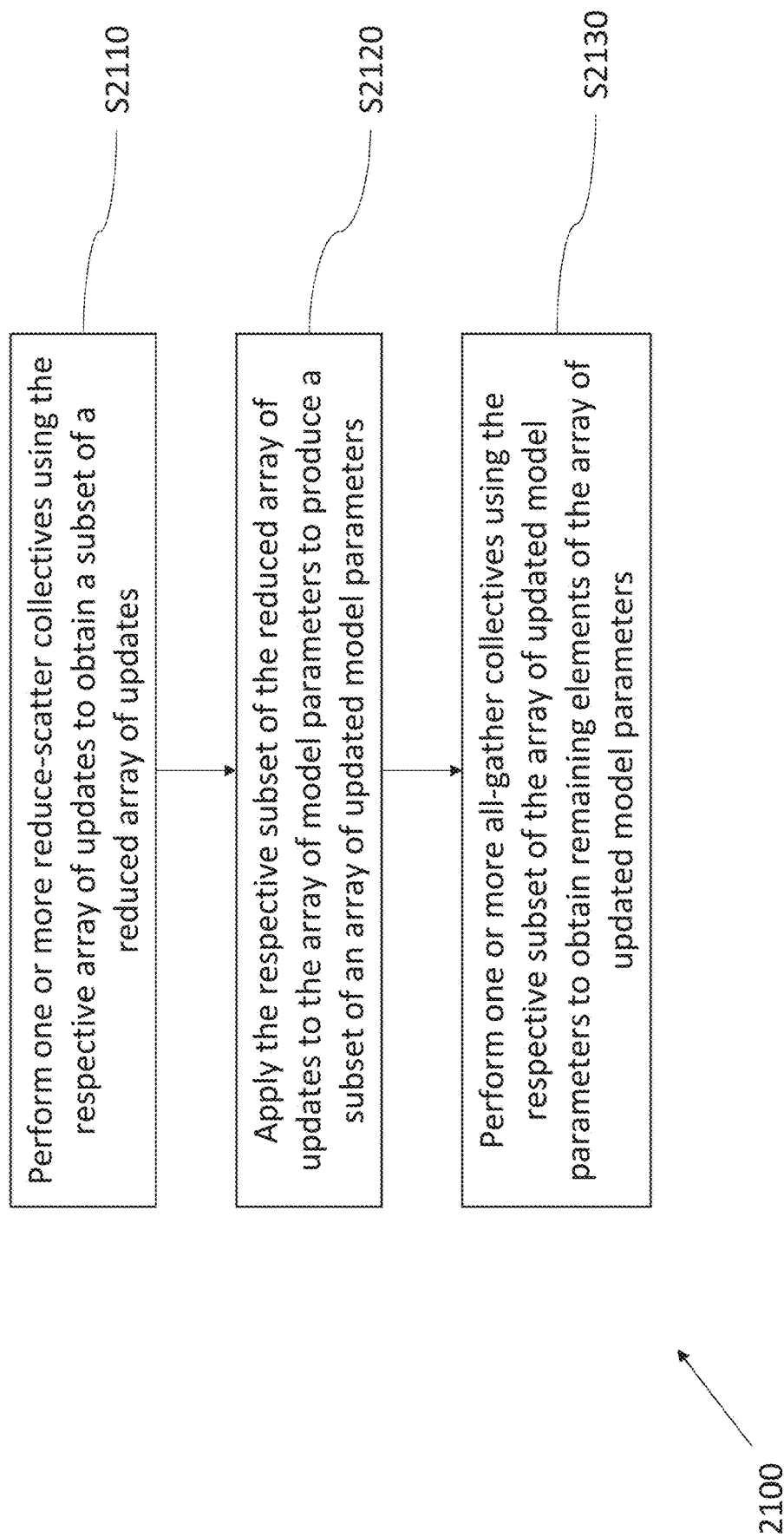
FIG. 21 illustrates a method for updating model parameters.

Reference is made to FIG. 21, which illustrates a method 2100 for updating a model.

At S2110, each processing node is configured to participate in one or more reduce-scatter collectives using the respective array of updates to obtain a subset of a reduced array of updates.

At S2120, each processing node is configured to apply the respective subset of the reduced array of updates to the array of model parameters to produce a subset of an array of updated model parameters.

At S2130, each processing node is configured to participate in one or more all-gather collectives using the respective subset of the array of updated model parameters to obtain remaining elements of the array of updated model parameters.

It will be appreciated that the above embodiments have been described by way of example only.

The invention claimed is:

1. A data processing system comprising a plurality of first processing nodes, each of the plurality of first processing nodes comprising at least one memory configured to store an array of data items, wherein each of the plurality of first processing nodes comprises:
   at least one processing unit; and
   a gateway device connected to the at least one processing unit, the gateway device configured to interface the plurality of first processing nodes with one another and with a host storage, wherein each of the plurality of first processing nodes belongs to two different sets of processing nodes, wherein a given one of the plurality of first processing nodes is the only processing node that is common to the two different sets of processing nodes to which it belongs, and wherein each of the plurality of first processing nodes is configured to:
   take part in a reduce-scatter collective using the respective array of data items to obtain a reduced subset of an array of data items, wherein the reduce-scatter collective is performed between processing nodes of a first one of the respective two different sets of processing nodes, wherein taking part in the reduce-scatter collective is performed by the at least one processing unit of the respective first processing node;
   subsequently, exchange the respective reduced subset of the array of data items by participating in an all-reduce collective with processing nodes of a second one of the respective two different sets of processing nodes to which the respective processing node belongs to obtain a further reduced subset of the array of data items, wherein exchanging the respective reduced subset of the array of data items by participating in an all-reduce collective is performed by the gateway device of the respective first processing node; and
   subsequently, take part in an all-gather collective using the further reduced subset of the array of data items to obtain a reduced array of data items, wherein the all-gather collective is performed between processing nodes of the first one of the respective two different sets of processing nodes, wherein taking part in the all-gather collective is performed by the at least one processing unit of the respective first processing node,
   wherein each of the plurality of first processing nodes is configured to execute compute instructions during a compute phase and, following an internal barrier synchronisation, enter an external barrier synchronisation including at least one exchange phase, wherein each of the plurality of first processing nodes is further configured to:
   take part in the reduce-scatter collective during the at least one exchange phase;
   perform the exchange of the respective reduced subset of the array of data items by participating in the all-reduce collective during the at least one exchange phase; and
   take part in the one or more all-gather collectives during the at least one exchange phase.

2. A data processing system as claimed in claim 1, wherein each of the first processing nodes is configured to generate the respective array of data items in dependence upon a different set of input data.

3. A data processing system as claimed in claim 2, wherein each array of data items comprises an item from a list consisting of:
   weight updates for a neural network; and
   weights for a neural network derived from weight updates for the neural network,
   wherein each of the first processing nodes is configured to generate the weight updates using a different set of training data.

4. A data processing as claimed in claim 1, further comprising a set of second processing nodes, wherein each of the second processing nodes is associated with one of the first processing nodes and is configured to generate the respective array of data items stored in its associated one of the first processing nodes in dependence upon a different set of input data.

5. A data processing system as claimed in claim 4, wherein each of the second processing nodes is configured to:
   transfer elements of the respective array of data items to its associated one of the first processing nodes.

6. A data processing system as claimed in claim 1, further comprising:
   at least one storage;
   an executing processing node; and
   a preparation processing node, wherein during each of a plurality of time periods prior to the reduce-scatter collective:
   the executing processing node is configured to perform calculations for generating one or more elements of one of the arrays of data items; and
   the preparation processing node is configured to unload to the at least one storage, one or more elements of the one of the arrays of data items that were calculated during a preceding one of the plurality of time periods.

7. A data processing system as claimed in claim 6, wherein the preparation processing node comprises one of the first processing nodes.

8. A data processing system as claimed in claim 6, wherein during each of a further plurality of time periods:

the preparation processing node is configured to generate a further one or more elements of the one of the arrays of data items; and the executing processing node is configured to unload the further one or more elements of the one of the arrays of data items generated in a preceding one of the further plurality of time periods.

9. A data processing system as claimed in claim 6, wherein one of the plurality of first processing nodes is configured to, prior to taking part in the reduce-scatter collective, load elements of the one of the arrays of data items that were unloaded to the at least one storage.

10. A data processing system as claimed in claim 1, wherein each array of data items comprises an item from a list consisting of:
weight updates for a neural network; and
weights for a neural network derived from weight updates for the neural network.

11. A data processing system as claimed in claim 1, wherein each of the first processing nodes in the data processing system is configured to:
following a reduce-scatter collective of the all-reduce collective and prior to an all-gather collective of the all-reduce collective, perform operations on each stored element of the array of data items stored by the respective first processing node to modify data of the stored elements of the array of data items.

12. A data processing system as claimed in claim 11, wherein for each of the first processing nodes:
each of the stored elements comprises weight updates for a neural network; and
the operations to modify data comprise providing updated weights of the neural network using the weight updates, the modified data of the stored elements comprises the updated weights.

13. A method implemented in a data processing system having a plurality of processing nodes, a first processing node of the plurality of processing nodes comprising a memory configured to store an array of data items, wherein the first processing node belongs to a first set of processing nodes and to a second set of processing nodes, wherein the first processing node is the only processing node that is common to the first set of processing nodes and the second set of processing nodes, wherein the first processing nodes comprises:
a processing unit; and
a gateway device connected to the processing unit, the gateway device configured to interface the first processing node with a host storage, and wherein the method comprises, at the first processing node:
taking part in a reduce-scatter collective using the array of data items to obtain a first reduced subset of the data items, wherein the taking part in the reduce-scatter collective is performed by the processing unit of the first processing node, and wherein the reduce-scatter collective is further performed between a second processing node and a third processing node of the second set of processing nodes;
exchanging the first reduced subset of the data items by participating in an all-reduce collective to obtain a second reduced subset of the data items, wherein the exchanging the first reduced subset is performed by the gateway device of the first processing node, and wherein the all-reduce collective is performed among the first set of processing nodes; and
taking part in an all-gather collective using the second reduced subset of the data items to obtain a reduced array of data items, wherein the taking part in the all-gather collective is performed by the processing unit of the first processing node, and wherein the all-gather collective is performed with the second processing node and the third processing node of the second set of processing nodes,
wherein each of the plurality of first processing nodes executes compute instructions during a compute phase and, following an internal barrier synchronisation, enters an external barrier synchronisation including at least one exchange phase, wherein each of the plurality of first processing nodes:
takes part in the reduce-scatter collective during the at least one exchange phase;
performs the exchange of the respective reduced subset of the array of data items by participating in the all-reduce collective during the at least one exchange phase; and
takes part in the one or more all-gather collectives during the at least one exchange phase.

14. The method of claim 13, further comprising the second processing node generating a second array of data items in dependence upon a different set of input data than is associated with the array of data items.

15. The method of claim 14, further comprising the second processing node transferring elements of the second array of data items to the third processing node as part of the reduce-scatter collective.

16. The method of claim 13, comprising performing the following by a fourth processing node:
generating at least part of the array of data items; and
making the at least part of the array of data items available to the first processing node prior to the reduce-scatter collective.

17. The method of claim 16, wherein the generating at least part of the array of data items is performed over a plurality of time periods,
wherein during each of some of the time periods:
the fourth processing node is configured to perform calculations to generate elements of the at least part of the array of data items; and
the first processing node is configured to unload to storage one or more elements of the array of data items that were calculated during a preceding one of the plurality of time periods.

18. The method of claim 13, wherein the array of data items comprises an item from a list consisting of:
weight updates for a neural network; and
weights for a neural network derived from weight updates for the neural network.

19. The method of claim 18, wherein the second processing node comprises a second memory configured to store a second array of data items, wherein the second array of data items comprises an item from a list consisting of:
weight updates for a neural network; and
weights for a neural network derived from weight updates for the neural network,
wherein the method further comprises the second processing node generating the weight updates of the second array of data items using a different set of training data than is used by the first processing node to generate the weight updates of the first array of data items.

20. The method of claim 13, further comprising the first processing node,
following the reduce-scatter collective and prior to the all-gather collective, modifying data of stored elements of the array of data items.

21. The method of claim 20, wherein:
the stored elements comprise weight updates for a neural network; and
modifying data of the stored elements includes providing updated weights of the neural network using the weight updates.

22. The method of claim 13, wherein the method comprises, at the first processing node, executing compute instructions during a compute phase and, following a synchronisation barrier, entering an exchange phase,
wherein the taking part in the reduce-scatter collective is performed during the exchange phase,
wherein the exchanging the first reduced subset of the data items by participating in the all-reduce collective is performed during the exchange phase,
wherein the taking part in the all-gather collective is performed during the exchange phase.

23. A non-transitory computer readable storage medium storing a computer program comprising computer readable instructions, which when executed by a first processing node within a processing system having a plurality of processing nodes, causes the first processing node to:
take part in a reduce-scatter collective using an array of data items to obtain a first reduced subset of the data items, wherein the taking part in the reduce-scatter collective is performed by a processing unit of the first processing node, and wherein the first processing node is associated with a first set of processing nodes and with a second set of processing nodes, wherein the first processing node is the only processing node that is common to the first set of processing nodes and the second set of processing nodes, and wherein the reduce-scatter collective is further performed between a second processing node and a third processing node of the second set of processing nodes;
exchange the first reduced subset of the data items by participating in an all-reduce collective to obtain a second reduced subset of the data items, and wherein the all-reduce collective is performed among the first set of processing nodes; and
take part in an all-gather collective using the second reduced subset of the data items to obtain a reduced array of data items, wherein the taking part in the all-gather collective is performed by the processing unit of the first processing node, and wherein the all-gather collective is performed with the second processing node and the third processing node of the second set of processing nodes,
wherein the computer readable instructions, when executed by the at least one processor of the first processing node within a processing system having a plurality of processing nodes, further cause the first processing node to:
execute compute instructions during a compute phase and, following an internal barrier synchronisation, enter an external barrier synchronisation including at least one exchange phase,
take part in the reduce-scatter collective during the at least one exchange phase;
perform the exchange of the respective reduced subset of the array of data items by participating in the all-reduce collective during the at least one exchange phase; and
take part in the one or more all-gather collectives during the at least one exchange phase.

24. The non-transitory computer readable storage medium of claim 23, wherein the array of data items comprises an item from a list consisting of:
weight updates for a neural network; and
weights for a neural network derived from weight updates for the neural network.

25. The non-transitory computer readable storage medium of claim 23,
wherein the computer readable instructions, which when executed, cause the first processing node to, following the reduce-scatter collective and prior to the all-gather collective, modify data of stored elements of the array of data items.

26. The non-transitory computer readable storage medium of claim 25, wherein:
the stored elements comprise weight updates for a neural network; and
modifying data of the stored elements includes providing updated weights of the neural network using the weight updates.

27. The non-transitory computer readable storage medium of claim 23, wherein the computer readable instructions, when executed by the first processing node within a processing system having a plurality of processing nodes, cause the first processing node to:
enter a compute phase and, following a synchronisation barrier, enter an exchange phase;
perform the taking part in the reduce-scatter collective during the exchange phase; perform the exchange of the first reduced subset of the data items by participating in the all-reduce collective during the exchange phase; and
perform the taking part in the all-gather collective during the exchange phase.

* * * * *